US008935644B2

(12) United States Patent
Ogawa et al.

(10) Patent No.: US 8,935,644 B2
(45) Date of Patent: Jan. 13, 2015

(54) PRINTED SUBSTRATE DESIGN SYSTEM, AND PRINTED SUBSTRATE DESIGN METHOD

(75) Inventors: Masashi Ogawa, Tokyo (JP); Ken Morishita, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 14/234,550

(22) PCT Filed: Jul. 27, 2012

(86) PCT No.: PCT/JP2012/069228
§ 371 (c)(1),
(2), (4) Date: Jan. 23, 2014

(87) PCT Pub. No.: WO2013/018725
PCT Pub. Date: Feb. 7, 2013

(65) Prior Publication Data
US 2014/0181770 A1   Jun. 26, 2014

(30) Foreign Application Priority Data
Jul. 29, 2011   (JP) ................................. 2011-166250

(51) Int. Cl.
*G06F 9/455* (2006.01)
*G06F 17/50* (2006.01)
(Continued)

(52) U.S. Cl.
CPC ........ *G06F 17/5081* (2013.01); *G06F 17/5068* (2013.01); *H05K 3/0005* (2013.01); *H05K 1/0231* (2013.01); *H05K 1/025* (2013.01); *H05K 1/023* (2013.01)
USPC ........... 716/112; 716/111; 716/113; 716/115; 716/137

(58) Field of Classification Search
USPC .................................. 716/111, 112, 113, 115
See application file for complete search history.

(56) References Cited

U.S. PATENT DOCUMENTS 6,754,876 B2 *  6/2004  Sasaki et al. ................... 716/119
6,834,380 B2 * 12/2004  Khazei .......................... 716/115
(Continued)

FOREIGN PATENT DOCUMENTS

CN   1637745    7/2005
JP   2768900    6/1998
(Continued)

OTHER PUBLICATIONS

International Search Report corresponding to PCT/JP2012/069228, dated Oct. 19, 2012, 4 pages.
(Continued)

*Primary Examiner* — Nha Nguyen
*Assistant Examiner* — Brian Ngo
(74) *Attorney, Agent, or Firm* — Wilmer Cutler Pickering Hale and Dorr LLP

(57) ABSTRACT

A printed substrate design system includes: an EMI condition determination unit that compares an EMI characteristic derived by an EMI characteristic derivation unit with an EMI allowable condition, and determines whether the EMI characteristic of a printed substrate satisfies the EMI allowable condition; a substrate configuration change unit that changes an internal configuration of the printed substrate to obtain a changed configuration of the printed substrate in a case where the EMI condition determination unit has determined that the EMI allowable condition is not satisfied, and sets design information of the changed configuration of the printed substrate to design information for deriving the EMI characteristic in the EMI characteristic derivation unit; and an output unit that outputs a printed substrate configuration in a case where the EMI condition determination unit has determined the EMI allowable condition is satisfied.

8 Claims, 54 Drawing Sheets

(51) Int. Cl.
*H05K 3/00* (2006.01)
*H05K 1/02* (2006.01)

(56) References Cited

U.S. PATENT DOCUMENTS

| 2002/0010898 A1* | 1/2002 | Sasaki et al. ............. 716/1 |
| 2002/0040466 A1* | 4/2002 | Khazei ..................... 716/9 |
| 2005/0149894 A1 | 7/2005 | Shimazaki et al. |
| 2013/0145334 A1* | 6/2013 | Nojima et al. ........... 716/115 |

FOREIGN PATENT DOCUMENTS

| JP | 11-161690 | 6/1999 |
| JP | 2002-304436 | 10/2002 |
| JP | 2005-196406 | 7/2005 |
| JP | 3838328 | 10/2006 |
| JP | 2007-219667 | 8/2007 |
| JP | 2010-287740 | 12/2010 |
| JP | 2011-008524 | 1/2011 |

OTHER PUBLICATIONS

Written Opinion of the International Search Authority corresponding to PCT/JP2012/069228, mailing date Oct. 30, 2012, 5 pages.

Shim, H.W. et al., "Model for Estimating Radiated Emissions from a Printed Circuit Board with Attached Cables due to Voltage-Driven Sources", IEEE Transactions on Electromagnetic Compatibility, vol. 47, No. 4, 2005, pp. 899-907.

Deng, S. et al., "Estimating Maximum Radiated Emissions from Printed Circuit Boards with an Attached Cable", IEEE Transactions on Electromagnetic Compatibility, vol. 50, No. 1, 2008, pp. 215-218.

International Search Report issued by the Japanese Patent Office as International Searching Authority for International Application No. PCT/JP2012/069228 mailed Oct. 30, 2012 (4 pgs.).

* cited by examiner

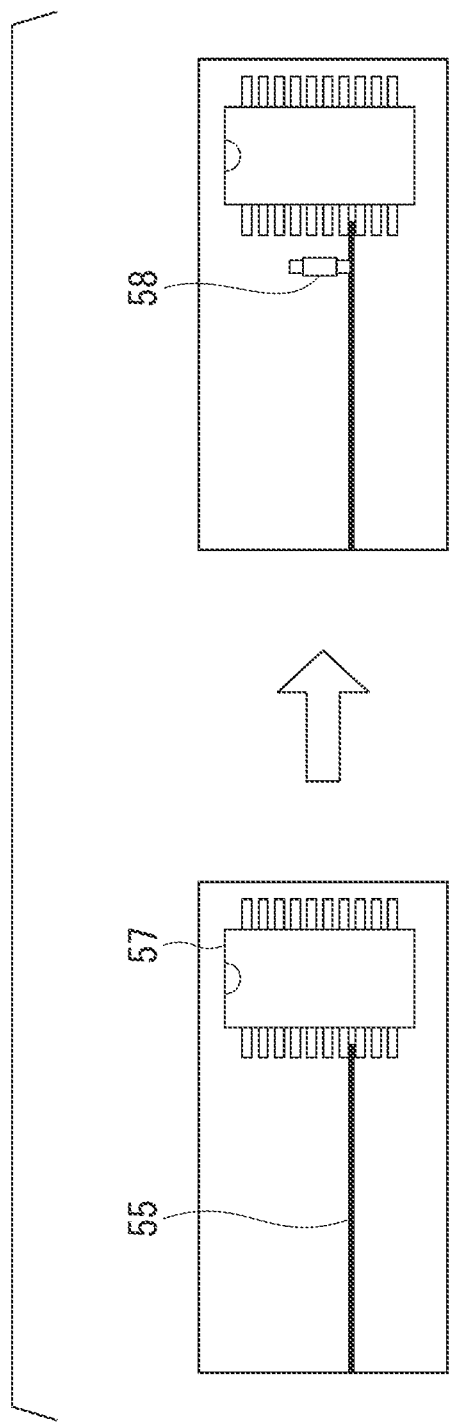

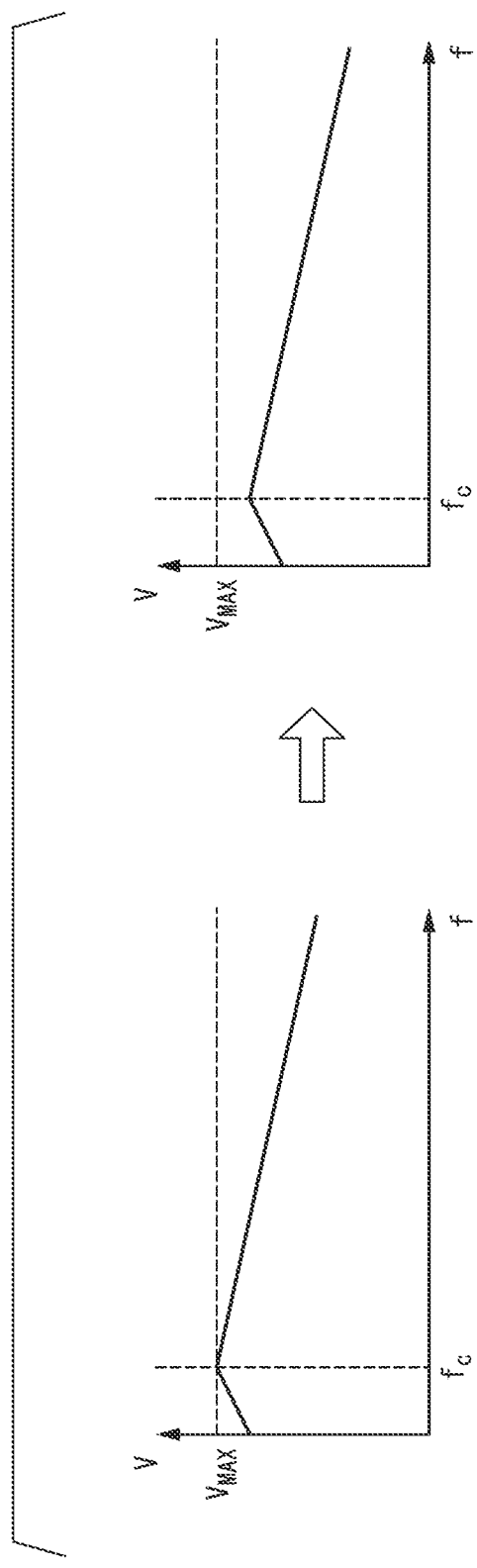

PRINTED SUBSTRATE DESIGN SYSTEM, AND PRINTED SUBSTRATE DESIGN METHOD

CROSS-REFERENCE TO RELATED APPLICATIONS

This application is a national stage application of International Patent Application No. PCT/JP2012/069228, filed on Jul. 27, 2012, and which claims the benefit of the priority of Japanese Patent Application No. 2011-166250, filed on Jul. 29, 2011, the contents of which are incorporated herein by reference in their entirety.

TECHNICAL FIELD

The present invention relates to a printed substrate design system and a printed substrate design method. In particular, the present invention relates to a printed substrate design system that designs a substrate configuration of a printed substrate on which ICs (integrated circuits) and other passive components are to be mounted and to which a cable is to be connected, and a printed substrate design method therefor.

BACKGROUND ART

There is a problem with a printed substrate with an IC mounted thereon, in which electric current that flows on the printed substrate acts as a noise source and results in the occurrence of EMI (electro magnetic interference). This EMI can cause an electronic device with this printed substrate built therein, or other devices to malfunction. For this reason, various EMI countermeasures have been made in electronic devices in order to reduce EMI to or below an allowable value.

For example, a wiring on a printed substrate with electric current flowing therethrough and a cable connected to the substrate have electromagnetic field coupling therebetween, and this coupling causes electric current to flow also through the cable so that EMI occurs due to the cable acting as an antenna (common mode radiation). As the amount and speed of electric current that flows through a signal wiring on a printed substrate increases, this common mode radiation tends to increase, compared to before.

In order to suppress this common mode radiation, there is a need for carrying out processes regarding such as the structure of the printed substrate, the characteristics of electric current that flows through the signal wiring, and the length and/or connection position of the wiring, and adding countermeasure components. However, if design changes for EMI suppression are made and/or countermeasure components are added after the manufacturing of the printed substrate, there will be a significant increase in the cost. In order to avoid this, it is important in terms of carrying out low cost designing of a printed substrate, that the electrical characteristics are estimated at the designing stage of the printed substrate, and countermeasures for EMI suppression are accordingly made based on the result.

Examples of a method for estimating common mode radiation that occurs from the printed substrate designing stage include a method of analyzing electrical characteristics based on information of the substrate structure and components to be mounted thereon. Examples of a method for analyzing electrical characteristics include an electromagnetic field analysis method such as the FDTD (finite difference time domain) method, the moment method, and the finite element method, and a circuit analysis method such as SPICE (simulation program with integrated circuit emphasis). These methods are widely used in designing printed substrates.

Here there is a problem. Specifically, with SPICE, common mode current cannot be estimated. Therefore, when estimating common mode radiation with SPICE, a special circuit model needs to be created in order to let an electric current that simulates a common mode current flow. Moreover, in order to create this special circuit model, one with knowledge of electronic circuits and electromagnetic waves needs to perform a special process. Those who do not have in-depth knowledge are unable to perform the process, and are also unable to provide assurance of sufficient analysis precision. Therefore, common mode current estimation with SPICE is extremely difficult.

On the other hand, with the electromagnetic field analysis method, which models an entire target system, it is possible to calculate electromagnetic radiation from a cable caused by common mode current. However, when modeling an entire printed substrate including a cable to calculate the radiation electromagnetic field, a vast amount of calculation cost is required in general. Generally, calculation cost and analysis precision are a trade-off. Accordingly, if calculation cost is simply lowered, the level of analysis precision is lowered. Therefore, if calculation cost is simply reduced, sufficient assurance of analysis results cannot be obtained.

For this reason, in order to predict the amount of common mode radiation from a cable, at the designing stage of a printed substrate, there is a need for a calculation method that performs an analysis of characteristics including a common mode current flowing through a cable at a required level of precision, and an analysis design system that can obtain analysis results at a required level of precision without in-depth knowledge of electronic circuits and electromagnetic waves and that enables designing of a low-EMI printed substrate based on the results.

As a known method for designing this type of printed substrate that suppresses EMI from a cable, there is a technique disclosed in Patent Document 1. In the technique disclosed in Patent Document 1, based on the layout information of a printed substrate, an electronic device, wiring, and a ground plane are converted into a model for an electromagnetic field analysis, and a distribution of electric field intensity that occurs in the close vicinity of the ground plane as the electronic device operates is calculated. By connecting the cable to a portion with low electric field intensity, EMI from the cable is suppressed. In this way, in the technique disclosed in Patent Document 1, it is reported that an electromagnetic field analysis is performed with use of an analysis model in which a printed substrate is simplified and no cable is included, and thereby a design guideline for suppressing EMI from a cable in a short period of time is obtained.

Moreover, as a known design system, there is a technique disclosed in Patent Document 2. This technique proposes an electric field intensity calculation apparatus including a model creation means that creates an electronic circuit device model for calculating an electric field intensity by setting input data. This apparatus calculates an intensity of an electric field radiated from the electric circuit device, based on analysis input data that is obtained based on a model obtained from the model creation means. This apparatus further includes: a navigation file that stores a plurality of steps including at least a step of inputting outer dimensions of the electric circuit device, and a step of inputting an analysis frequency for generating a mesh on and analyzing the electric circuit device; and a display means that sequentially displays the steps stored in the navigation file. In this apparatus, a user sets input data in a dialogical manner in accordance with the steps displayed on the display means. In the technique disclosed in Patent Document 2, as a method for calculating electric field intensity, it is proposed to employ a technique disclosed in Patent Document 3. It is reported that, with use of this technique, it is possible to obtain optimal analysis input data that is not dependent on the proficiency of an input data creator for the same analysis conditions, and efficiently calculate electric field intensity.

PRIOR ART DOCUMENTS

Patent Documents

[Patent Document 1] Japanese Patent Publication No. 3838328
[Patent Document 2] Japanese Unexamined Patent Application, First Publication No. H11-161690
[Patent Document 3] Japanese Patent Publication No. 2768900

SUMMARY OF THE INVENTION

Problem to be Solved by the Invention

However, while the technique disclosed in Patent Document 1 is an effective technique for obtaining a qualitative guideline for a cable connection location on a printed substrate, it is unable to quantitatively calculate the electromagnetic radiation amount from a cable. Accordingly, with the technique disclosed in Patent Document 1, it is not possible to obtain a guideline as to whether or not a countermeasure should be taken for suppressing common mode radiation from the cable. The cost of a printed substrate fluctuates, depending on whether or not a countermeasure needs to be taken. For this reason, an absolute amount evaluation is required for low cost designing. However, in the case of using the technique disclosed in Patent Document 1, there is a problem in that it is not possible to perform an evaluation and provide a guarantee based on the absolute amount of EMI that occurs from the designed printed substrate.

If the technique disclosed in Patent Document 3 is combined, the technique disclosed in Patent Document 2 enables even one without an in-depth knowledge of electric circuits and electromagnetic waves to surely perform a quantitative EMI calculation by creating an electromagnetic field analysis model based on the structure of a printed substrate. However, there is no criterion to determine whether or not the found quantitative value requires a countermeasure. For this reason, even if an EMI quantitative value is calculated, it cannot contribute to the design of the printed substrate. Furthermore, it is also possible to provide a specific countermeasure component or a shield effect within the apparatus. However, there is no guideline as to how the effective method for an EMI countermeasure may be used and how the method can make improvements when calculating a specific EMI quantitative value. Therefore, it is difficult for one that does not have an in-depth knowledge of electric circuits and electromagnetic waves to use this method to design a printed substrate applied with a countermeasure for achieving a low EMI level from the designing stage of a printed substrate.

Means for Solving the Problem

In order to solve the above problems, a printed substrate design system according to a first exemplary aspect of the present invention designs a substrate configuration of a printed substrate on which an IC and a passive component are mounted, a cable being connected to the printed substrate. The printed substrate design system includes: an input unit that receives input of printed substrate design information; an EMI characteristic derivation unit that derives an EMI characteristic from the input printed substrate design information received by the input unit, the EMI characteristic being a characteristic of EMI occurring from the printed substrate; a determination criteria storage unit that stores an EMI allowable condition being a condition of an allowable EMI characteristic of the printed substrate; an EMI condition determination unit that compares the EMI characteristic derived by the EMI characteristic derivation unit with the EMI allowable condition stored in the determination criteria storage unit, the EMI condition determination unit determining whether the EMI characteristic of the printed substrate satisfies the EMI allowable condition; a substrate configuration change unit that changes an internal configuration of the printed substrate in a case where the EMI condition determination unit has determined that the EMI allowable condition is not satisfied, the substrate configuration change unit setting design information of the printed substrate with the re-changed structure to design information for deriving the EMI characteristic in the EMI characteristic derivation unit; and an output unit that outputs a printed substrate configuration that satisfies the EMI allowable condition in a case where the EMI condition determination unit has determined the EMI allowable condition is satisfied.

A printed substrate design method according to a second exemplary aspect of the present invention is used for designing a substrate configuration of a printed substrate on which an IC and a passive component are mounted, and a cable is connected to the printed substrate. The printed substrate design method includes: receiving input of printed substrate design information; deriving an EMI characteristic from the received input of printed substrate design information, the EMI characteristic being a characteristic of EMI occurring from the printed substrate; comparing the derived EMI characteristic with an EMI allowable condition stored in a determination criteria storage unit, and determining whether the EMI characteristic of the printed substrate satisfies the EMI allowable condition; changing an internal configuration of the printed substrate in a case where it has been determined that the EMI allowable condition is not satisfied, and setting design information of the printed substrate with the re-changed structure to design information for deriving the EMI characteristic; and outputting a printed substrate configuration that satisfies the EMI allowable condition in a case where it has been determined that the EMI allowable condition is satisfied.

Furthermore, the above exemplary aspects of the present invention do not include all characteristics required for the invention. Sub-combinations of these characteristics may also be the inventions.

Effect of the Invention

As is clear from the above description, the present invention enables to easily determine whether or not a printed substrate of a structure and/or a specification that achieves a low EMI level can be designed, and enables to easily design a printed substrate of a structure and/or a specification, that satisfies an EMI allowable value.

BRIEF DESCRIPTION OF THE DRAWINGS

FIG. 38A is a diagram showing an example of a change guideline and an effect of the termination condition change process of FIG. 24.

FIG. 41B is a diagram showing an example of a change guideline and an effect of the operating voltage change process of FIG. 27.

EMBODIMENTS FOR CARRYING OUT THE INVENTION

Hereunder, the present invention is described through exemplary embodiments of the invention, however the exemplary embodiments below do not limit the invention according to the claims. Moreover, all combinations of characteristics described in the exemplary embodiments are not always required for the problem solving means of the invention.

Figure 1:
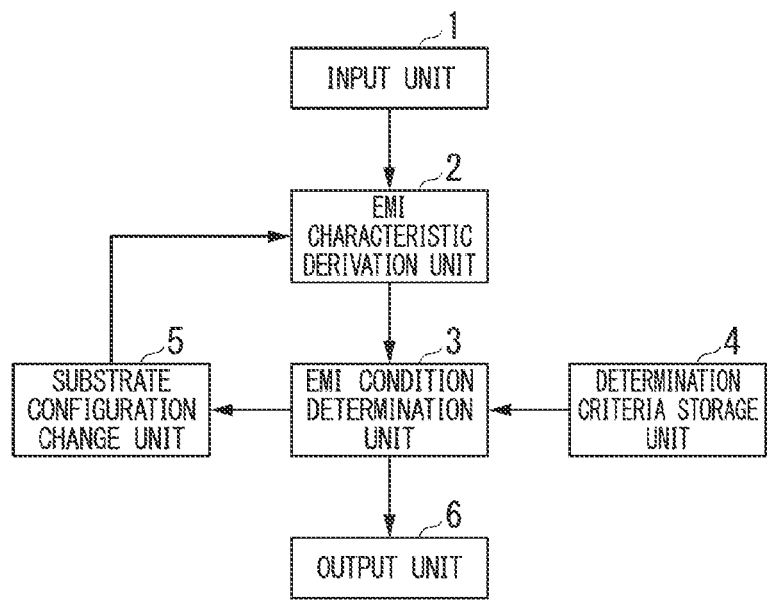
FIG. 1 is a diagram showing an example of a block configuration of a printed substrate design system according to a first exemplary embodiment of the present invention.

FIG. 1 shows an example of a block configuration of a printed substrate design system according to a first exemplary embodiment of the present invention. The printed substrate design system is a system that designs a substrate configuration of a printed substrate on which ICs and other passive components are to be mounted and to which a cable is to be connected.

The printed substrate design system of the first exemplary embodiment includes an input unit 1, an EMI characteristic derivation unit 2, an EMI condition determination unit 3, a determination criteria storage unit 4, a substrate configuration change unit 5, and an output unit 6.

The input unit 1 receives input of input information that includes a database of structure information of a printed substrate to which a cable is connected and design information of mounted components including ICs.

The EMI characteristic derivation unit 2 derives a characteristic of EMI that occurs from the printed substrate with the cable connected thereto.

The EMI condition determination unit 3 determines whether or not the printed substrate with the cable connected thereto is designed to achieve a low EMI level. To describe in detail, the EMI condition determination unit 3 compares the EMI characteristic derived by the EMI characteristic derivation unit 2 against an EMI allowable condition provided in the determination criteria storage unit 4, and determines whether or not the EMI characteristic satisfies the EMI allowable condition. Examples of the EMI characteristic include: a characteristic of occurring due to a voltage fluctuation between a power supply and a GND of the printed substrate; a characteristic of occurring from an operating element such as an IC; and a characteristic of occurring directly from electric current that is flowing through a wiring connected to an IC. Here, as an EMI characteristic, there is considered a case where a cable connected to a printed substrate and a wiring on the printed substrate are coupled, and common mode radiation occurs as a result of this coupling. The EMI allowable condition provided in the determination criteria storage unit 4 is only required to be a condition that indicates a limit value in the found EMI characteristic. As this condition, an EMI frequency characteristic that is defined basically by a standard applies. If several EMI allowable conditions are preliminarily provided in the determination criteria storage unit 4, a required EMI allowable condition may be taken therefrom and may be compared with a characteristic found by the EMI characteristic derivation unit 2.

If the EMI condition determination unit 3 determines that the configuration of this printed substrate does not satisfy the EMI allowable condition, the substrate configuration change unit 5 makes a change to the printed substrate configuration that is required to satisfy the EMI allowable condition. The change to the printed substrate configuration here may be made in a manner such that a change guideline is preliminarily prepared for the case where the EMI allowable condition is not met, and the configuration is changed according to the change guideline. The EMI characteristic derivation unit 2 again derives an EMI characteristic on the printed substrate, the configuration of which has just been changed. Then, the EMI condition determination unit 3 again determines whether or not the printed substrate with the cable connected thereto is designed to achieve a low EMI level. The above process is repeatedly performed.

If the EMI condition determination unit 3 determines that a power supply circuit of this printed substrate satisfies the EMI allowable condition, a determination result of a low EMI being achieved and the configuration of the printed substrate at this time are output to the output unit 6, and the process in the system is completed.

Figure 10:
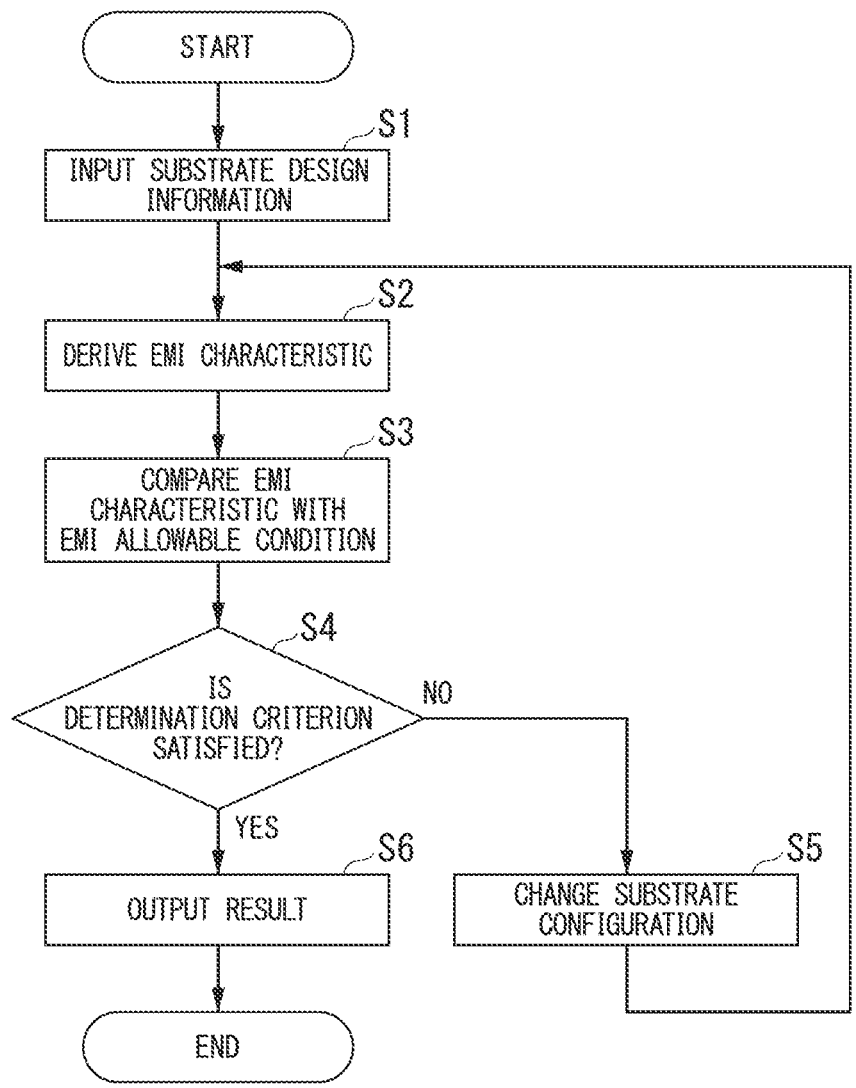
FIG. 10 is a diagram showing a flowchart of the first exemplary embodiment of the present invention.

FIG. 10 is a flowchart showing a process of the first exemplary embodiment. This process starts from a circuit design information input process (S1). The information input here is described with an example of a printed substrate of a configuration shown with the horizontal-plane layout illustrated in FIG. 32 and the cross-sectional structure illustrated in FIG. 33 where ICs and other components are mounted thereon and a cable is connected thereto. In this example, the input information are information that are required for deriving a characteristic of EMI that occurs from the printed substrate, such as information of physical structures of the substrate and cable including the layout and layer structure thereof, and ICs and other components to be mounted thereon. These types of information are referred to as substrate design information. The substrate design information is input from the input unit 1 of FIG. 1. Next, an EMI characteristic derivation process (S2) is performed based on the input substrate design information. This process is performed in the EMI characteristic derivation unit 2 of FIG. 1. With this process, the characteristic of EMI that occurs from this printed substrate is derived. Next, there are performed an EMI characteristic comparison process (S3) which is a process of comparing the derived EMI characteristic with the determination criterion, and an EMI condition determination process (S4). These processes are performed in the EMI condition determination unit 3 of FIG. 1. Here, the derived EMI characteristic undergoes a process of being compared with the EMI allowable condition provided in the determination criteria storage unit 4, and it is determined whether the printed substrate is designed to achieve a low EMI level. If the determination criterion is determined to be satisfied as a result of the EMI condition determination process (S4), which is a process of determining whether or not the determination criterion is satisfied, then a substrate configuration change process (S5) is performed. This process is performed in the substrate configuration change unit 5 of FIG. 1. With this process, the configuration of the printed substrate is changed. In this substrate configuration change process (S5), data of the printed substrate, the configuration of which has been changed, is input. In the EMI characteristic derivation process (S2), there is again repeated the process of using the information of the printed substrate with the changed configuration and afresh deriving an EMI characteristic. On the other hand, if the determination criterion is determined to be satisfied as a result of the process of determining whether or not the determination criterion is satisfied (S4), a process of outputting the determined result is performed in a result output process (S6). With this process, the result is output to the output unit 6 of FIG. 1. The result output at this time may include not only the substrate design information of the printed substrate with the configuration designed to achieve a low EMI level, but also each EMI characteristic before and after the change was made to the configuration, and a result that illustrates a comparison with the EMI allowable condition.

With these results, it is possible to evaluate, with absolute amounts, how much margin is given to the design and in what frequency range a problem is present.

Figure 2:
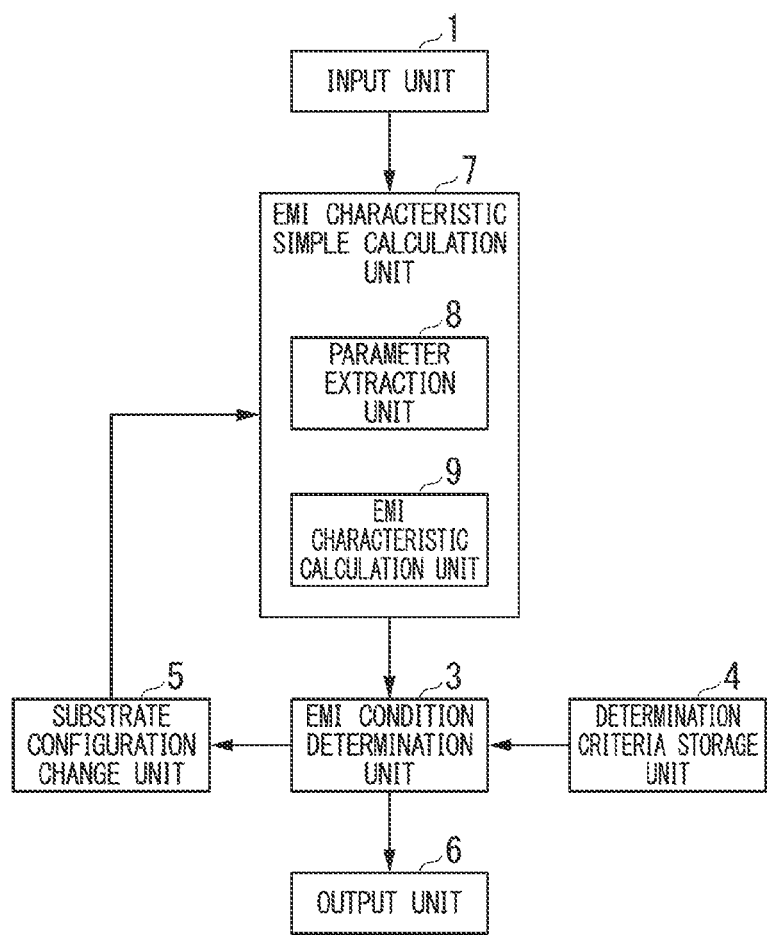
FIG. 2 is a diagram showing an example of a block configuration of a printed substrate design system according to a second exemplary embodiment of the present invention.

FIG. 2 shows an example of a block configuration of a printed substrate design system according to a second exemplary embodiment of the present invention. In the second exemplary embodiment, an EMI characteristic simple calculation unit 7 is prepared as the EMI characteristic derivation unit 2 in FIG. 1. This EMI characteristic simple calculation unit 7 derives an EMI characteristic from the substrate design information input from the input unit 1 by means of a simple analysis calculation. The EMI characteristic simple calculation unit 7 includes a parameter extraction unit 8 and an EMI characteristic calculation unit 9. The parameter extraction unit 8 extracts some information to be used for calculation from the input substrate design information, and sends the extracted information to the EMI characteristic calculation unit 9. Examples of information to be extracted here include substrate outer size, layer configuration, wiring size, characteristics of electric current flowing through the wiring, wiring input impedance, wiring termination condition, cable connection position information, and cable length. The EMI characteristic calculation unit 9 uses a method of deriving an EMI characteristic in a simple manner from some of the substrate design information extracted by the parameter extraction unit 8. As this EMI characteristic calculation unit 9, for example, there may be considered a system that performs a calculation process so as to derive a maximum value characteristic of common mode radiation from a printed substrate with a cable connected thereto, based on outer shape information of the printed substrate and/or characteristic information of electric current. Examples of this type of system include ones that are disclosed in ["Model for Estimating Radiated Emissions From a Printed Circuit Board With Attached Cables Due to Voltage-Driven Sources", IEEE TRANSACTIONS ON ELECTROMAGNETIC COMPATIBILITY, VOL. 47, No. 4, NOVEMBER 2005 (hereunder, referred to as Non-Patent Document 1)], or ["Estimating Maximum Radiated Emissions From Printed Circuit Boards With an Attached Cable", IEEE TRANSACTIONS ON ELECTROMAGNETIC COMPATIBILITY, VOL. 50, No. 1, FEBRUARY 2008 (Non-Patent Document 2)]. Therefore, with use of the EMI characteristic simple calculation unit 7 illustrated in this example, it is possible, in a simple manner, to derive a maximum value characteristic of common mode radiation associated with coupling of a cable and wiring, based on substrate design information of a printed substrate with the cable connected thereto.

Figure 11:
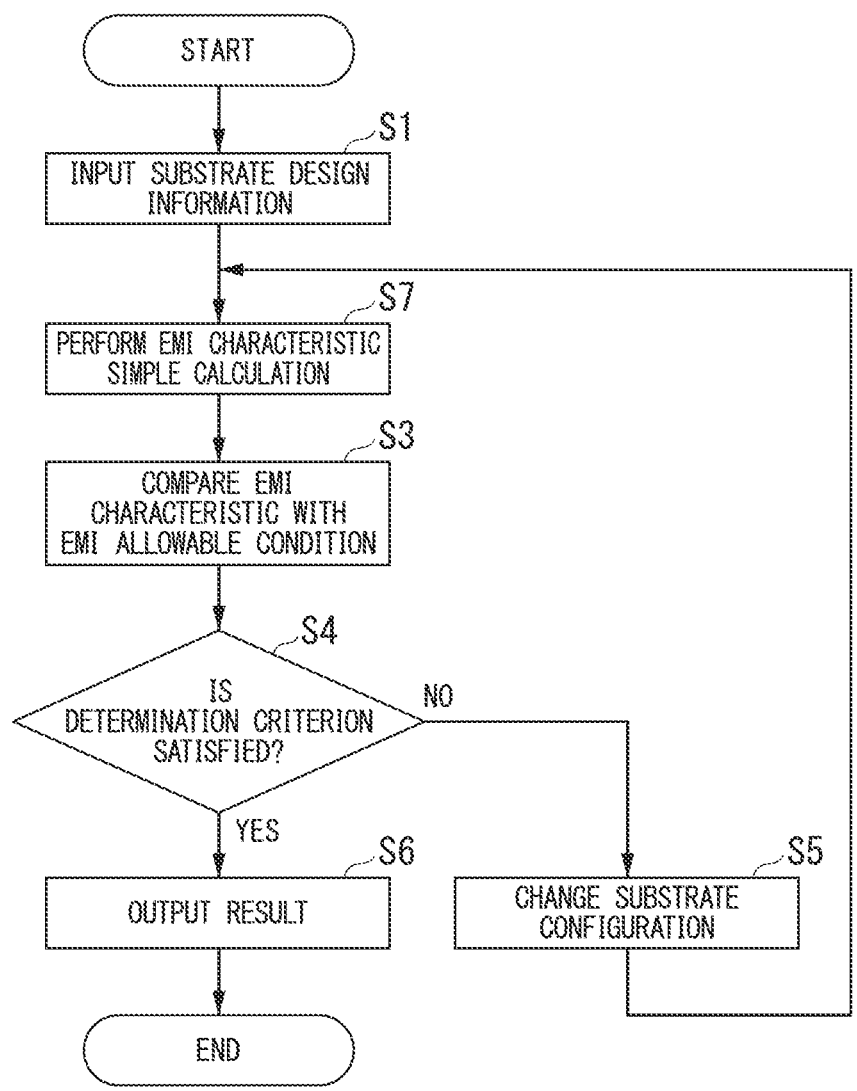
FIG. 11 is a diagram showing a flowchart of the second exemplary embodiment of the present invention.
Figure 16:
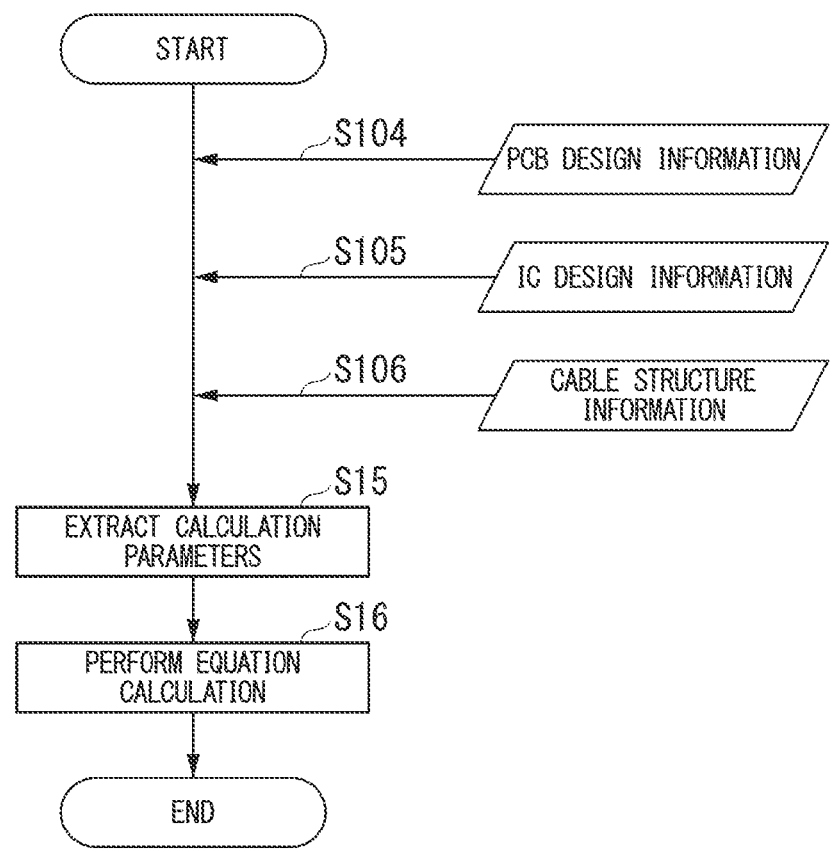
FIG. 16 is a diagram showing a flowchart of an EMI characteristic simple calculation process in the second exemplary embodiment of the present invention.

FIG. 11 is a flowchart showing a process of the second exemplary embodiment. In this flowchart, as the EMI characteristic derivation process (S2) illustrated in FIG. 10, an EMI characteristic simple calculation process (S7) is performed. This EMI characteristic simple calculation process (S7) is performed in the EMI characteristic simple calculation unit 7 of FIG. 2. The flowchart shown in FIG. 16 describes an internal process of this EMI characteristic simple calculation process (S7). In the flowchart of FIG. 11, first, a calculation parameter extraction process (S15) is performed. In this process, parameters that are required when calculating an EMI characteristic are extracted from the input substrate design information. This calculation parameter extraction process (S15) is performed in the parameter extraction unit 8 of FIG. 2. Next, an equation calculation process (S16) is performed. In this process, an EMI characteristic is derived from the information extracted in the calculation parameter extraction process (15). This equation calculation process (S16) is performed in the EMI characteristic calculation unit 9 of FIG. 2. As an example of this EMI characteristic simple calculation process (S7), here is described a case disclosed in Non-Patent Document 1 and/or Non-Patent Document 2 where there is used a method of deriving a maximum value characteristic of common mode radiation from a printed substrate with a cable connected thereto. In this case, with the calculation parameter extraction process (S15), from the substrate design information there are extracted parameters that are required as input of a mathematical equation for deriving a characteristic of a common mode radiation maximum value disclosed in Non-Patent Document 1 and/or Non-Patent Document 2. Examples of these parameters include information such as substrate outer size, layer configuration, wiring size, characteristics of electric current flowing through the wiring, wiring input impedance, wiring termination condition, cable connection position information, and cable length. Next, with the equation calculation process (S16), from the information extracted in the calculation parameter extraction process (S15), a maximum value characteristic of common mode radiation from the printed substrate is derived based on the mathematical equation disclosed in Non-Patent Document 1 and/or Non-Patent Document 2.

Figure 32:
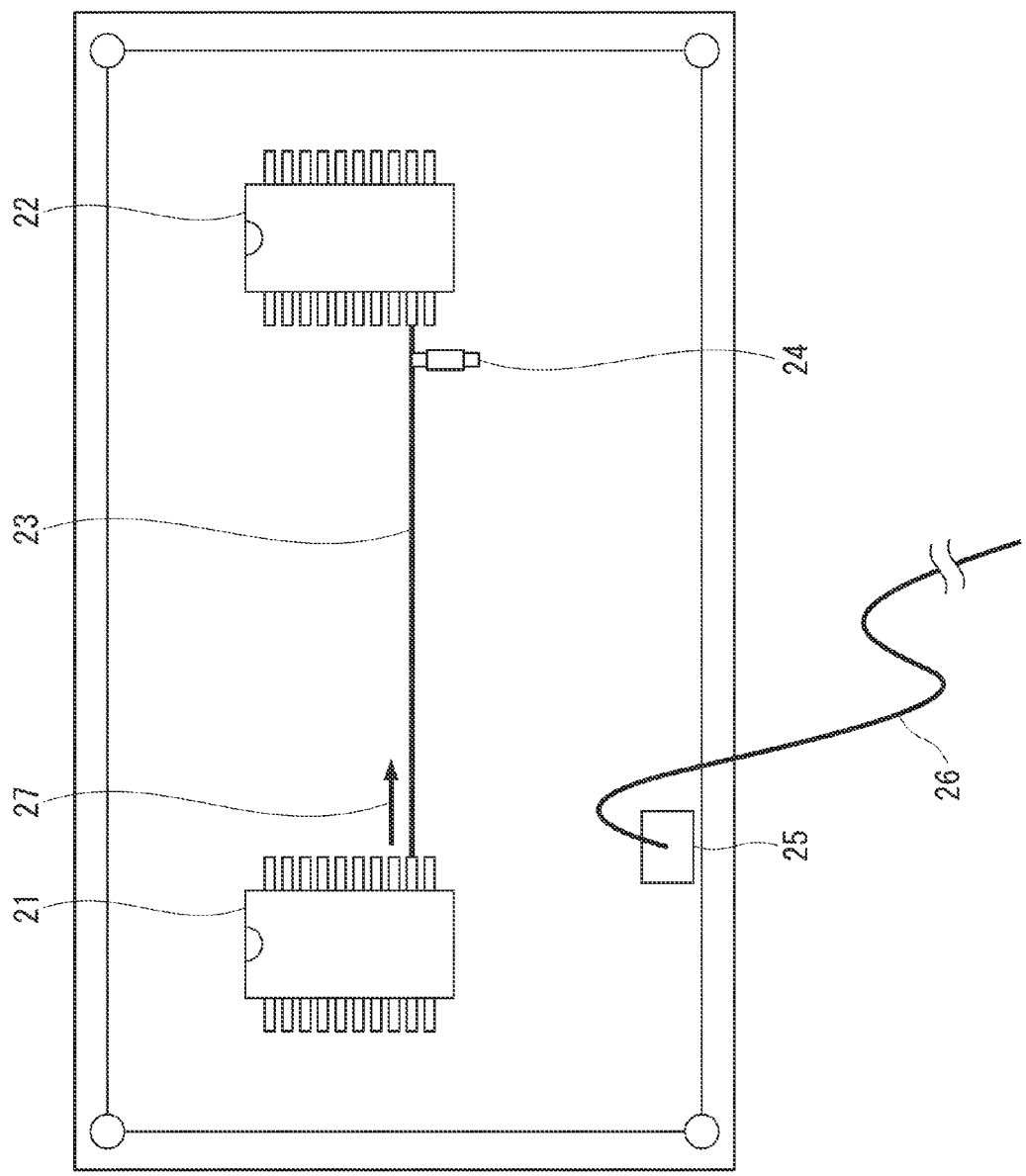
FIG. 32 is a diagram showing an example of a horizontal-plane layout of a printed substrate in the exemplary embodiments of the present invention.
Figure 33:
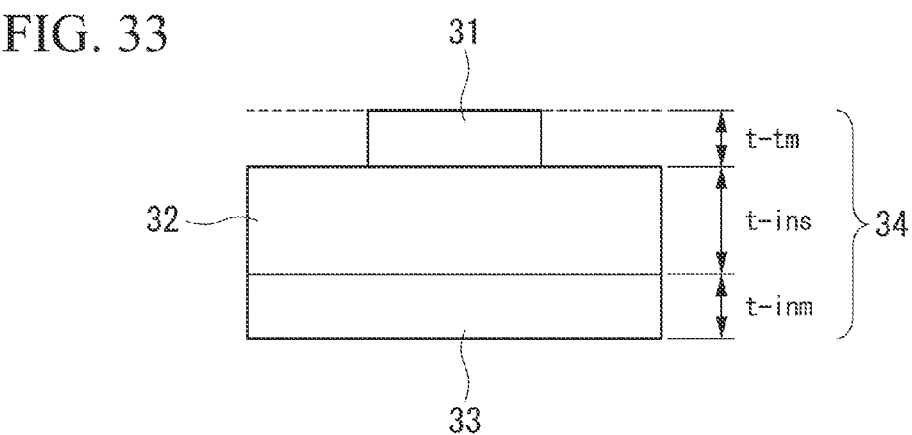
FIG. 33 is a diagram showing an example of a cross-sectional structure of a printed substrate in the exemplary embodiments of the present invention.
Figure 34:
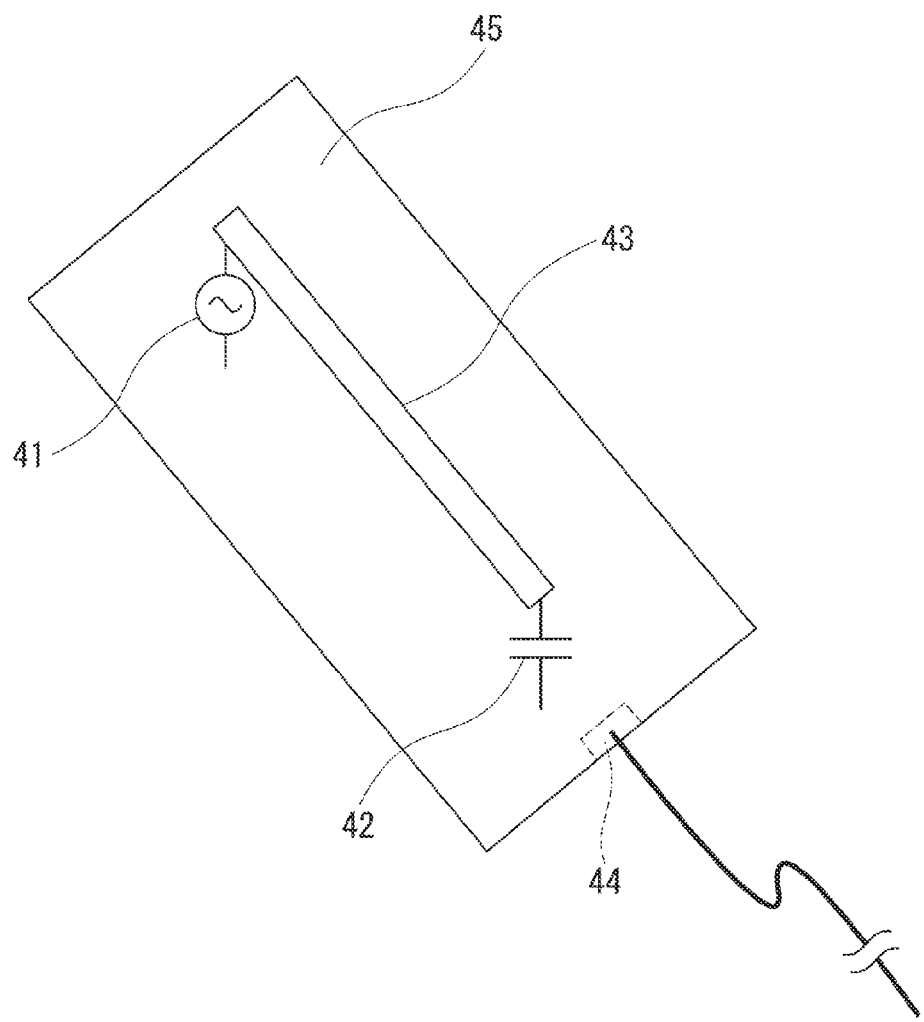
FIG. 34 is a diagram showing an example of information of a printed substrate that is extracted by means of a calculation parameter extraction process in the second exemplary embodiment of the present invention.
Figure 35:
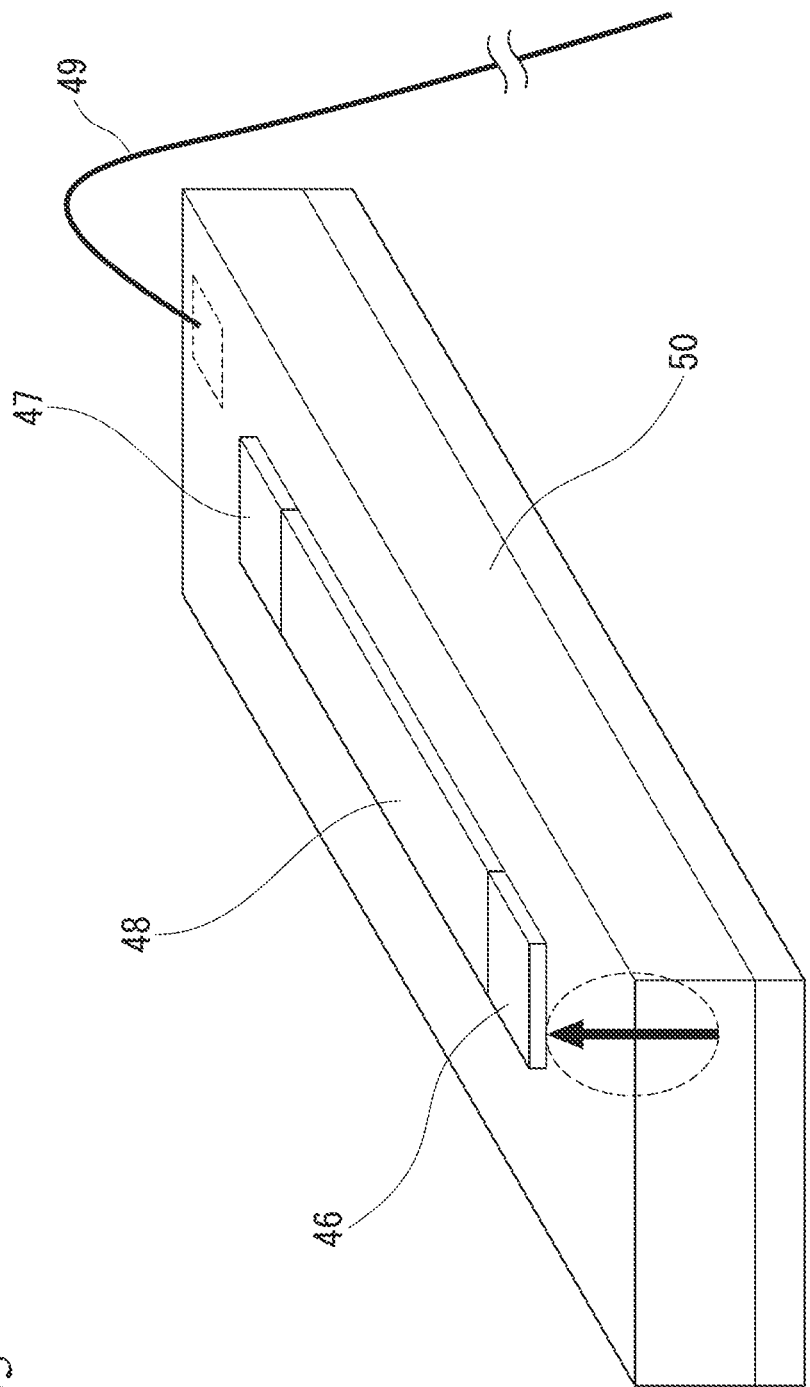
FIG. 35 is a diagram showing an example of an analysis model structure of a printed substrate that is created by means of an analysis model creation process in the third exemplary embodiment of the present invention.

As a specific example, here is shown an operation of this exemplary embodiment in a case where a printed substrate of a configuration with ICs and other components mounted thereon and a cable connected thereto as shown in the horizontal-plane layout of FIG. 32 and the cross-sectional structure of FIG. 33, is taken as input information. First, the input unit 1 of FIG. 2 inputs the substrate design information of the above printed substrate configuration to the EMI characteristic simple calculation unit 7 of FIG. 2. Next, the parameter extraction unit 8 of FIG. 2 extracts parameters required for deriving an EMI characteristic from the input substrate design information. As the EMI characteristic calculation unit 9 of FIG. 2, here is described a case disclosed in Non-Patent Document 1 and/or Non-Patent Document 2 where there is used a system that performs a calculation process for deriving a maximum value characteristic of common mode radiation from a printed substrate with a cable connected thereto. In this case, from the substrate design information of the above printed substrate, there are extracted substrate parameters 45, which are information including: transmission side parameters 41, which are information such as transmission voltage characteristics or transmission current characteristics from a transmission side IC 21, and transmission side impedance; reception side parameters 42, which are information such as wiring termination condition associated with a reception side IC 22 and/or a mounted component 24, and reception side impedance; wiring parameters 43, which are information such as position, length, width, and distance from GND of a substrate signal wiring 23, through which wiring current 27 flows; cable connection parameters 44, which are information such as length of a cable 26, position of a connector 25, and presence/absence of a component to be connected to the cable; and substrate parameters 45, which are information of the horizontal-plane size of the substrate, as shown in FIG. 34. Next, the EMI characteristic calculation unit 9 of FIG. 2 derives a maximum value characteristic of common mode radiation in the above printed substrate, based on the extracted parameters. Then, the EMI condition determination unit 3 of FIG. 2 performs a comparison determination of the maximum value characteristic of common mode radiation of the above printed substrate derived in the EMI characteristic calculation unit 9 against an EMI allowable value characteristic, which is preliminarily prepared in the determination criteria storage unit 4 of FIG. 2. Here is described a case where the maximum value characteristic of the above common mode radiation does not satisfy the EMI allowable value characteristic. In this case, the substrate configuration change unit 5 of FIG. 2 changes the configuration of the printed substrate, which is illustrated in the horizontal-plane layout of FIG. 32 and the cross-sectional structure of FIG. 33, according to a printed substrate configuration change guideline for a case where the EMI allowable value, which is preliminarily prepared within the determination criteria storage unit 4 of FIG. 2, is not satisfied. Then, the substrate design information of the changed printed substrate configuration is again input to the EMI characteristic simple calculation unit 7 of FIG. 2, and the EMI characteristic simple calculation unit 7 derives a maximum value characteristic of common mode radiation with the new configuration. The derived characteristic is compared and determined against the EMI allowable value characteristic in the determination criteria storage unit 4 of FIG. 2. The above process is repeatedly performed. On the other hand, if the EMI condition determination unit 3 of FIG. 2 determines that the derived maximum value characteristic of the common mode radiation satisfies the EMI allowable value characteristic, the output unit 6 of FIG. 2 outputs the printed substrate configuration of the case with the EMI allowable value characteristic being satisfied. As the data output here, in addition to the printed substrate configuration, there may be output the specific change point as to how the printed substrate configuration has been changed, the printed substrate configuration as well as the maximum value characteristic of the common mode radiation at the time of having the configuration, and the result of the comparison against each EMI allowable value characteristic. With these types of information being output, it is possible to determine how much the maximum value characteristic of the common mode radiation has been changed according to the printed substrate configuration change method, and also how much margin the output printed substrate configuration has with respect to the EMI allowable value characteristic. As a result, it becomes possible to perform a quantitative evaluation.

Figure 3:
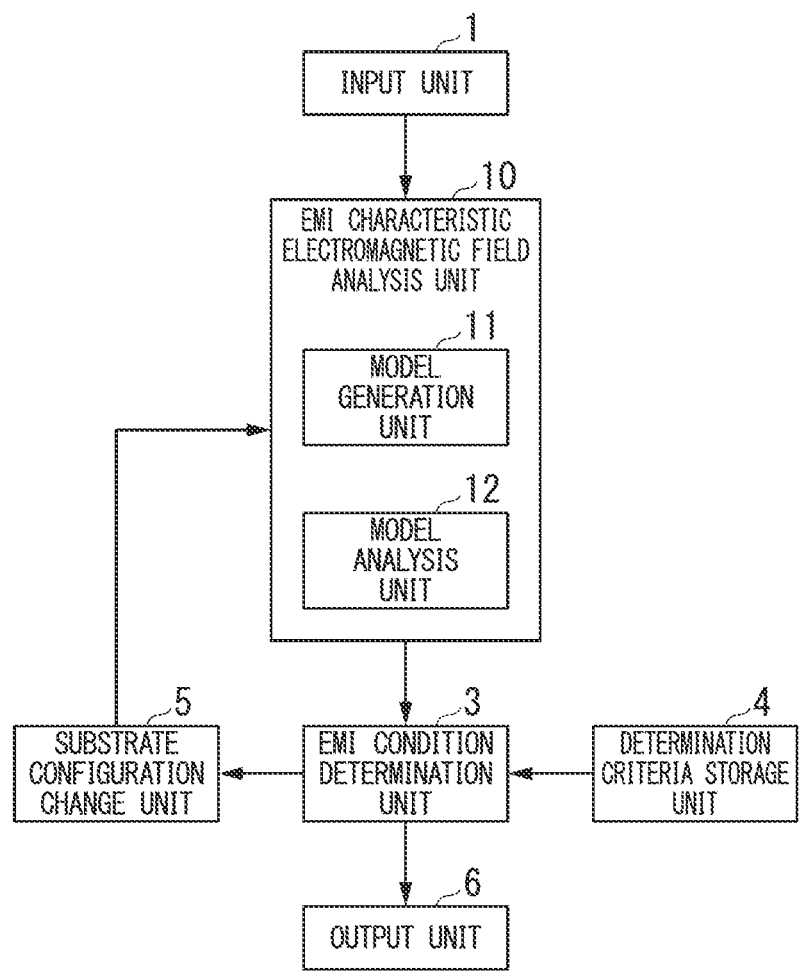
FIG. 3 is a diagram showing an example of a block configuration of a printed substrate design system according to a third exemplary embodiment of the present invention.

FIG. 3 shows an example of a block configuration of a printed substrate design system according to a third exemplary embodiment of the present invention. In the present exemplary embodiment, an EMI characteristic electromagnetic field analysis unit 10 is prepared as the EMI characteristic derivation unit 2 in FIG. 1. This EMI characteristic electromagnetic field analysis unit 10 derives an EMI characteristic from the substrate design information input from the input unit 1 by means of an EMI characteristic electromagnetic field analysis. The EMI characteristic electromagnetic field analysis unit 10 includes a model generation unit 11 and a model analysis unit 12. The model generation unit 11 creates a model for an electromagnetic field analysis from the input substrate design information, and sends the model to the model analysis unit 12. The substrate design information input here includes pattern structures or layer configurations of wiring and planes of a printed substrate as well as materials thereof, and connection information and sizes of respective components including cables and ICs, and physical characteristics. Examples of a model to be created include an electromagnetic field analysis model in which the outer shape and layer structure of a substrate, connection information of a component and/or cable, and information of the physical structure of materials are reproduced, and noise sources such as operating signals of an IC are added. The model analysis unit 12 spatially mesh-divides an analysis model generated by the model generation unit 11 according to the characteristics and analysis precision of a tool, and, based on this information, it finds an EMI characteristic by means of electromagnetic field analysis. For this model analysis unit 12 there may be considered a system that performs analysis by means of an electromagnetic field analysis method such as the FDTD method, the moment method, and the finite element method. Therefore, with use of the EMI characteristic electromagnetic field analysis unit 10 illustrated in this example, it is possible to derive a characteristic of an EMI radiation that occurs from a substrate, based on substrate design information of a printed substrate with the cable connected thereto. If the precision of the electromagnetic field analysis is raised, the result of the analysis results in an increase in calculation cost accordingly. For this reason, within the model analysis unit 12, there may be provided a guideline or an adjustment function based thereon for adjusting the number of divided meshes based on the required analysis precision according to the designing stage of a substrate, so as to avoid increase in calculation cost.

Figure 12:
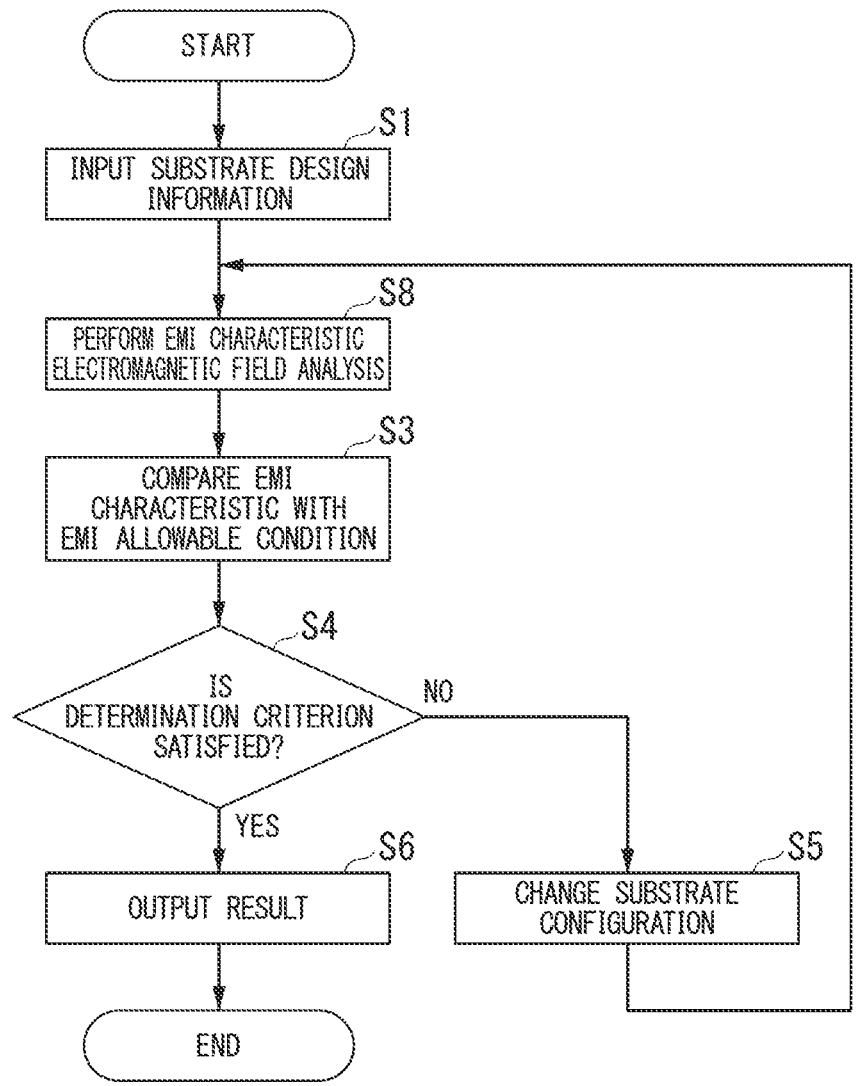
FIG. 12 is a diagram showing a flowchart of the third exemplary embodiment of the present invention.
Figure 17:
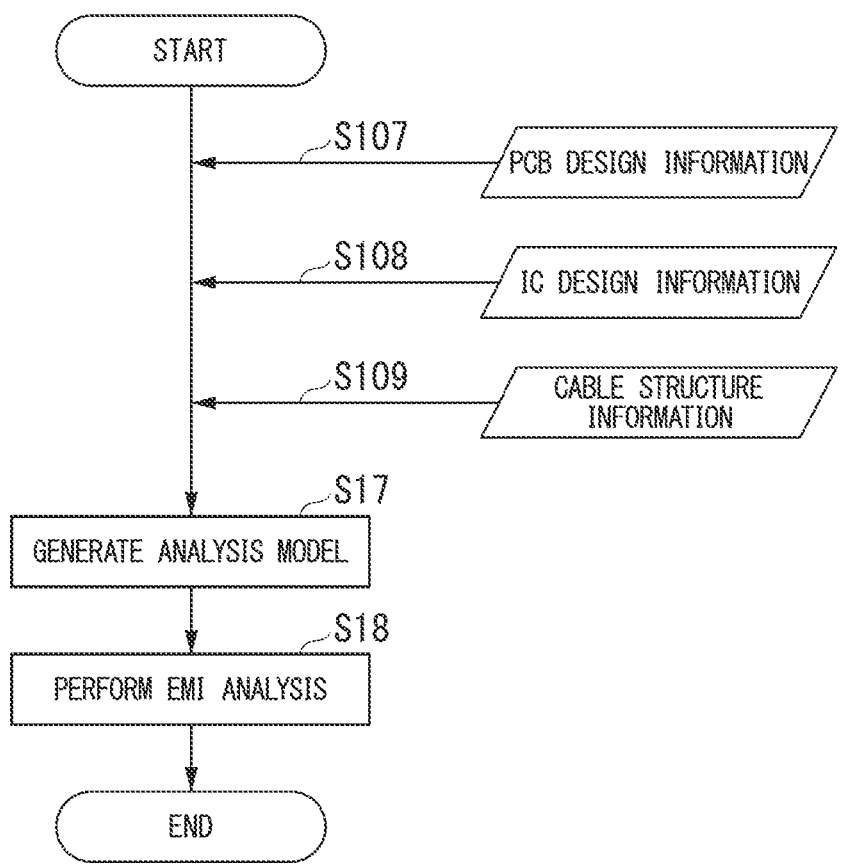
FIG. 17 is a diagram showing a flowchart of an EMI characteristic electromagnetic field analysis process in FIG. 12.

FIG. 12 is a flowchart showing a process of the third exemplary embodiment. In this flowchart, as the EMI characteristic derivation process (S2) illustrated in FIG. 10, an EMI characteristic electromagnetic field analysis process (S8) is performed. This EMI characteristic electromagnetic field analysis process (S8) is performed in the EMI characteristic electromagnetic field analysis unit 10 of FIG. 3. The flowchart shown in FIG. 17 describes an internal process of this EMI characteristic electromagnetic field analysis process (S8). In the flowchart of FIG. 17, first, an analysis model generation process (S17) is performed. In this process, an analysis model required for performing an electromagnetic field analysis is generated, based on the input substrate design information. This analysis model generation process (S17) is performed in the model generation unit 11 of FIG. 3. Next, an EMI analysis process (S18) is performed. In this process, an electromagnetic field analysis is performed on the analysis model that is generated in the analysis model generation process (S17) to derive an EMI characteristic. This EMI analysis process (S18) is performed in the model analysis unit 12 of FIG. 3. As an example of this EMI characteristic electromagnetic field analysis process (S8), here is described a case where there is used a method of deriving a characteristic of EMI that occurs from a printed substrate with a cable connected thereto. In this case, with the analysis model generation process (S17), there is generated an electromagnetic field analysis model in which the outer shape and layer structure of a substrate, the physical structure such as the connection of a component and/or cable, and the material characteristics are reproduced from substrate design information, and noise sources are provided so as to reproduce electric current flowing through signal wirings. With the EMI analysis process (S18), the electromagnetic field analysis model generated in the analysis model generation process (S17) is divided into an appropriate mesh size by the adjustment function that is preliminarily set in the model analysis unit 12 and that is based on a guideline for adjusting the number of meshes to achieve an appropriate mesh size. Furthermore, with the EMI analysis process (S18), an electromagnetic field analysis is performed on the mesh-divided model by means of a mechanism of the FDTD method, and the characteristic of EMI that occurs from the printed substrate is derived.

As a specific example, here is shown an operation of this exemplary embodiment in a case where a printed substrate of a configuration with ICs and other components mounted thereon and a cable connected thereto as shown in the horizontal-plane layout of FIG. 32 and the cross-sectional structure of FIG. 33, is taken as input information. First, the input unit 1 of FIG. 3 inputs the substrate design information of the above printed substrate configuration to the EMI characteristic electromagnetic field analysis unit 10 of FIG. 3. Next, the model generation unit 11 of FIG. 3 extracts parameters required for deriving an EMI characteristic from the input substrate design information. As the model analysis unit 12 of FIG. 3, here is described a case of using a system that performs an electromagnetic field analysis by means of the FDTD method. In this case, an electromagnetic field analysis model of a three-dimensional (hereunder, this may also be referred to as "3D") structure is generated based on transmission side parameters 46, reception side parameters 47, wiring parameters 48, cable connection parameters 49, and substrate parameters 50 obtained from the substrate design information of the above printed substrate. The transmission side parameters 46 are parameters of the only portions required for the analysis that are extracted from a transmission signal source adapted for a three-dimensional analysis for passing wiring electric current 27 from the transmission side IC 21, and from a structure and characteristic of the transmission side IC 21. The reception side parameters 47 are parameters of the only portions required for the analysis that are extracted from structures and characteristics of the reception side IC 22 and the mounted component 24. The wiring parameters 48 are 3D structure information of the substrate signal wiring 23. The cable connection parameters 49 include a position of the connector 26 of the cable 25, structures and characteristics of connected components, and a 3D structure and material information of the cable 25. The wiring parameters 50 are 3D structure information of the substrate. Next, the electromagnetic field analysis model generated in the model analysis unit 12 of FIG. 3 is divided into an appropriate mesh size by the adjustment function that is preliminarily set in the model analysis unit 12 and that is based on a guideline for adjusting the number of meshes to achieve an appropriate mesh size. Furthermore, an electromagnetic field analysis is performed on the mesh-divided model by means of a mechanism of the FDTD method, and the characteristic of EMI that occurs from the printed substrate is derived. Then, the EMI condition determination unit 3 of FIG. 3 performs a comparison determination of the characteristic of EMI occurring from the above printed substrate that is derived in the model analysis unit 12, against an EMI allowable value characteristic, which is preliminarily prepared in the determination criteria storage unit 4 of FIG. 3. Here is described a case where the above EMI characteristic does not satisfy the EMI allowable value characteristic. In this case, in the substrate configuration change unit 5 of FIG. 3, the configuration of the printed substrate, which is illustrated in the horizontal-plane layout of FIG. 32 and the cross-sectional structure of FIG. 33, is changed according to a printed substrate configuration change guideline for a case where the EMI allowable value, which is preliminarily prepared within the determination criteria storage unit 4 of FIG. 3, is not satisfied. The substrate design information of the changed printed substrate configuration is again input to the EMI characteristic electromagnetic field analysis unit 10 of FIG. 3. The EMI characteristic electromagnetic field analysis unit 10 derives a characteristic of EMI that occurs from the printed substrate of the new configuration. The EMI characteristic electromagnetic field analysis unit 10 performs a comparison determination on the derived EMI characteristic against the EMI allowable value characteristic in the determination criteria storage unit 4 of FIG. 3. The above process is repeatedly performed. On the other hand, if the EMI condition determination unit 3 of FIG. 3 determines that the derived characteristic of the EMI occurring from the printed substrate satisfies the EMI allowable value characteristic, the output unit of FIG. 3 outputs the printed substrate configuration of the case with the EMI allowable value characteristic being satisfied. As the data output here, in addition to the printed substrate configuration, there may be output the specific change point as to how the printed substrate configuration has been changed, the printed substrate configuration as well as the EMI characteristic at the time of having the configuration, and the result of the comparison against each EMI allowable value characteristic. With these types of information being output, it is possible to determine how much the EMI characteristic has been changed according to the printed substrate configuration change method, and also how much margin the output printed substrate configuration has with respect to the EMI allowable value characteristic. As a result, it becomes possible to perform a quantitative evaluation.

Figure 4:
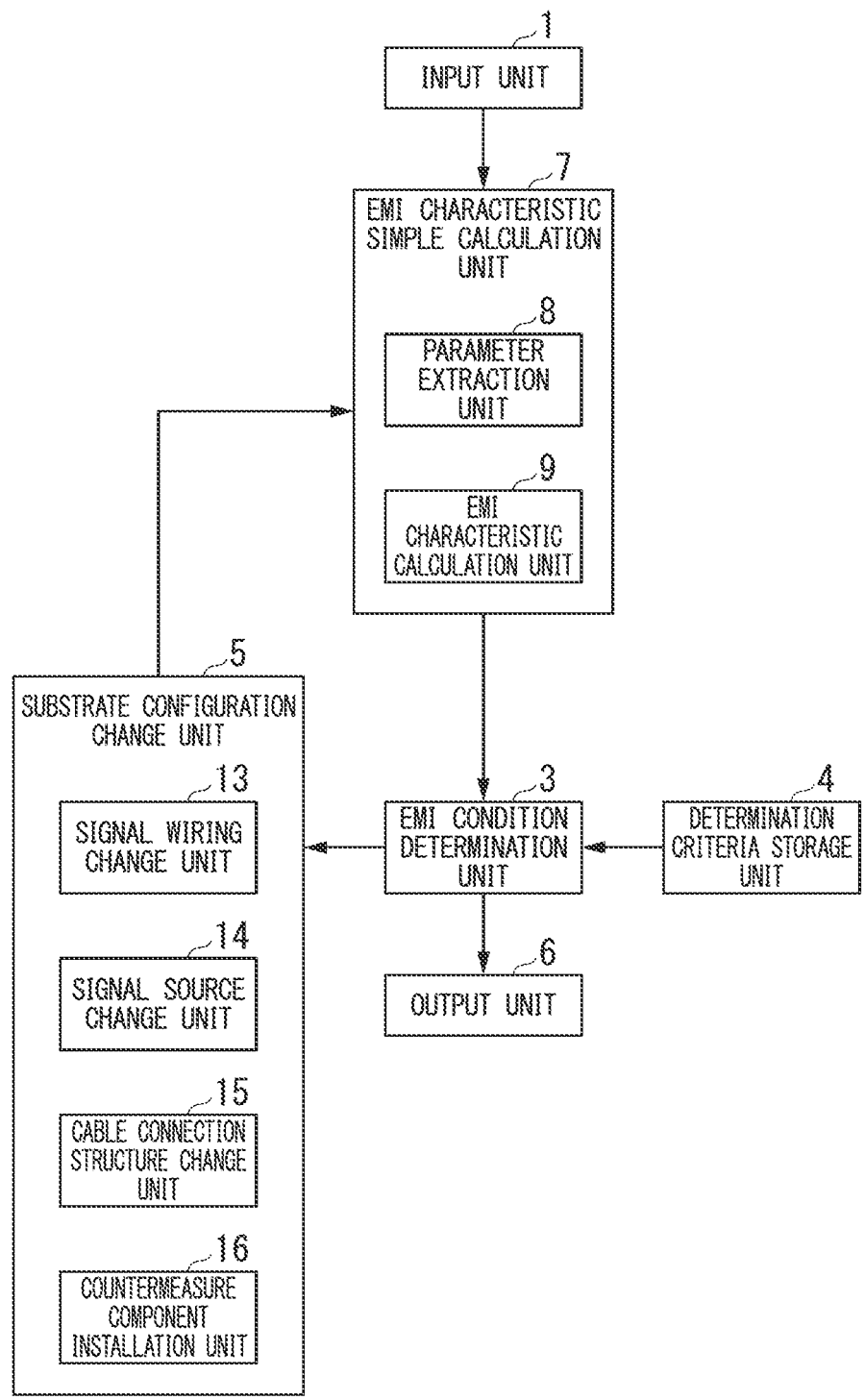
FIG. 4 is a diagram showing an example of a block configuration of a printed substrate design system according to a fourth exemplary embodiment of the present invention.

FIG. 4 shows a configuration of a system according to a fourth exemplary embodiment of the present invention. In the present exemplary embodiment, the substrate configuration change unit 5 in the configuration of the printed substrate design system of the second exemplary embodiment shown in FIG. 2 has a signal wiring change unit 13, a signal source change unit 14, a cable connection structure change unit 15, and a countermeasure component installation unit 16. In this exemplary embodiment, when the input printed substrate configuration is determined to not satisfy the EMI allowable condition in the EMI condition determination unit 3, the substrate configuration change unit 5 changes the printed substrate configuration in any one of the signal wiring change unit 13, the signal source change unit 14, the cable connection structure change unit 15, and the countermeasure component installation unit 16, according to the preliminarily prepared change guideline. Furthermore, the substrate configuration change unit 5 outputs substrate design information with a new printed substrate configuration to the EMI characteristic simple calculation unit 7. The substrate configuration change unit 5 has a plurality of printed substrate change units. These change units are selected according to the preliminarily prepared change guideline, and thereby it becomes possible with use of the present system, to efficiently design a configuration of a low EMI printed substrate.

Figure 13:
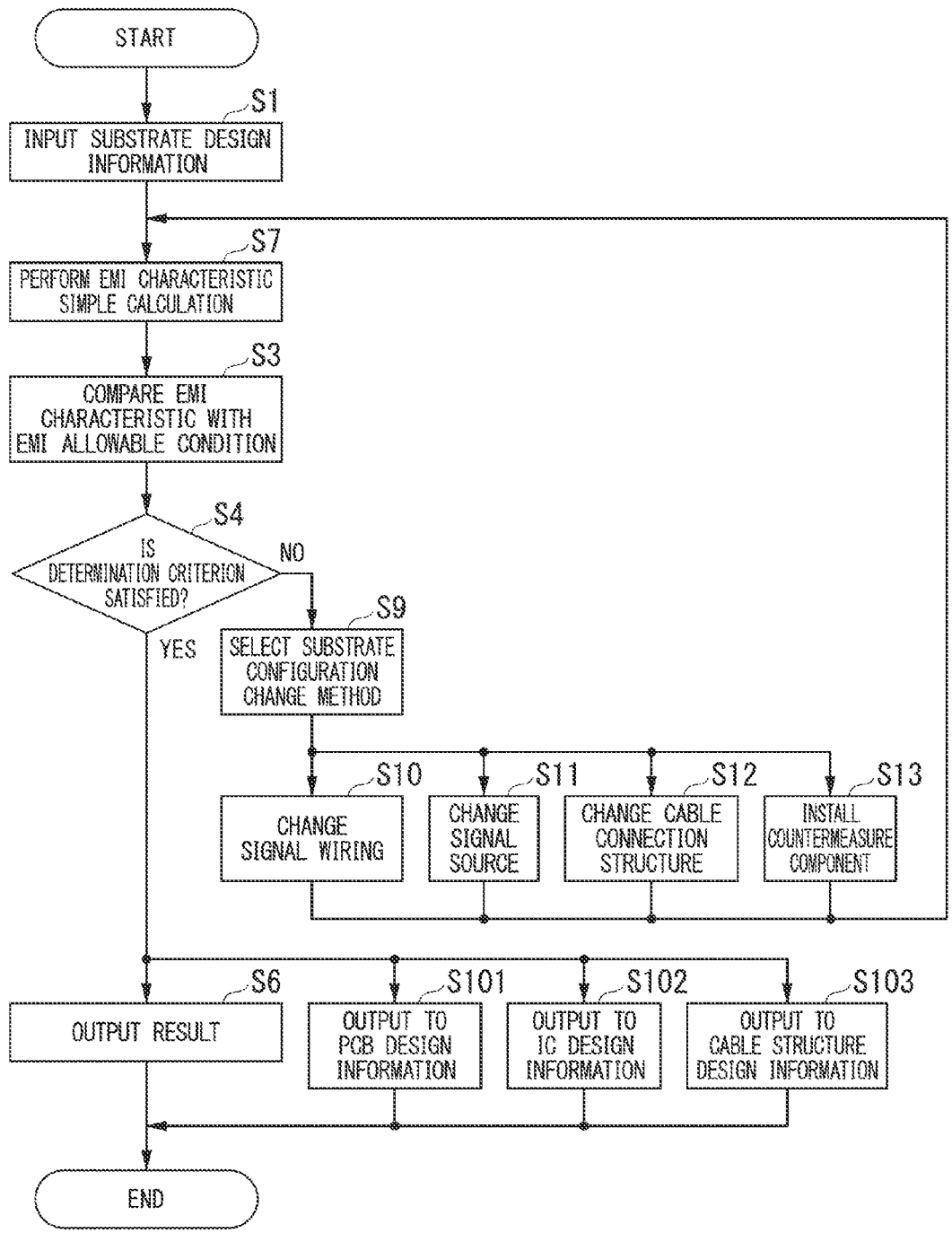
FIG. 13 is a diagram showing a flowchart of the fourth and seventh exemplary embodiments of the present invention.

FIG. 13 is a flowchart showing a process of the fourth exemplary embodiment. In this flowchart, as the substrate configuration change process (S5) illustrated in FIG. 11, a substrate configuration change method selection process (S9) is performed, and as a specific printed substrate change process, there is performed any one of a signal wiring change process (S10), a signal source change process (S11), a cable connection structure change process (S12), and a countermeasure component installation process (S13). As a result of the EMI condition determination process (S4) shown in FIG. 13, which is a process performed in the EMI condition determination unit 3 to determine whether or not the determination criterion is satisfied, if the EMI characteristic derived in the EMI characteristic simple calculation process (S7) of FIG. 13 is determined to not satisfy the EMI allowable condition prepared in the determination criteria storage unit 4 of FIG. 4, the substrate configuration change process of FIG. 13 is performed. First, the substrate configuration change method selection process (S9) is performed. This process is performed in the substrate configuration change unit 5 of FIG. 4. With this process, a method of changing the configuration of the printed substrate is decided. If a change guideline for a case where the EMI allowable condition is not met is preliminarily prepared in the determination criteria storage unit 4 of FIG. 4, this process decides a method of changing the configuration of the printed substrate according to the change guideline. Similarly, by preliminarily preparing, in the determination criteria storage unit 4 of FIG. 4, restrictions for making changes, a suitable substrate structure change process can be selected for the input substrate design information. If the signal wiring change process (S10) is selected as a printed substrate configuration change method in the substrate configuration change method selection process (S9), there is performed an improving process of changing the structure of the printed substrate signal wiring to achieve a lower EMI level. This signal wiring change process (S10) is performed in the signal wiring change unit 13 of FIG. 4. If the signal source change process (S11) is selected as a printed substrate configuration change method in the substrate configuration change method selection process (S9), there is performed an improving process of changing the signal source of signal electric current flowing through the signal wiring of the printed substrate to achieve a lower EMI level. This signal source change process (S11) is performed in the signal source change unit 14 of FIG. 4.

If the cable connection structure change process (S12) is selected as a printed substrate configuration change method in the substrate configuration change method selection process (S9), there is performed an improving process of changing the connection structure of the cable that is connected to the printed substrate to achieve a lower EMI level. This cable connection structure change process (S12) is performed in the signal source change unit 15 of FIG. 4. If the countermeasure component installation process (S13) is selected as a printed substrate configuration change method in the substrate configuration change method selection process (S9), there is performed an improving process of changing the printed substrate structure to a structure with an additional countermeasure component mounted thereon, to achieve a lower EMI level. This countermeasure component installation process (S13) is performed in the countermeasure component installation unit 16 of FIG. 4.

After the substrate configuration change method selection process (S9) and the printed substrate configuration change process (any one of processes S10 through S13) have been performed, substrate design information that is based on the re-improved printed substrate configuration is input to the EMI characteristic simple calculation unit 7 of FIG. 4 again. Furthermore, the EMI characteristic simple calculation process (S7) is performed with the new printed substrate configuration. The processes of the above sequence are repeatedly performed.

Figure 18:
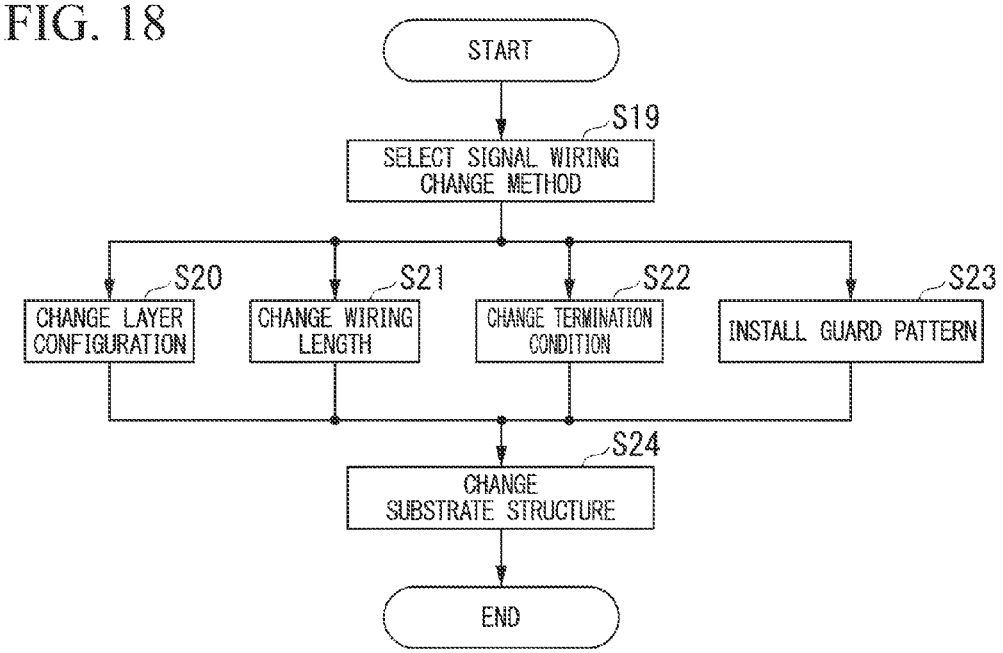
FIG. 18 is a diagram showing a flowchart of a signal wiring change process in FIG. 13.

FIG. 18 shows a specific flowchart of the signal wiring change process (S10) in FIG. 13. The processes of this sequence are all performed in the signal wiring change unit 13 of FIG. 4. First, a signal wiring change method selection process (S19) is performed. In this process, what type of change process is performed for the signal wiring on the printed substrate is selected. In this process, a change guideline for a case where the EMI characteristic derived in the EMI characteristic simple calculation unit 7 of FIG. 4 does not satisfy the EMI allowable value characteristic may be preliminarily prepared in the determination criteria storage unit 4 of FIG. 4, and a process may be selected according to this change guideline. Similarly, by preliminarily preparing, in the determination criteria storage unit 4 of FIG. 4, restrictions for making changes, a suitable substrate structure change process can be selected for the input substrate design information. If a layer configuration change process (S20) is selected, there is performed a process of changing the layer configuration of the signal wiring on the printed substrate so that a lower level of EMI occurring from the printed substrate can be achieved. If a wiring length change process (S21) is selected, there is performed a process of changing the wiring length so that a lower level of EMI occurring from the printed substrate can be achieved. If a termination condition change process (S22) is selected, there is performed a process of changing the termination condition of signal wiring so that a lower level of EMI occurring from the printed substrate can be achieved. If a guard pattern installation process (S23) is selected, there is performed a process of making a change so that a guard pattern is installed in the close vicinity of the signal wiring of the printed substrate. After this signal wiring structure change process (any one of processes S20 through S23) has been performed, a substrate structure change process (S24) is performed. In this process, according to the signal wiring structure change process, a change is made so as to apply the printed substrate structure to the signal wiring structure change. For example, if the layer configuration change process (S20) changes the layer on which signal wiring is disposed, a change is also made to the connected components so as to connect to the signal wiring. When the processes of this sequence have been performed, the signal wiring change process (S10) in FIG. 13 ends.

Figure 22:
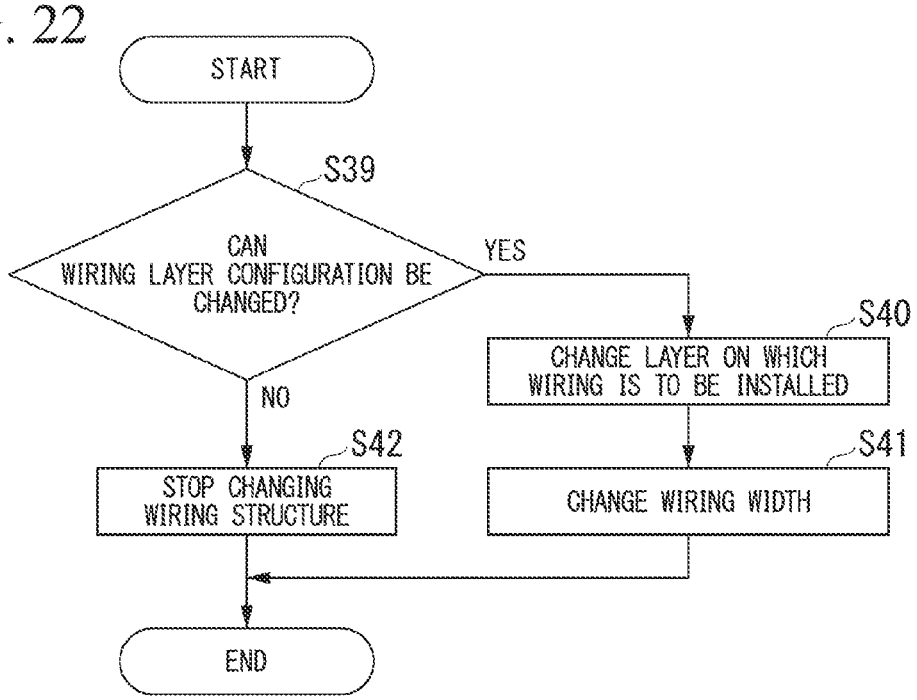
FIG. 22 is a diagram showing an example of a change guideline and an effect of a layer configuration change process of FIG. 18.
Figure 36A:
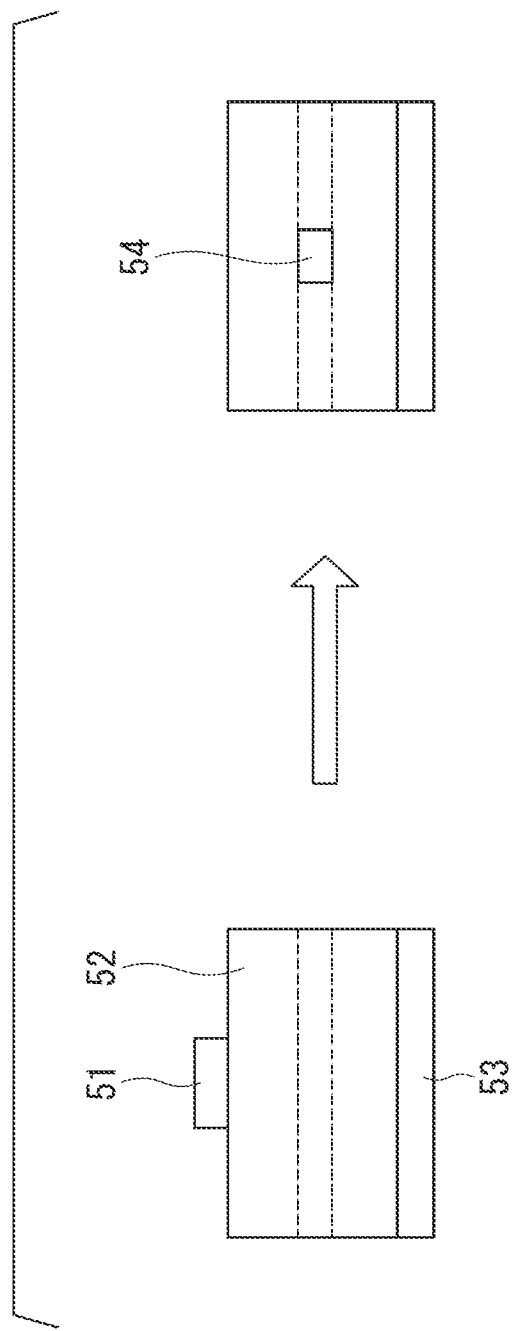
FIG. 36A is a diagram showing an example of a change guideline and an effect of the layer configuration change process of FIG. 22.
Figure 36B:
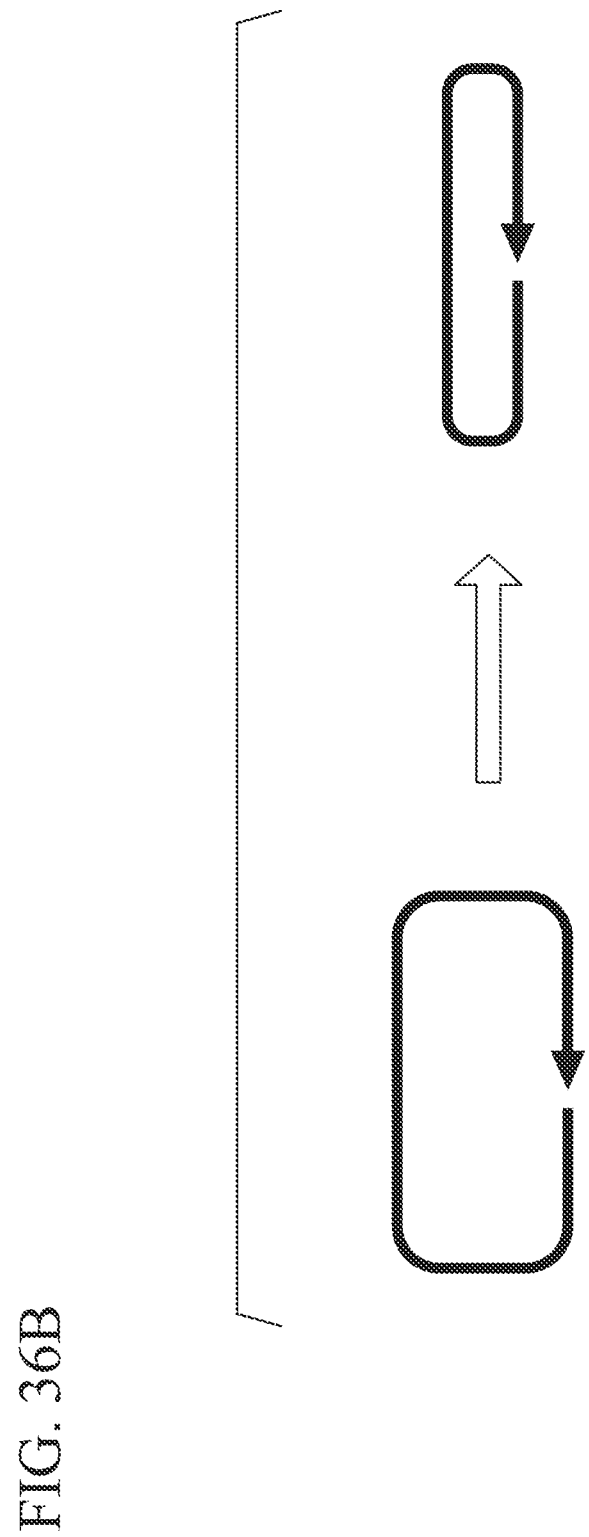
FIG. 36B is a diagram showing an example of a change guideline and an effect of the layer configuration change process of FIG. 22.

FIG. 22 shows a flow of the layer configuration change process (S20) of FIG. 18. As an example of a basic change guideline in this flow, in the cross section of a printed substrate shown in FIG. 36A, a signal wiring 51 on a surface conductor layer is changed to an inner layer wiring 54 in closer vicinity to a GND layer 53 by providing a conductor layer within a dielectric layer 52. In this case, as shown in FIG. 36B, the loop area of the magnetic field that occurs between signal wiring and the GND layer is reduced, and there is obtained an effect in which EMI radiation is suppressed for the loop area reduction. First, a wiring layer configuration change determination process (S39) is performed, and in this process, it is determined whether or not the wiring layer configuration on the printed substrate can be changed. This determination process may be performed according to a change guideline and restriction prepared in the determination criteria storage unit 4 of FIG. 4. If it is determined in this process that the wiring layer configuration can be changed, a wiring installation layer change process (S40) is performed. In this process, the layer on which the wiring is installed is changed according to the design guideline. Next, a wiring width change process (S41) is performed. In this process, the wiring width is changed while maintaining the signal characteristic unchanged even if the layer is changed. When the above processes have been performed, the layer configuration change process (S20) ends. On the other hand, if it is determined in the wiring layer configuration change determination process (S39) that the wiring layer configuration cannot be changed, then, as a wiring structure change stop process (S42), a result stating that wiring structure cannot be changed is output, and the layer configuration change process (S20) ends. If this wiring structure change stop process (S42) is not executed and it is determined in the wiring layer configuration change determination process (S39) that the wiring layer configuration cannot be changed, the layer configuration change process (S20) may be ended. As a specific example, here is described a case where in the determination criteria database, there are preliminarily prepared a guideline such that "the distance between the inner wiring 54 and the GND layer 53 is changed to 300 µm", and a restriction such that "the wiring layer configuration cannot be changed if the thickness of the dielectric layer 52 is less than or equal to 350 µm". In the case where these change guideline and restriction have been prepared, if the thickness of the dielectric layer 52 of FIG. 36A is 500 µm in the input substrate design information, the layer configuration change process (S20) changes the printed substrate configuration to a configuration where the signal wiring 51 on the surface conductor layer of FIG. 36A is changed to an inner layer wiring 54 at a position 300 µm distanced from the GND layer 53. At this time, as a result of the layer configuration change, the substrate structure change process (S24) makes a configuration change, specifically such as adding a connection via, to the structure of an element that is connected to a signal wiring such as a transmission side element and reception side element. As a result, the connection between the element and the signal wiring is maintained. On the other hand, if the thickness of the dielectric layer 52 is 300 µm in the substrate design information, the layer configuration change process (S20) makes no change to the layer configuration, and the printed substrate configuration stays unchanged.

Figure 23:
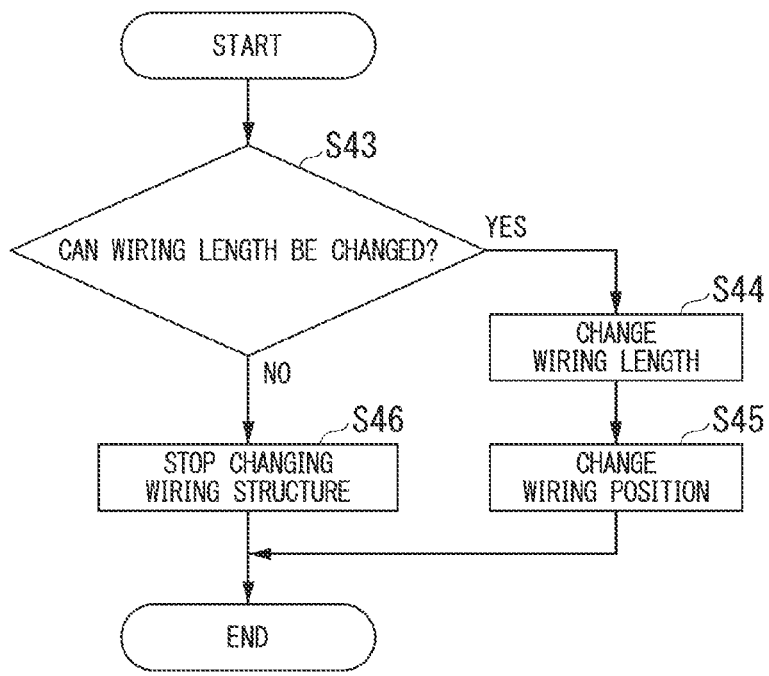
FIG. 23 is a diagram showing a flowchart of a wiring length change process of FIG. 18.
Figure 37A:
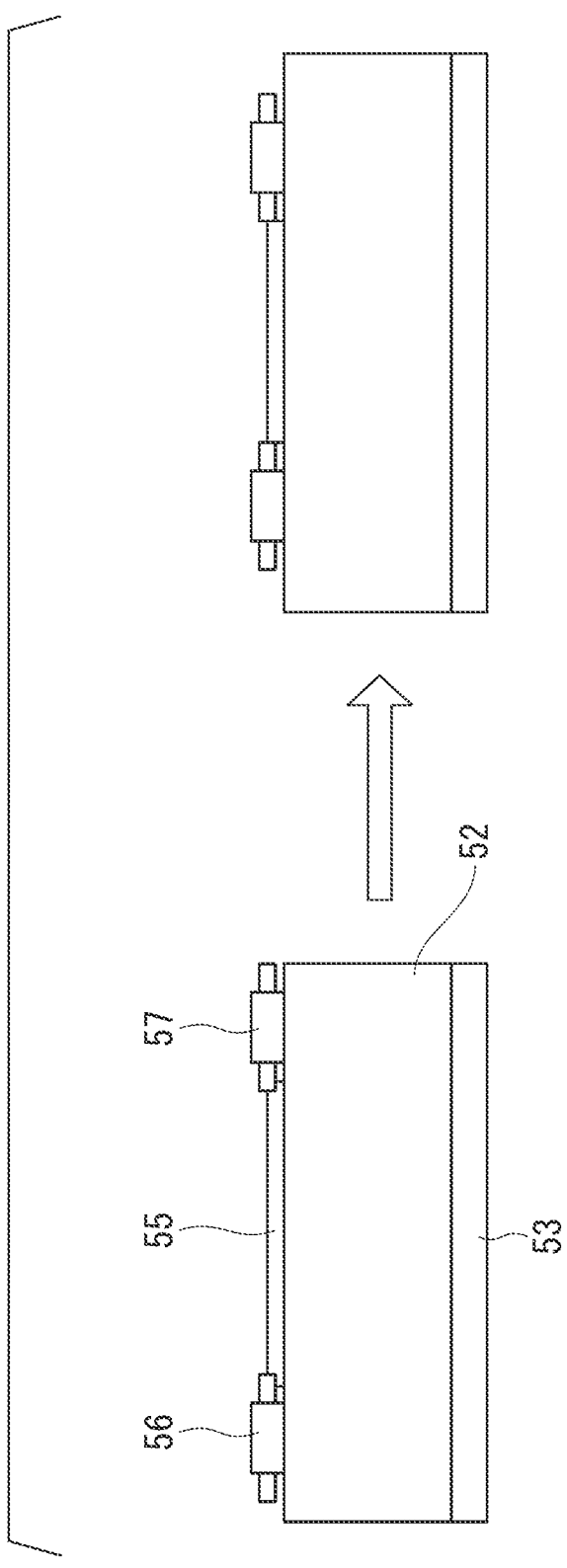
FIG. 37A is a diagram showing an example of a change guideline and an effect of the wiring length change process of FIG. 23.
Figure 37B:
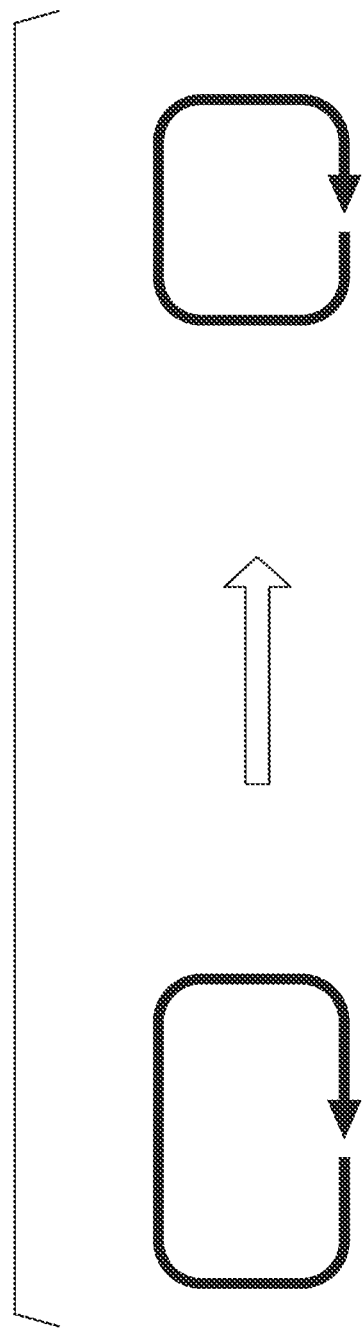
FIG. 37B is a diagram showing an example of a change guideline and an effect of the wiring length change process of FIG. 23.

FIG. 23 shows a flowchart of the wiring length change process (S21) of FIG. 18. An example of the basic change guideline in this flowchart is to reduce the length of the wiring 55, through which electric current flows, in the cross section of the printed substrate shown in FIG. 37A. In this case, as shown in FIG. 37B, the loop area of the magnetic field that occurs between signal wiring and the GND layer is reduced, and there is obtained an effect in which EMI radiation is suppressed for the loop area reduction. First, a wiring length change determination process (S43) is performed. In this process, it is determined whether or not the wiring length can be changed. This determination process may be performed according to a change guideline and restriction prepared in the determination criteria storage unit 4 of FIG. 4. If it is determined in this process that the wiring length can be changed, a wiring length change execution process (S44) is performed. In this process, the length of the wiring is changed according to the design guideline. Next, a wiring position change process (S45) is performed. In this process, a change is made to a specific wiring position, according to the change guideline. When the above processes have been performed, the wiring length change process (S21) ends. On the other hand, if it is determined in the wiring length change determination process (S43) that the wiring length cannot be changed, then, as a wiring structure change stop process (S46), a result stating that wiring structure cannot be changed is output, and the wiring length change process (S21) ends. If this wiring structure change stop process (S46) is not executed and it is determined in the wiring length change determination process (S43) that the wiring layer configuration cannot be changed, the wiring length change process (S21) may be ended. As a specific example, here is described a case where in the determination criteria database, there are preliminarily prepared a guideline such that "the position of a reception side element 57 is changed without moving a transmission side element 56 to reduce the wiring length by 10%", and a restriction such that "the wiring length cannot be changed if the wiring length is less than or equal to 45 mm" In the case where these change guideline and restriction have been prepared, if the wiring length of FIG. 37A is 100 mm in the input substrate design information, the wiring length change process (S21) changes the configuration to a configuration where the wiring 55 of FIG. 37A is of a length of 90 mm from the transmission side element 56. At this time, the substrate structure change process (S24) changes the position of the reception side element 57 to a position so as to connect to the signal wiring 55. On the other hand, if the length of the wiring 55 is 50 mm in the substrate design information, the wiring length becomes 45 mm and the restriction applies thereto when reduced by 10%. Therefore, in this case, the wiring length change process (S21) makes no change to the layer configuration, and the printed substrate configuration stays unchanged.

Figure 24:
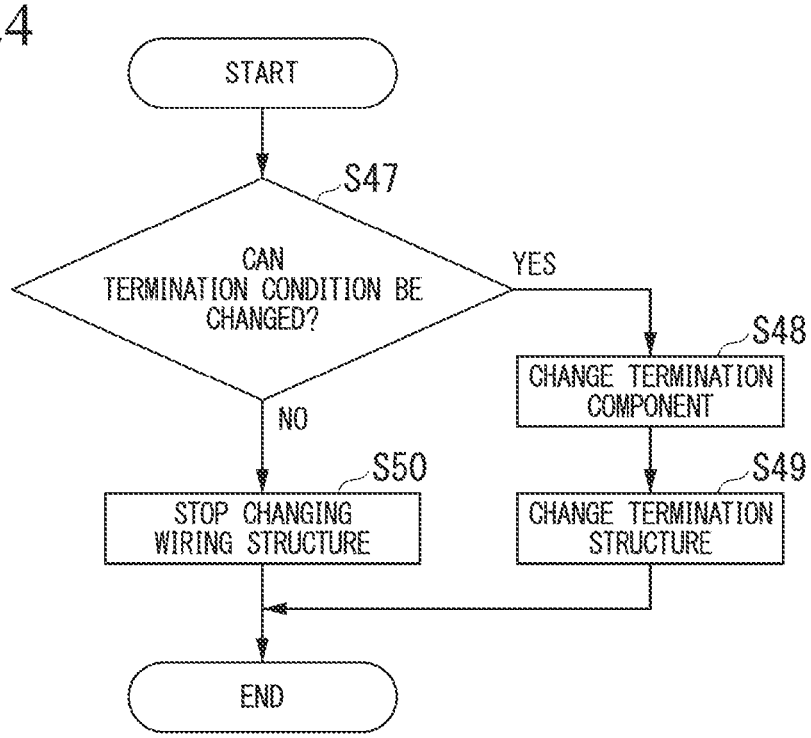
FIG. 24 is a diagram showing a flowchart of a termination condition change process of FIG. 18.
Figure 38B:
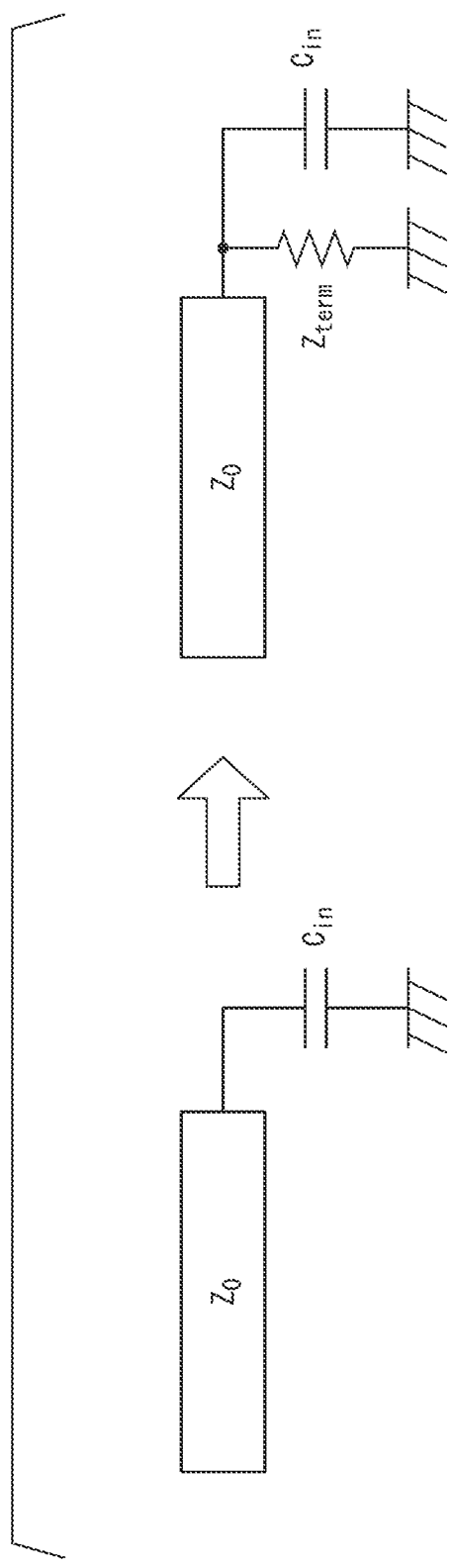
FIG. 38B is a diagram showing an example of a change guideline and an effect of the termination condition change process of FIG. 24.
Figure 38C:
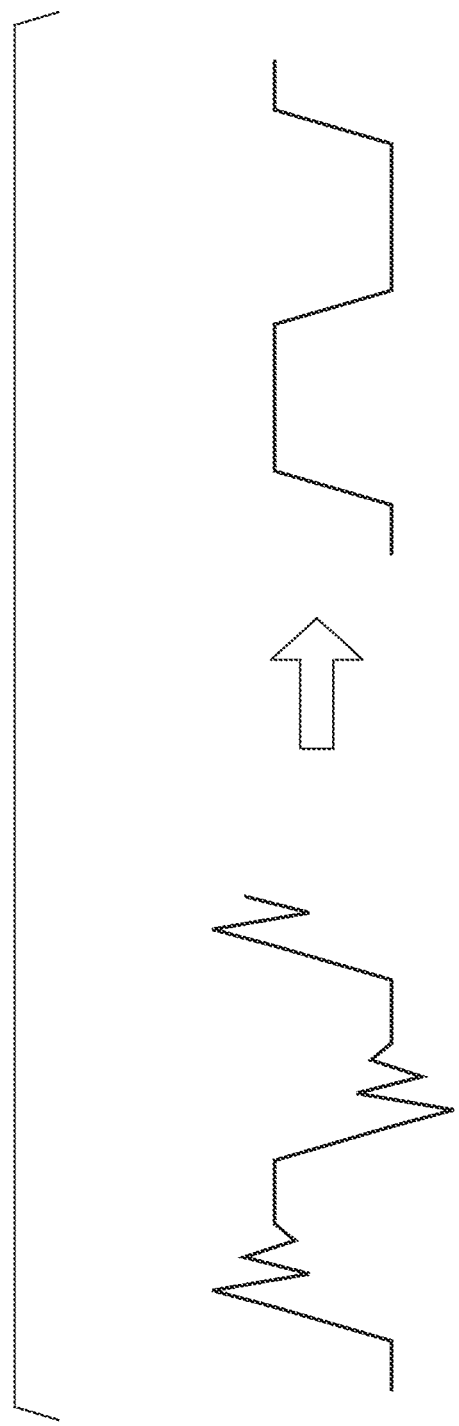
FIG. 38C is a diagram showing an example of a change guideline and an effect of the termination condition change process of FIG. 24.

FIG. 24 shows a flowchart of the termination condition change process (S22) of FIG. 18. An example of the basic change guideline in this flowchart is to change the termination condition with the ground by connecting a termination component 58 such as a resistor element to the reception side element 57 side of the signal wiring 55 shown in FIG. 38A. If no resistor element is inserted, then as shown on the left side of FIG. 38B, the wiring 55 is in a state of being terminated at $C_{in}$, which is an input capacitance of the reception side element 57, and the termination condition is near open. Accordingly, the characteristic impedance $Z_0$ and the impedance on the termination side do not match with each other. As a result, a significant ringing occurs in the signal waveform as shown on the left side of FIG. 38C. On the other hand, if the wiring 55 is in a state of being terminated at $C_{in}$, which is an input capacitance of the reception side element 57, and the termination condition is near open while a resistor element with a resistance value $Z_{term}$ that is close to the characteristic impedance $Z_0$ of the wiring 55 is connected, then the termination condition is nearly matched termination as shown on the right side of FIG. 38B. Accordingly, the signal waveform becomes a waveform with almost no ringing as shown on the right side of FIG. 38C. As a result, there is obtained an effect in which EMI radiation is suppressed for this much. First, a termination condition change determination process (S47) is performed. In this process, it is determined whether or not the termination condition of the wiring can be changed. This determination process may be performed according to a change guideline and restriction prepared in the determination criteria storage unit 4 of FIG. 4. If it is determined in this process that the wiring termination condition can be changed, a termination component change process (S48) is performed. In this process, according to the design guideline, an appropriate termination component for changing the termination condition is added to the reception side of the wiring, or the type of the termination component is changed. Next, a termination structure change execution process (S49) is performed. In this process, if a component is to be added, it is inserted on the termination side of the signal wiring, and if a component is changed, the component connected to the termination side of the signal wiring is changed and disposed. When the above processes have been performed, the termination condition change process (S22) ends. On the other hand, if it is determined in the termination condition change determination process (S47) that the termination condition cannot be changed, then, as a wiring structure change stop process (S50), a result stating that termination condition cannot be changed is output, and the termination condition change process (S22) ends. If this termination condition change stop process (S50) is not executed and it is determined in the termination condition change determination process (S47) that the termination condition of the wiring cannot be changed, the termination condition change process (S22) may be ended. As a specific example, here is described a case where in the determination criteria database, there are preliminarily prepared a change guideline such that "a 50Ω resistor element 56 is added as a termination element 58 on the reception side of the wiring 55", and a restriction such that "a termination element 58 cannot be added if a component other than a reception side element 57 is inserted to the reception side of the wiring 55". In the case where the change guideline and restriction have been prepared, if no component other than the reception side element 57 is connected to the reception side of the wiring 55 of FIG. 38A in the input substrate design information, the termination condition change process (S22) changes the configuration to a configuration where a resistor of resistance value 50Ω is inserted as a termination component 58 to the reception side of the wiring 55 of FIG. 38A. At this time, the substrate structure change process (S24) of FIG. 18 makes a configuration change for a connection terminal of the termination component 58, which is opposite of the terminal connected to the wiring 55, specifically where there is added a connection via with the ground layer. Accordingly, there is provided a configuration of being connected between the signal wiring and the ground layer, and a structure of being terminated to the ground is provided. On the other hand, if the structure is such that a component other than the reception side element 57 is already connected to the reception side of the wiring 55 in the substrate design information, it corresponds to the restriction. Accordingly, in this case, the termination condition change process (S22) makes no change to the wiring termination condition, and the printed substrate configuration stays unchanged.

Figure 25:
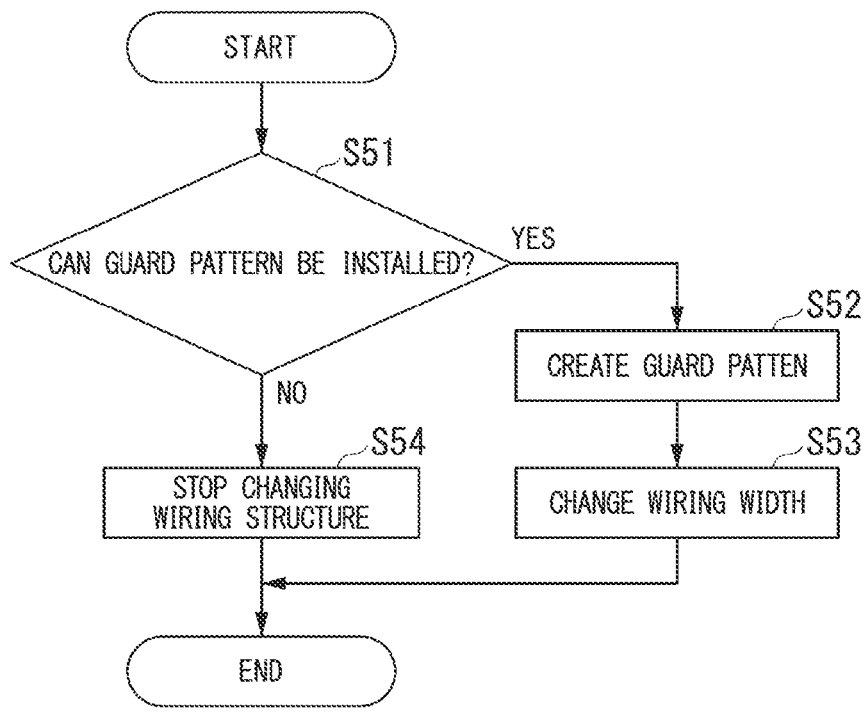
FIG. 25 is a diagram showing a flowchart of a guard pattern installation process of FIG. 18.

FIG. 25 shows a flowchart of a guard pattern installation process (S23) of FIG. 18.

Figure 39A:
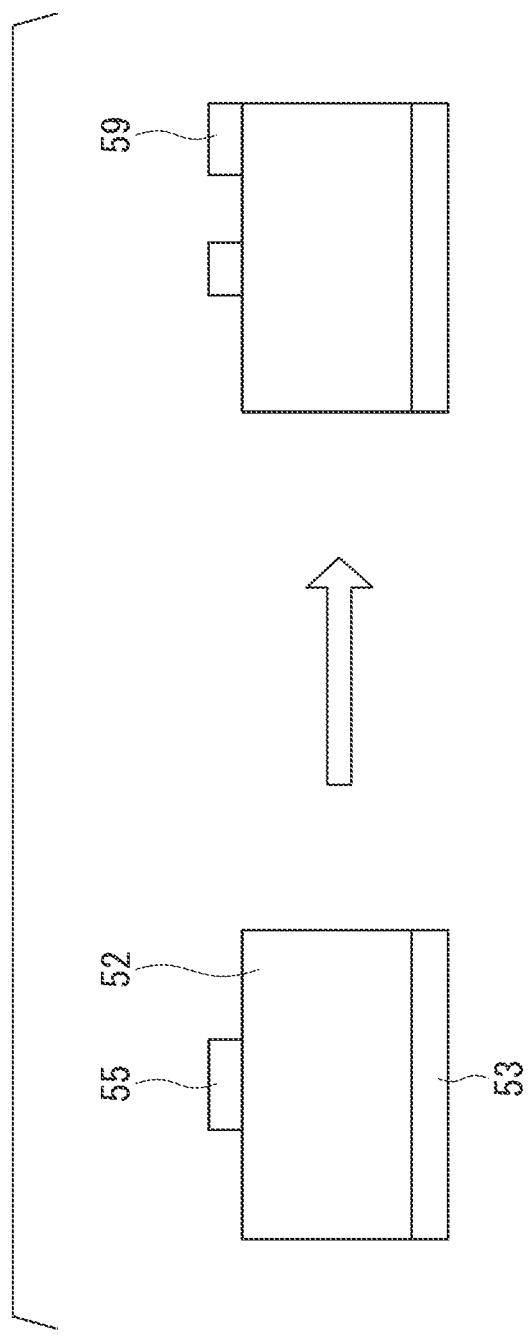
FIG. 39A is a diagram showing an example of a change guideline and an effect of the guard pattern installation process of FIG. 25.
Figure 39B:
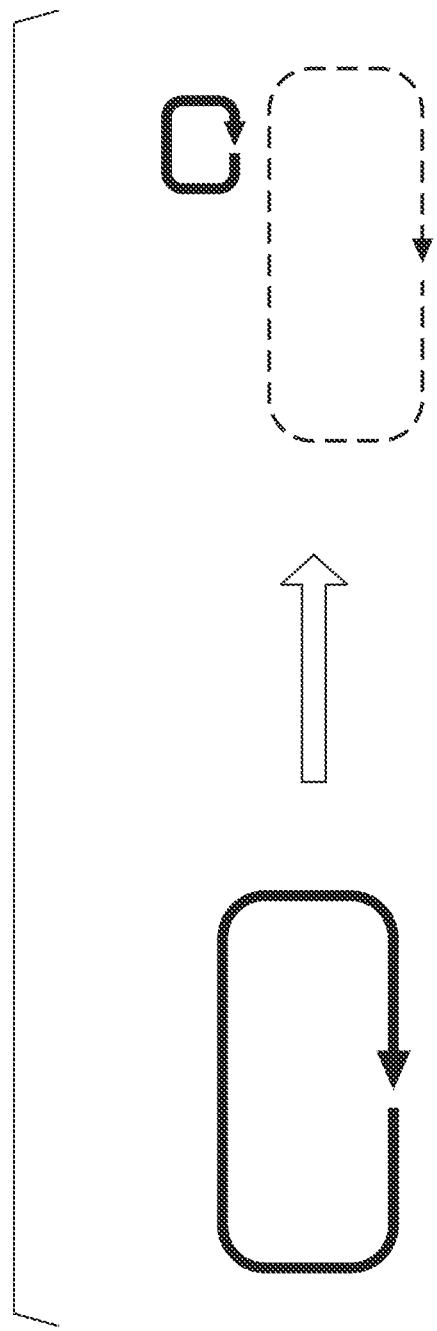
FIG. 39B is a diagram showing an example of a change guideline and an effect of the guard pattern installation process of FIG. 25.

An example of the basic change guideline in this flowchart is to install a guard pattern 59 at a position in the close vicinity of the signal wiring 55 shown in FIG. 39A. In this case, as shown in FIG. 39B, the guard pattern serves as a reference with respect to the signal wiring, and therefore, a small looped magnetic field that occurs between the signal wiring and the guard pattern becomes dominant, and the magnetic field that occurs between the signal wiring and the GND layer becomes smaller. As a result, there is obtained an effect in which EMI radiation is suppressed for this much. First, a guard pattern installation determination process (S51) is performed. In this process, it is determined whether or not a guard pattern can be installed at a position in the close vicinity of the wiring. This determination process may be performed according to a change guideline and restriction prepared in the determination criteria storage unit 4 of FIG. 4. If it is determined in this process that a guard pattern can be installed at a position in the close vicinity of the wiring, a guard pattern creation process (S52) is performed. In this process, a guard pattern is created at a position in the close vicinity of the wiring, according to the design guideline. Next, a wiring width change process (S53) is performed. In this process, the wiring width is changed while maintaining the signal characteristic unchanged even if the guard pattern is changed. When the above processes have been performed, the guard pattern installation process (S23) ends. On the other hand, if it is determined in the guard pattern installation determination process (S51) that no guard pattern can be installed in the close vicinity of the signal wiring, as a wiring structure change stop process (S54), a result stating that no guard pattern can be installed is output, and the guard pattern installation process (S23) ends.

If this wiring structure change stop process (S54) is not executed and it is determined in the guard pattern installation process (S51) that the wiring layer configuration cannot be changed, the guard pattern installation process (S23) may be ended. As a specific example, here is described a case where in the determination criteria database, there are preliminarily prepared a change guideline such that "a guard pattern 59 with 5 mm width is installed parallel with and closely distanced by 1 mm from the wiring 55 while positions each distanced by 5 mm from the transmission side terminal and the reception side terminal of the wiring 55 are taken as both ends thereof", and a restriction such that "no guard pattern can be installed if any component or wiring is present within the 10 mm vicinity of the wiring 55". In the case where these change guideline and restriction have been prepared, if the distance from the wiring 55 of FIG. 39A to the adjacent wiring is 15 mm and no other component is installed in the close vicinity thereof in the input substrate design information, then the guard pattern change process (S23) makes a change so that the configuration becomes such that a 5 mm wide guard pattern is installed parallel with and closely distanced by 1 mm from the wiring 55 of FIG. 39A while positions each distanced by 5 mm from the transmission side terminal and the reception side terminal are taken as both ends thereof. At this time, the guard pattern 59 and the ground layer 53 are connected by a plurality of vias, providing a structure where they are potentially short-circuited. On the other hand, if the structure is such that another wiring or component is present within the 10 mm vicinity of the wiring 55 in the substrate design information, it corresponds to the restriction. As a result, the guard pattern installation process (S23) performs no guard pattern installation, and the printed substrate configuration stays unchanged.

Figure 19:
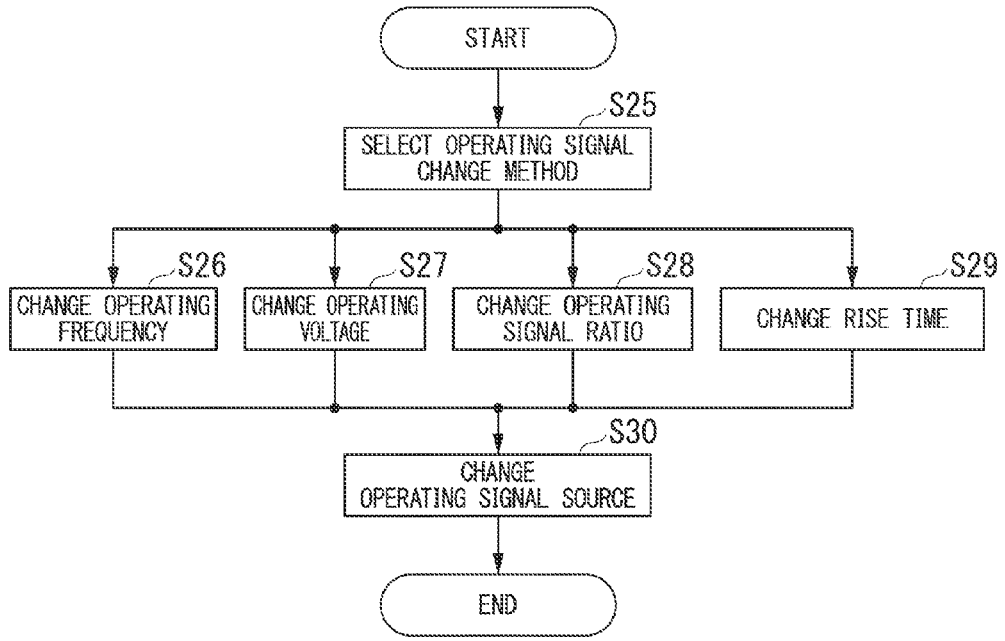
FIG. 19 is a diagram showing a flowchart of a signal source change process in FIG. 13.

FIG. 19 shows a specific flowchart of the signal source change process (S11) in FIG. 13. The processes of this sequence are all performed in the signal source change unit 14 of FIG. 4. First, an operating signal change method selection process (S25) is performed. In this process, there is selected what type of change process is to be performed for the characteristic of wiring electric current 27 flowing through the substrate signal wiring 23 on the printed substrate shown in FIG. 32. In this process, a change guideline for a case where the EMI characteristic derived in the EMI characteristic simple calculation unit 7 of FIG. 4 does not satisfy the EMI allowable value characteristic may be preliminarily prepared in the determination criteria storage unit 4 of FIG. 4, and a process may be selected according to this change guideline. Similarly, by preliminarily preparing, in the determination criteria storage unit 4 of FIG. 4, restrictions for making changes, a suitable characteristic change process for the wiring electric current 27 can be selected with respect to the input substrate design information. If an operating frequency change process (S26) is selected, there is performed a process of changing the operating frequency characteristic of the wiring electric current 27 so that a lower level of EMI occurring from the printed substrate can be achieved. If an operating voltage change process (S27) is selected, there is performed a process of changing the operating signal voltage of the wiring electric current 27 so that a lower level of EMI occurring from the printed substrate can be achieved.

If an operating signal ratio change process (S28) is selected, there is performed a process of changing the switching ratio of the operating signal of the wiring electric current 27 so that a lower level of EMI occurring from the printed substrate can be achieved. If a rise time change process (S29) is selected, there is performed a process of changing the rise time of the wiring electric current 27 so that a lower level of EMI occurring from the printed substrate can be achieved. After the process of changing the characteristic of this operating signal (any one of processes S26 through S29) has been performed, an operating signal generation source change process (S30) is performed. In this process, the operating signal generation source is changed so that the operating signal characteristic of the wiring electric current 27 flowing through the substrate signal wiring 23 becomes the operating signal characteristic that underwent the previous process. For example, if the operating frequency change process (S26) changes the operating frequency of the wiring electric current 27, the frequency of an oscillator for controlling the operating signal frequency in the transmission side IC is changed in order to pass the wiring electric current 27 of the changed operating frequency to the substrate signal wiring 23. When the processes of this sequence have been performed, the signal source change process (S11) in FIG. 13 ends.

Figure 26:
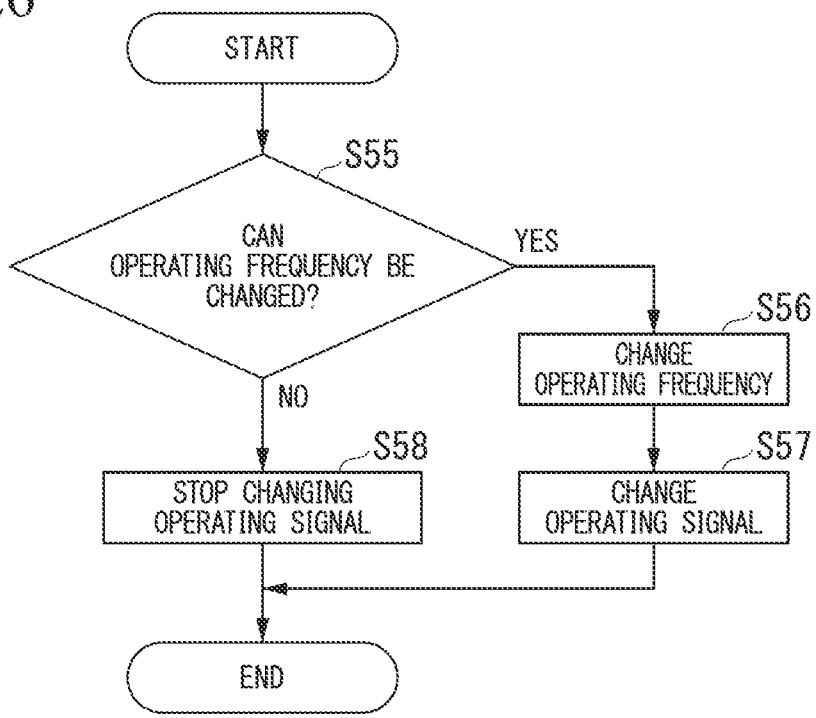
FIG. 26 is a diagram showing a flowchart of an operating frequency change process of FIG. 19.
Figure 40A:
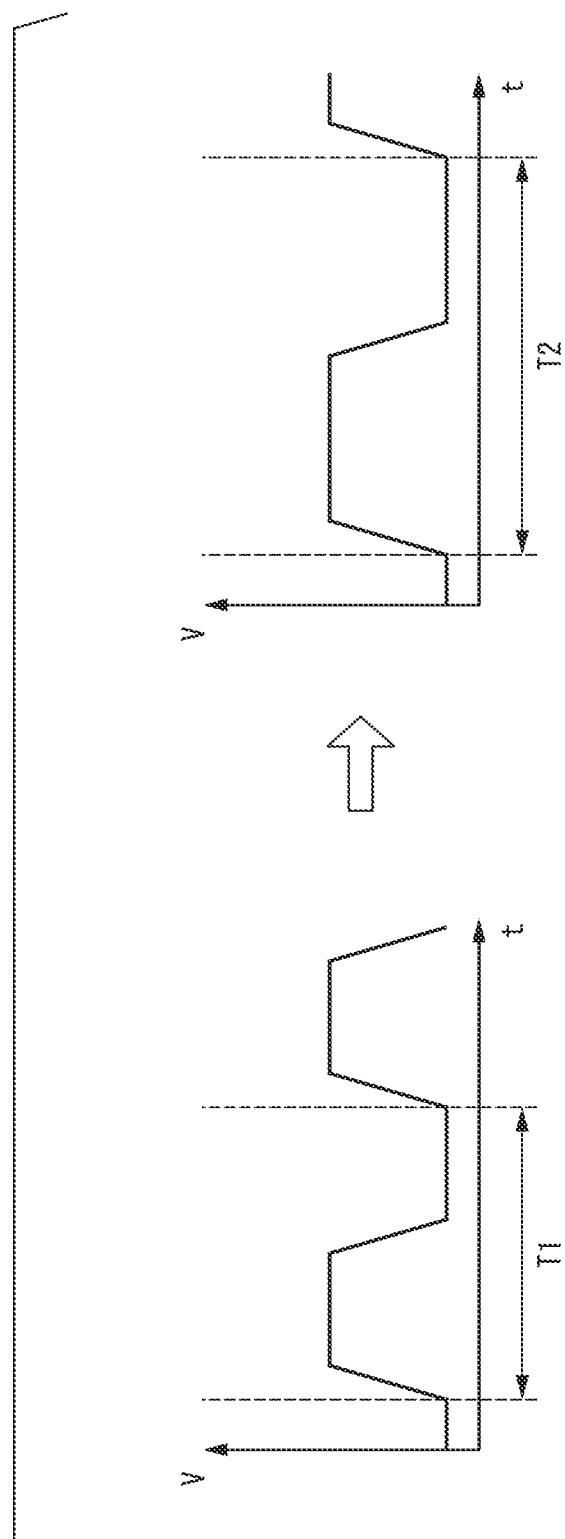
FIG. 40A is a diagram showing an example of a change guideline and an effect of the operating frequency change process of FIG. 26.
Figure 40B:
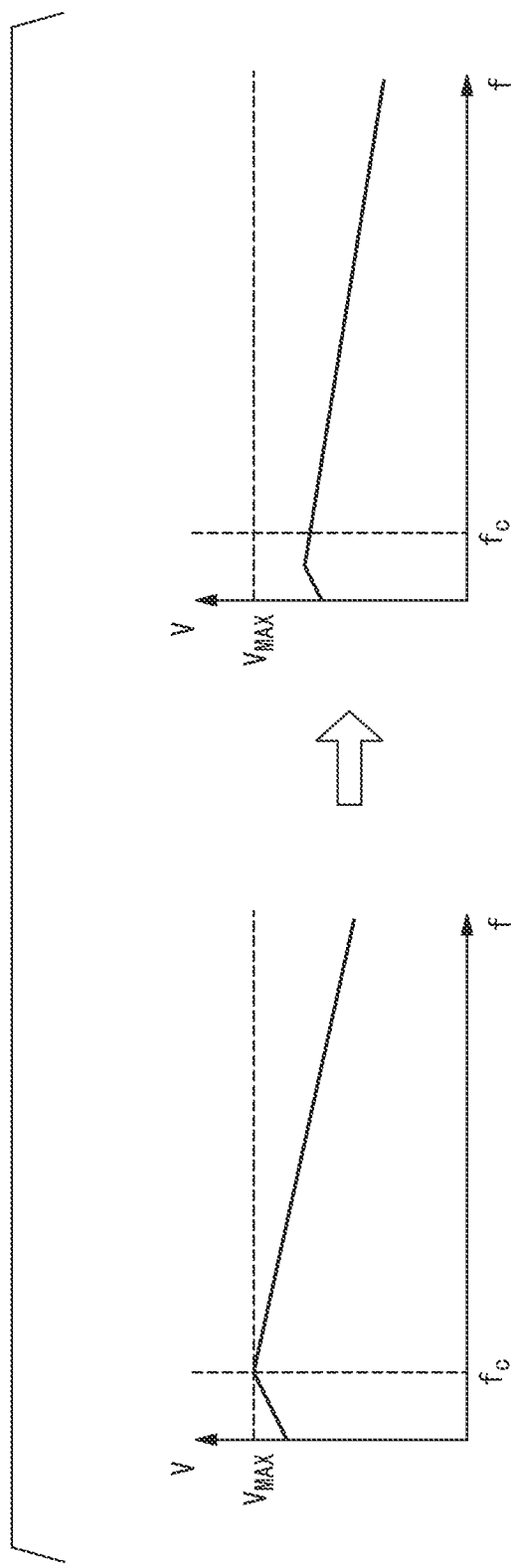
FIG. 40B is a diagram showing an example of a change guideline and an effect of the operating frequency change process of FIG. 26.

FIG. 26 shows a flowchart of the operating frequency change process (S26) of FIG. 19. An example of the basic change guideline in this flow is to change the operating frequency from f1 to f2, in the operating signal characteristic shown in FIG. 40A. FIG. 40A shows that the operating cycle has changed from T1 to T2 as a result of the operating frequency having being changed from f1 to f2. In this case, in the case where a harmonic of the operating frequency f1 overlaps with a resonance frequency $f_C$, which is decided by the structure of a printed substrate and/or a cable, then as shown on the left side of FIG. 40B, the harmonic voltage characteristic of the operating frequency becomes great. As a result, the level of occurring EMI becomes high. With the operating frequency being changed to f2 and the harmonic thereof not overlapping with the resonance frequency $f_C$, the harmonic voltage level at the operating frequency becomes smaller than a characteristic $V_{MAX}$ at the time of the operating frequency f1. As a result, there is obtained an effect in which occurring EMI is suppressed. First, an operating frequency change determination process (S55) is performed. In this process, it is determined whether or not the operating frequency of the wiring electric current can be changed. This determination process may be performed according to a change guideline and restriction prepared in the determination criteria storage unit 4 of FIG. 4. If it is determined in this process that the operating frequency can be changed, an operating frequency change execution process (S56) is performed. In this process, the operating frequency of the wiring electric current is changed according to the design guideline. Next, an operating signal waveform change process (S57) is performed. In this process, the operating signal characteristic of the wiring electric current is changed so as to achieve the changed operating frequency. When the above processes have been performed, the operating frequency change process (S26) ends. On the other hand, if it is determined in the operating frequency change determination process (S55) that the operating frequency cannot be changed, then, as an operating frequency change stop process (S58), a result stating that the operating frequency of the wiring electric current cannot be changed is output, and the operating frequency change process (S26) ends. There may be a case in which, without executing this operating frequency change stop process (S58), the operating frequency change process (S26) ends if it is determined in the operating frequency change determination process (S55) that the operating frequency cannot be changed. As a specific example, here is described a case where in the determination criteria database, there are preliminarily prepared a guideline such that "the operating frequency of the wiring electric current is changed to a 20% reduced value", and a restriction such that "the operating frequency cannot be changed to a frequency lower than or equal to 200 MHz". In the case where the change guideline and restriction have been prepared, if the operating frequency f1 of the wiring electric current of FIG. 40A is 300 MHz (cycle T1≈3.3 ns) in the input substrate design information, the operating frequency change process (S26) changes the operating signal characteristic so that operating frequency f1=300 MHz of the operating signal of FIG. 40A becomes operating frequency f2=240 MHz (cycle T2≈4.2 ns). At this time, the frequency of the oscillator of the transmission side element is also changed by the operating signal generation source change process (S30) in FIG. 19 so as to match the operating frequency. On the other hand, in the case where the operating frequency f1 of the operating signal is 250 MHz (cycle T1=4 ns), if the operating frequency is changed to a 20% reduced value, then the operating frequency f2 becomes equal to 200 MHz (cycle T2=5 ns), and this corresponds to the restriction. As a result, in this case, the operating frequency change process (S26) makes no change to the operating signal, and the printed substrate configuration stays unchanged.

Figure 27:
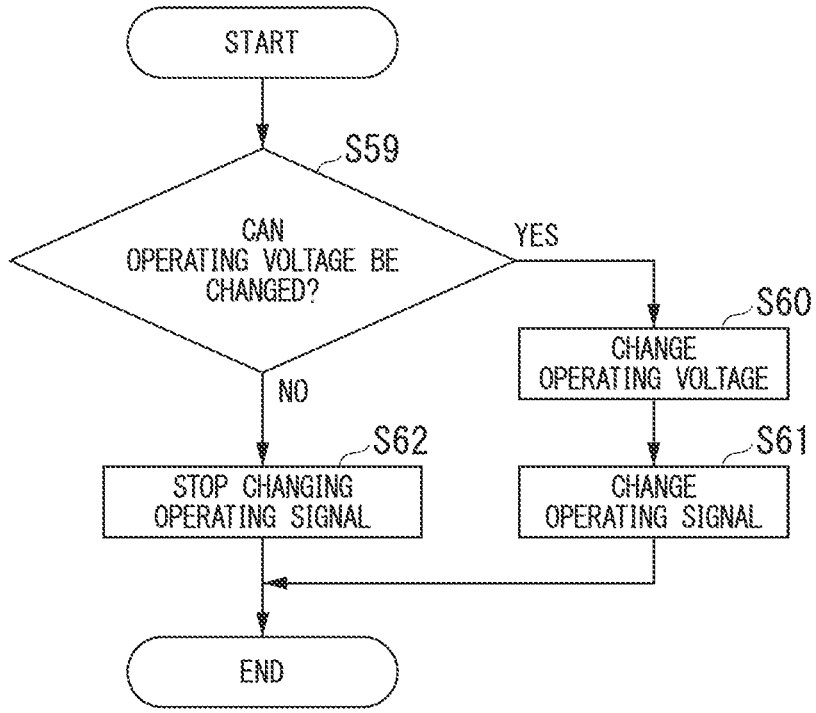
FIG. 27 is a diagram showing a flowchart of an operating voltage change process of FIG. 19.
Figure 41A:
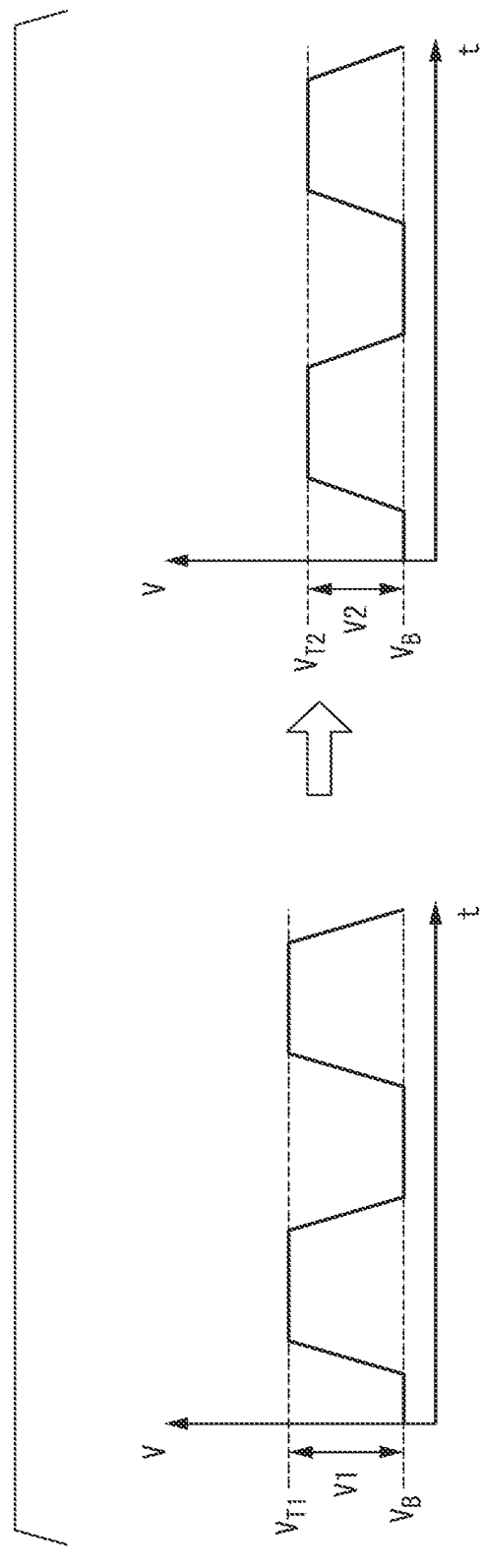
FIG. 41A is a diagram showing an example of a change guideline and an effect of the operating voltage change process of FIG. 27.

FIG. 27 shows a flowchart of the operating voltage change process (S27) of FIG. 19. An example of the basic change guideline in this flow is to change the amplitude of the operating voltage from V1 to V2 (V1>V2), in the operating signal characteristic shown in FIG. 41A. In this case, as shown in FIG. 41B, the harmonic voltage characteristic of the operating frequency is reduced for the amount of the operating voltage amplitude having been reduced. As a result, there is obtained an effect in which occurring EMI is suppressed. First, an operating voltage change determination process (S59) is performed. In this process, it is determined whether or not the amplitude of the operating signal can be changed. This determination process may be performed according to a change guideline and restriction prepared in the determination criteria storage unit 4 of FIG. 4. If it is determined in this process that the operating signal amplitude can be changed, an operating voltage change execution process (S60) is performed. In this process, the operating signal amplitude is changed according to the design guideline. Next, an operating signal waveform change process (S61) is performed. In this process, the operating signal characteristic is changed so as to achieve the changed amplitude value. When the above processes have been performed, the operating voltage change process (S27) ends. On the other hand, if it is determined in the operating voltage change determination process (S59) that the operating signal amplitude cannot be changed, then, as an operating signal change stop process (S62), a result stating that the operating signal amplitude cannot be changed is output, and the operating voltage change process (S27) ends. There may be a case in which, without executing this operating signal change stop process (S62), the operating voltage change process (S27) ends if it is determined in the operating voltage change determination process (S59) that the operating voltage amplitude cannot be changed. As a specific example, here is described a case where in the determination criteria database, there are preliminarily prepared a guideline such that "the maximum value of the operating signal voltage is changed without changing the minimum value of the operating signal voltage, to change the amplitude of the operating signal voltage to a 20% reduced value", and a restriction such that "the operating signal amplitude cannot be changed if the maximum value of the operating signal voltage is lower than or equal to 1.5V". In the case where these change guideline and restriction have been prepared, if the voltage of the operating signal of FIG. 41A in the input substrate design information is of a characteristic such that amplitude V1=1.5V where operating voltage maximum value $V_{T1}$=2.0V and operating voltage minimum value $V_B$=0.5V, the operating voltage change process (S27) changes it to an operating signal characteristic where amplitude V2=1.23V where voltage maximum value $V_{T2}$=1.7V while the minimum value $V_B$=0.5 of the operating voltage of FIG. 41A is maintained unchanged. At this time, the output characteristic of the transmission side element is also changed by the operating signal generation source change process (S30) in FIG. 19 so as to match the change in the operating signal. On the other hand, in the case where the characteristic in the substrate design information is such that the amplitude V1=1.5 where the operating voltage maximum value $V_{T1}$=1.8V and the operating voltage minimum value $V_B$=0.3V, if the amplitude V2 is takes a 20% reduced value 1.2V, the operating voltage maximum value $V_{T2}$=1.5V, and this corresponds to the restriction. Therefore, in this case, the operating voltage change process (S27) makes no change to the operating signal, and the printed substrate configuration stays unchanged.

Figure 28:
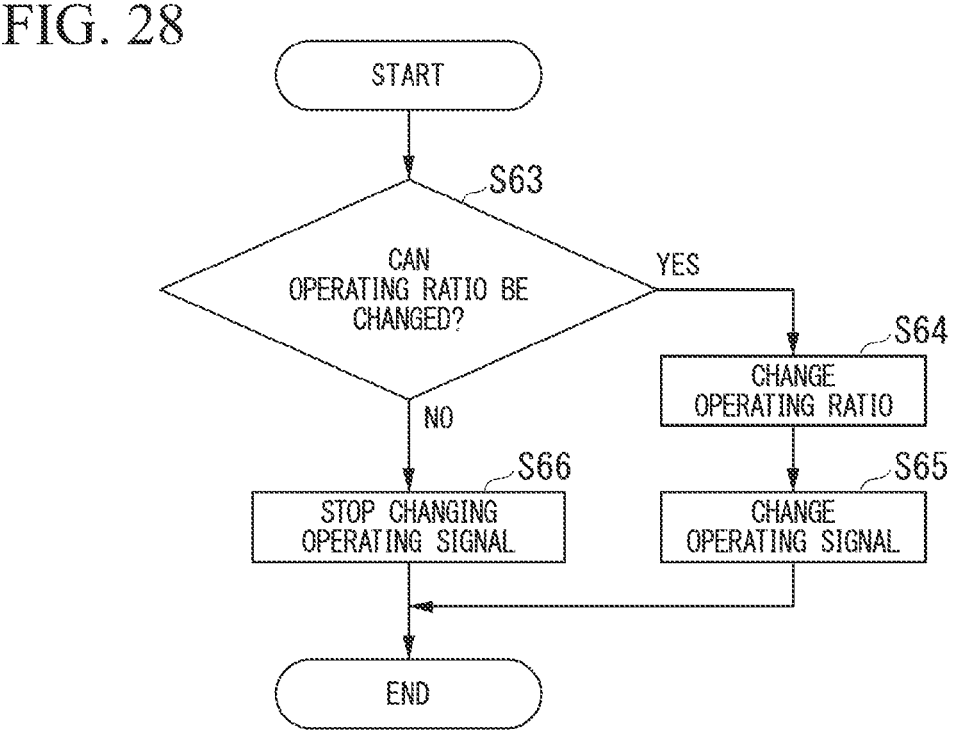
FIG. 28 is a diagram showing a flowchart of an operating signal ratio change process of FIG. 19.

FIG. 28 shows a flowchart of the operating signal ratio change process (S28) of FIG. 19. An example of the basic change guideline in this flowchart is to change the rising side half cycle of the operating signal from $T_{r1}$ to $T_{r2}$ in the operating signal characteristic shown in FIG. 42A. In this case, as shown in FIG. 42B, with the ratio of rising and falling operations of the operating signal having been changed, the voltage characteristic in the proximity of a harmonic component $f_{Tr}$ of the operating signal is lowered as a result of the change in the ratio. As a result, there is obtained an effect in which the harmonic component of occurring EMI is suppressed. First, an operating ratio change determination process (S63) is performed. In this process, it is determined whether or not the ratio of rising and falling operations of the operating signal can be changed. This determination process may be performed according to a change guideline and restriction prepared in the determination criteria storage unit 4 of FIG. 4. If it is determined in this process that the operating ratio of the operating signal can be changed, an operating ratio change execution process (S64) is performed. In this process, the value of the rising side half cycle of the operating signal is changed according to the design guideline. Next, an operating signal waveform change process (S65) is performed. In this process, the operating signal characteristic is changed so as to achieve the changed rising side half cycle value. When the above processes have been performed, the operating signal ratio change process (S28) ends. On the other hand, if it is determined in the operating ratio change determination process (S63) that the operating ratio of the operating signal cannot be changed, then, as an operating signal change stop process (S66), a result stating that the operating ratio of the operating signal cannot be changed is output, and the operating signal ratio change process (S28) ends. There may be a case in which, without executing this operating signal change stop process (S66), the operating signal ratio change process (S28) ends if it is determined in the operating ratio change determination process (S63) that the operating ratio of the operating voltage cannot be changed. As a specific example, here is described a case where in the determination criteria database, there are preliminarily prepared a guideline such that "the rising side half cycle of the operating signal is changed to a 10% reduced value", and a restriction such that "the operating signal ratio cannot be changed if the ratio of the rising side half cycle of the operating signal to one cycle is greater than or equal to 60%".

Figure 42A:
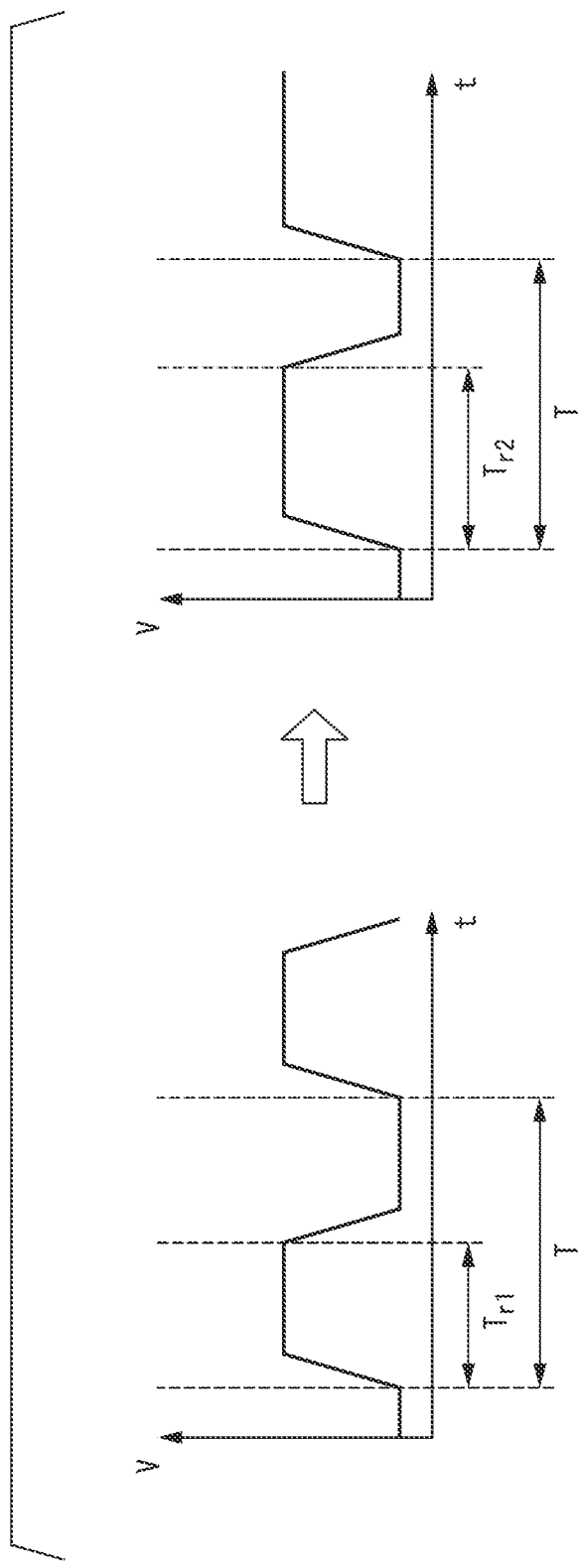
FIG. 42A is a diagram showing an example of a change guideline and an effect of the operating signal ratio change process of FIG. 28.
Figure 42B:
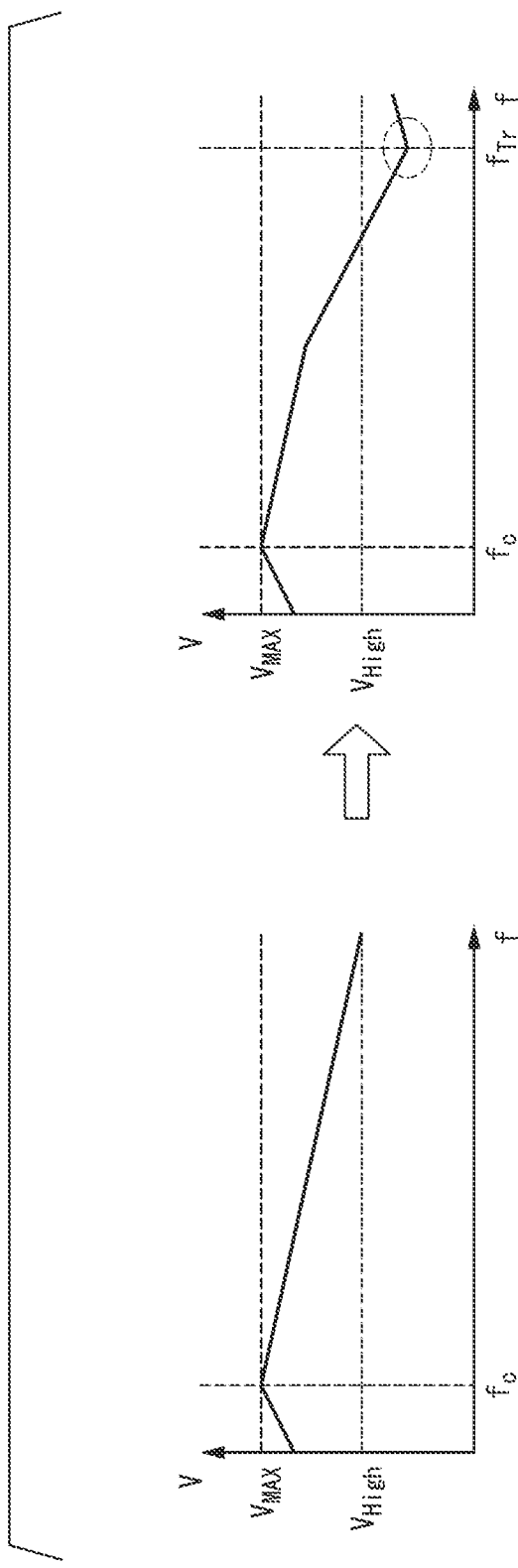
FIG. 42B is a diagram showing an example of a change guideline and an effect of the operating signal ratio change process of FIG. 28.

In the case where the change guideline and restriction have been prepared, if the operating signal characteristic of FIG. 42A in the input substrate design information is a characteristic such that rising side half cycle $T_{r1}$=25 ns where cycle T=50 ns, the operating signal ratio change process (S28) changes it to an operating signal characteristic such that rising side half cycle $T_{r1}$=27.5 ns. At this time, the output characteristic of the transmission side element is also changed by the operating signal generation source change process (S30) in FIG. 19 so as to match the change in the operating signal. On the other hand, in the case where the operating signal characteristic in the substrate design information is a characteristic such that rising side half cycle $T_{r1}$=28 ns where cycle T=50 ns, if the rising side half cycle $T_{r1}$ takes a 10% increased value $T_{r2}$=30.8 ns, $T_{r2}/T$=61.6% and this corresponds to the restriction. Therefore, in this case, the operating signal ratio change process (S28) makes no change to the operating signal, and the printed substrate configuration stays unchanged.

Figure 29:
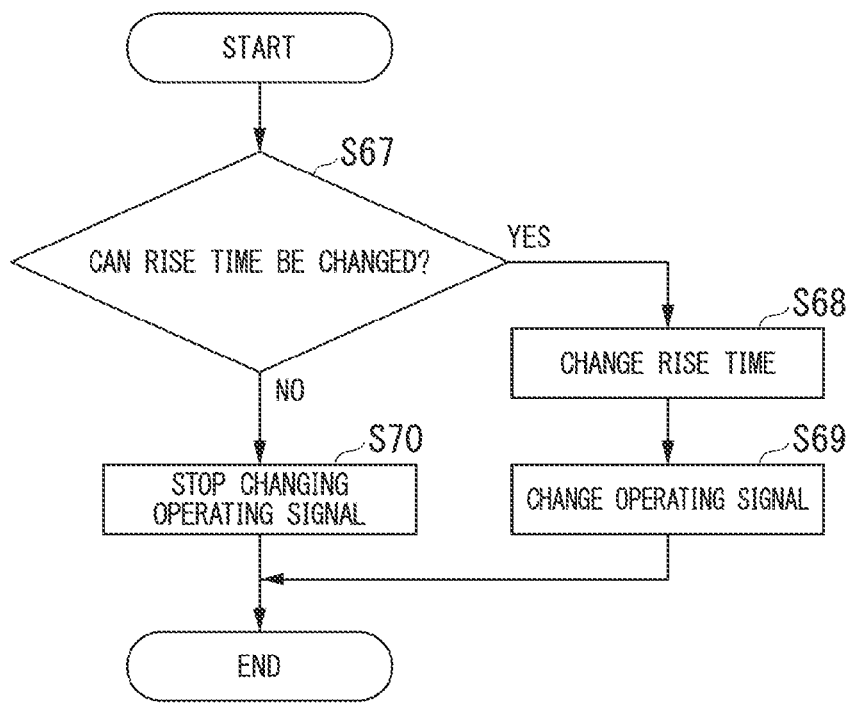
FIG. 29 is a diagram showing a flowchart of a rise time change process of FIG. 19.

FIG. 29 shows a flowchart of the rise time change process (S29) of FIG. 19.

Figure 43A:
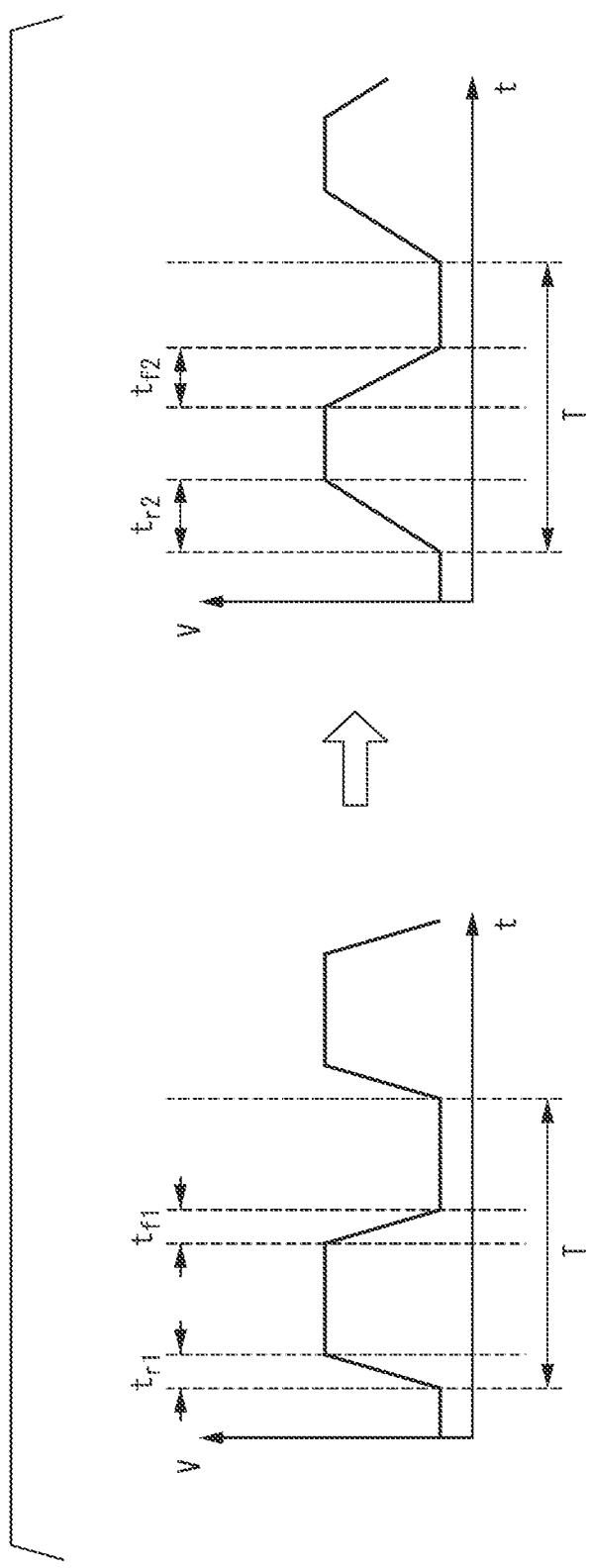
FIG. 43A is a diagram showing an example of a change guideline and an effect of the rise time change process of FIG. 29.
Figure 43B:
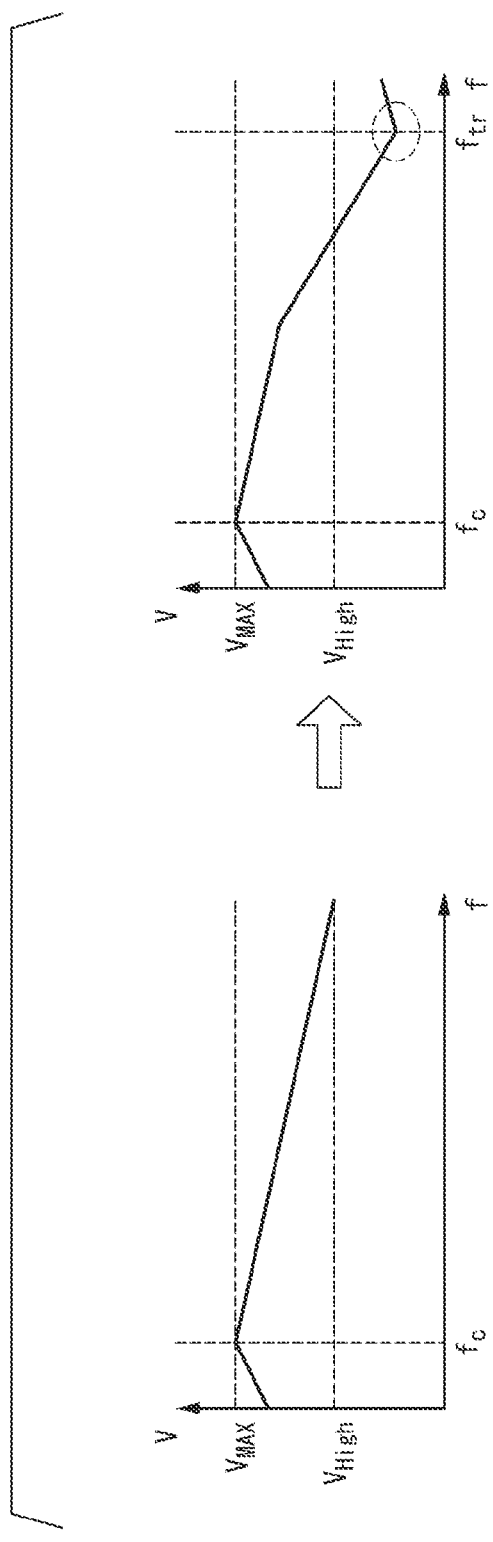
FIG. 43B is a diagram showing an example of a change guideline and an effect of the rise time change process of FIG. 29.

An example of the basic change guideline in this flowchart is to change the rise time of the operating signal from $t_{r1}$ to $t_{r2}$ in the operating signal characteristic shown in FIG. 43A. To match the change in the rise time, the fall time of the operating signal may also similarly changed from $t_{f1}$ to $t_{f2}$. In this case, as shown in FIG. 43B, with the rise time and fall time of the operating signal having been changed, the voltage characteristic in the proximity of a harmonic component $f_{Tr}$ of the operating signal is lowered as a result of the change. As a result, there is obtained an effect in which the harmonic component of occurring EMI is suppressed. First, a rise time change determination process (S67) is performed. In this process, it is determined whether or not the rise time and fall time of the operating signal can be changed. This determination process may be performed according to a change guideline and restriction prepared in the determination criteria storage unit 4 of FIG. 4. If it is determined in this process that the rise time and fall time of the operating signal can be changed, a rise time change execution process (S68) is performed. In this process, the values of the rise time and fall time of the operating signal are changed according to the design guideline. Next, an operating signal waveform change process (S69) is performed. In this process, the operating signal characteristic is changed so as to achieve the changed values of the rise time and fall time. When the above processes have been performed, the rise time change process (S29) ends. On the other hand, if it is determined in the rise time change determination process (S67) that the rise time and fall time of the operating signal cannot be changed, then, as an operating signal change stop process (S70), a result stating that the rise time and fall time of the operating signal cannot be changed is output, and the rise time change process (S29) ends. There may be a case in which, without executing this operating signal change stop process (S70), the rise time change process (S29) ends if it is determined in the rise time change determination process (S67) that the rise time and fall time of the operating signal cannot be changed. As a specific example, here is described a case where in the determination criteria database, there are preliminarily prepared a guideline such that "the rise time and fall time of the operating signal is changed to values of 1.5 times those thereof", and a restriction such that "the rise time and fall time of the operating signal cannot be changed if the ratio of the rise time of the operating signal to one cycle is greater than or equal to 20%". In the case where the change guideline and restriction have been prepared, if the operating signal characteristic of FIG. 43A in the input substrate design information is a characteristic such that rise time $t_{r1}$=5 ns and fall time $t_{r1}$=5 ns where cycle T=50 ns, the rise time change process (S29) changes it to an operating signal characteristic such that rise time $t_{r2}$=7.5 ns and fall time $t_{f2}$=7.5 ns. At this time, the output characteristic of the transmission side element is also changed by the operating signal generation source change process (S30) in FIG. 19 so as to match the change in the operating signal. On the other hand, in the case where the operating signal characteristic in the substrate design information is a characteristic such that rise time $t_{r1}$=8 ns and fall time $t_{f1}$=8 ns where cycle T=50 ns, if the rise time takes a value of 1.5 times thereof $t_{r2}$=12 ns, then $t_{r2}/T$=24%, and this corresponds to the restriction. Therefore, in this case, the rise time change process (S29) makes no change to the operating signal, and the printed substrate configuration stays unchanged.

Figure 20:
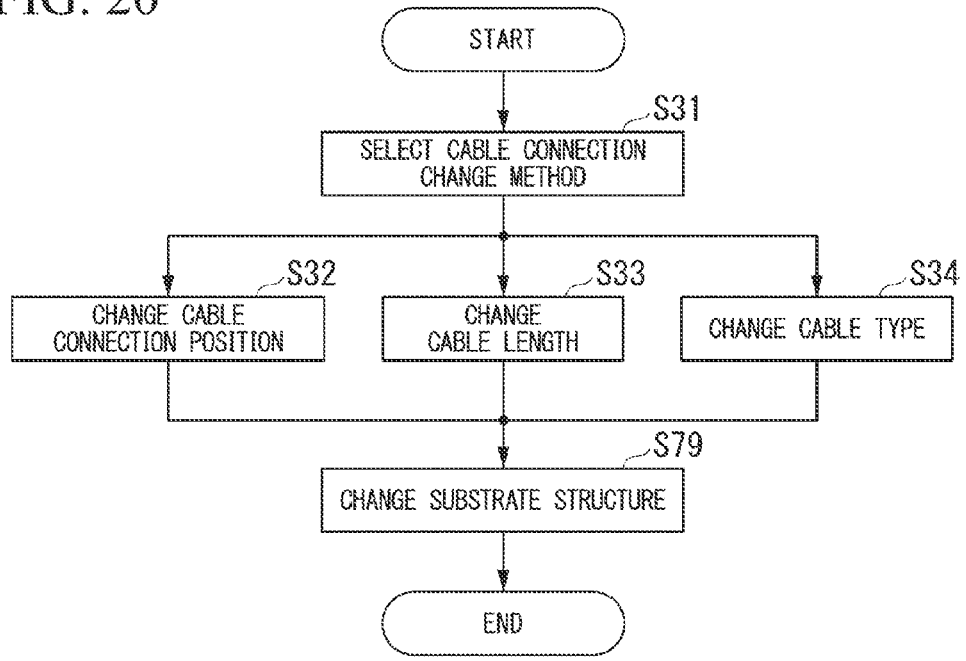
FIG. 20 is a diagram showing a flowchart of a cable connection structure change process in FIG. 13.

FIG. 20 shows a specific flowchart of the cable connection structure change process (S12) in FIG. 13. The processes of this sequence are all performed in the cable connection structure change unit 15 of FIG. 4. First, a cable connection change method selection process (S31) is performed. In this process, there is selected what type of change process is to be performed for the structures of a cable 26 on the printed substrate and a connector 25 that connects the cable 26 shown in FIG. 34. In this process, a change guideline for a case where the EMI characteristic derived in the EMI characteristic simple calculation unit 7 of FIG. 4 does not satisfy the EMI allowable value characteristic may be preliminarily prepared in the determination criteria storage unit 4 of FIG. 4, and a process may be selected according to this change guideline.

Similarly, by preliminarily preparing, in the determination criteria storage unit 4 of FIG. 4, restrictions for making changes, a suitable structure change process for the cable 26 and the connector 25 can be selected for the input substrate design information. If a cable connection position change process (S32) is selected, there is performed a process of changing the structure of the connection positions of the cable 26 and the connector 25 so that a lower level of EMI occurring from the printed substrate can be achieved. If a cable length change process (S33) is selected, there is performed a process of changing the length of the cable 26 so that a lower level of EMI occurring from the printed substrate can be achieved. If a cable type change process (S34) is selected, there is performed a process of changing the type of the cable 26 so that a lower level of EMI occurring from the printed substrate can be achieved. After this process of changing the cable structure (any one of processes S32 through S34) has been performed, a substrate structure change process (S79) is performed. In this process, there is performed a process of changing the configuration of the printed substrate so that the structure of the cable 26 and connector 25 on the printed substrate becomes a structure that has undergone the previous process. For example, in the case where the cable connection position change process (S32) has changed the positions of the cable 26 and the connector 25, the printed substrate structure is changed to a structure in which the position of a via that connected the connector and the ground of the printed substrate is moved to a changed position. When the processes of this sequence have been performed, the cable connection structure change process (S12) in FIG. 13 ends.

Figure 30:
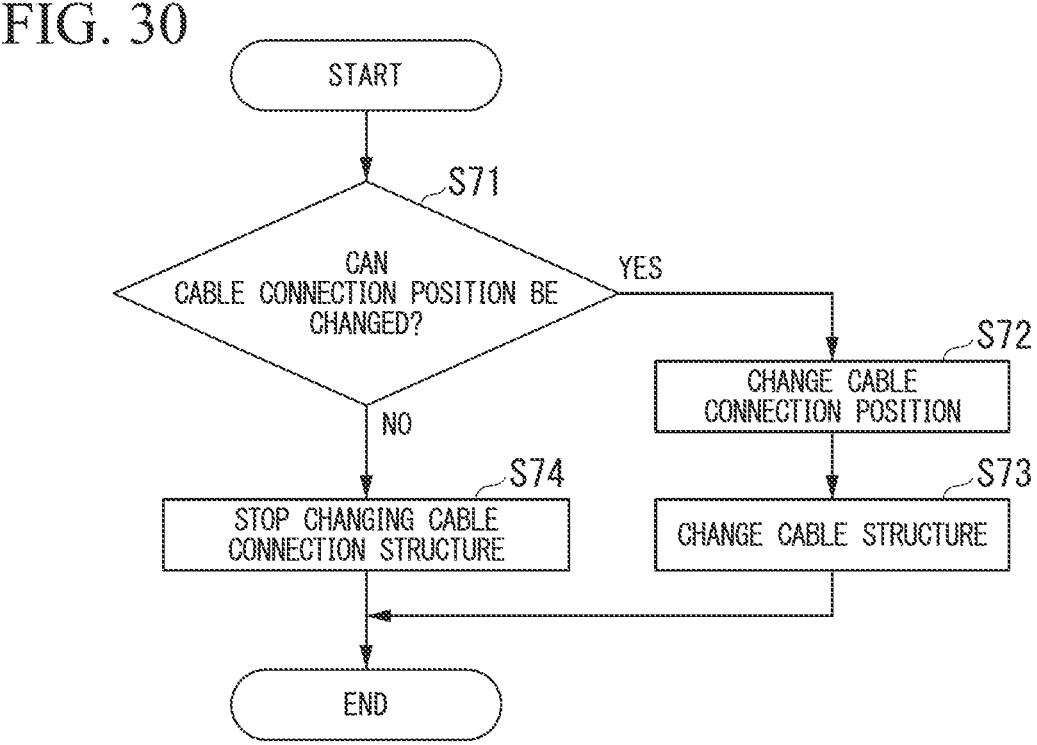
FIG. 30 is a diagram showing a flowchart of a cable connection position change process in FIG. 20.

FIG. 30 shows a flowchart of the cable connection position change process (S32) of FIG. 20. An example of the basic change guideline in this flowchart is to change the cable connection position from the state illustrated in the left side diagram to the state of the right side diagram in the printed substrate structure of FIG. 44A.

Figure 44A:
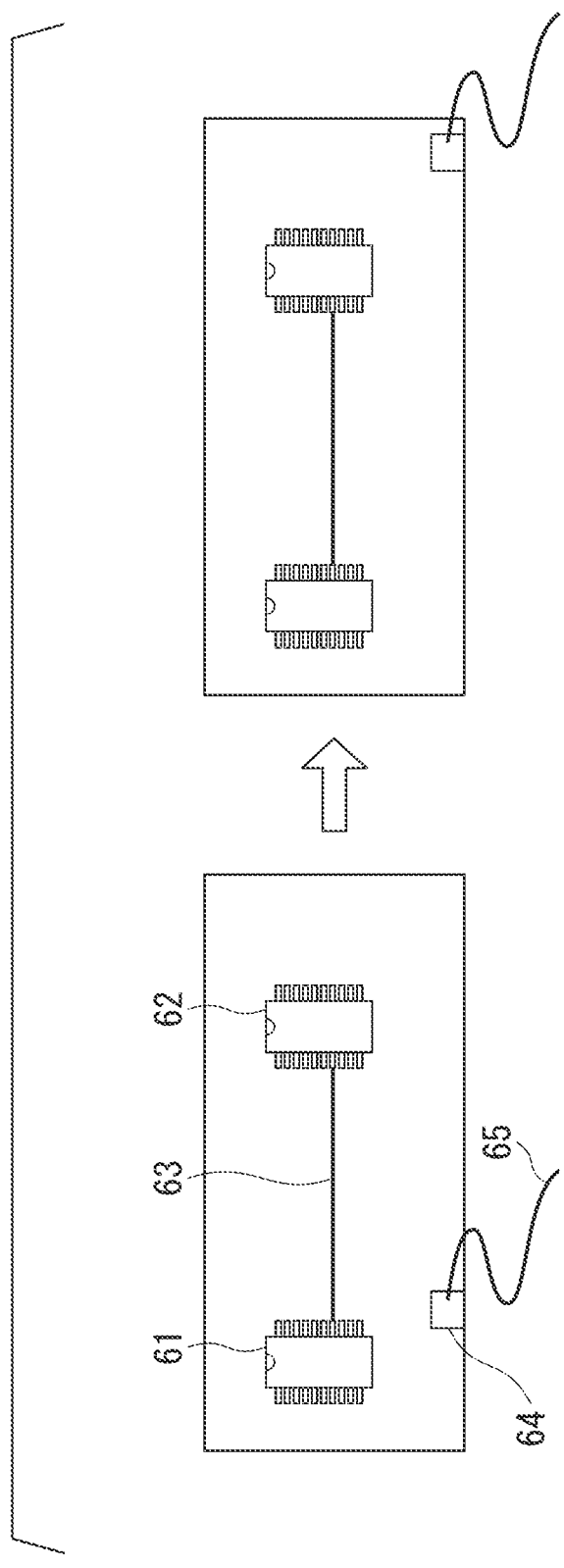
FIG. 44A is a diagram showing an example of a change guideline and an effect of the cable connection position change process of FIG. 30.
Figure 44B:
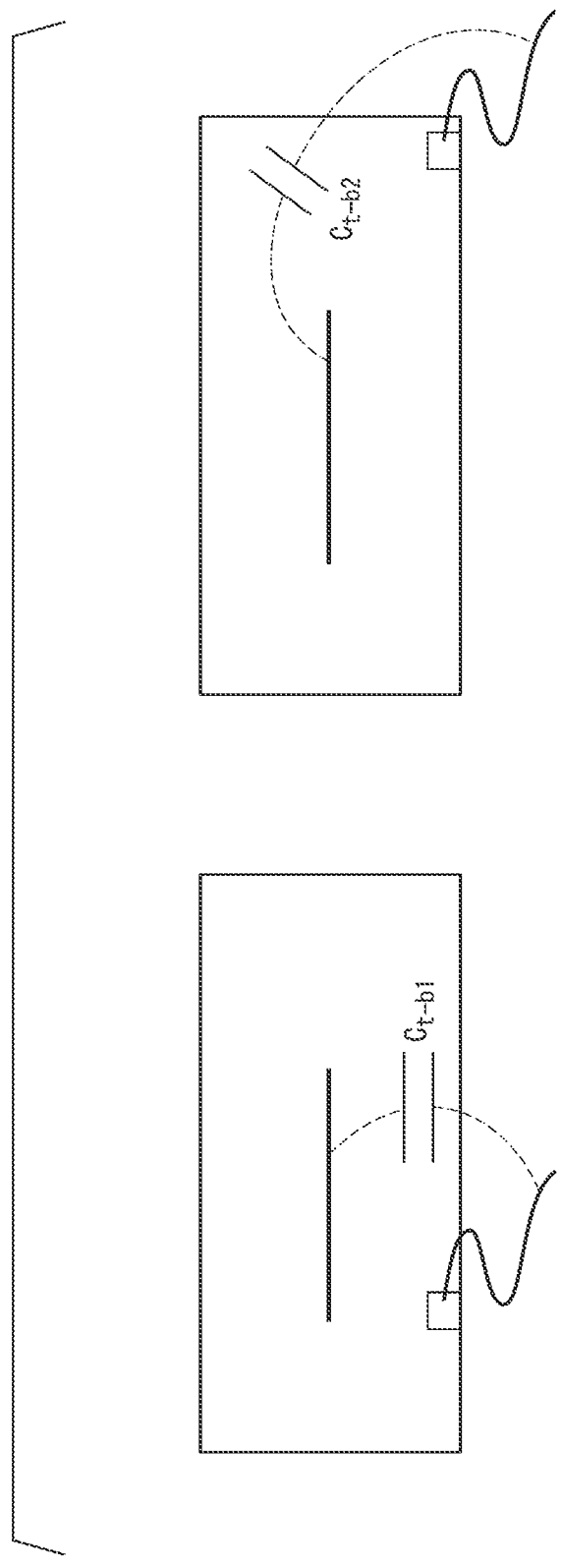
FIG. 44B is a diagram showing an example of a change guideline and an effect of the cable connection position change process of FIG. 30.
Figure 44C:
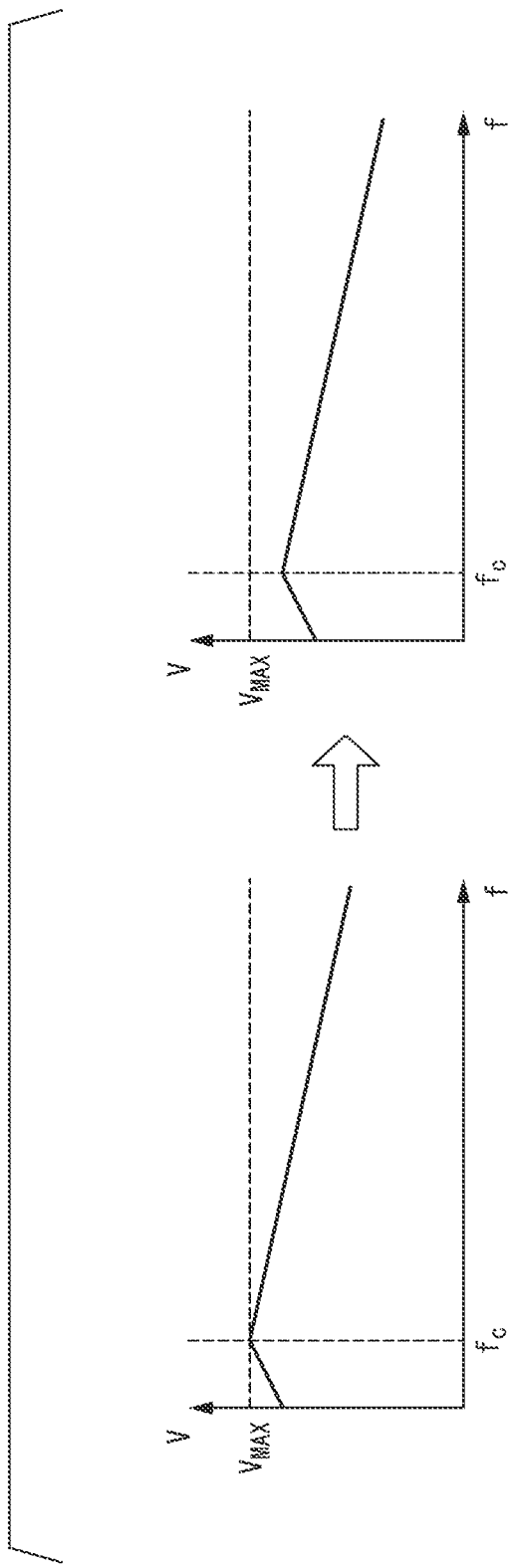
FIG. 44C is a diagram showing an example of a change guideline and an effect of the cable connection position change process of FIG. 30.

In FIG. 44B, as a result of the position of a cable 65 including a connection connector 64 having been changed, the coupled capacitance between a wiring 63 and the cable 65 changes from $C_{t-b1}$ to $C_{t-b2}$ ($C_{t-b2}$>$C_{t-b2}$), and the coupled capacitance becomes small. Accordingly, based on the electric current flowing through the wiring 63, a common mode current flowing through the cable 65 that occurs due to the coupled capacitance between the wiring 63 and the cable 65 also becomes small. As a result, as shown in FIG. 44C, the voltage characteristic due to the common mode current caused by the wiring 63 and the cable 65 becomes small. As a result, there is obtained an effect in which occurring EMI is suppressed. First, a cable connection position change determination process (S71) is performed. In this process, it is determined whether or not the cable connection position can be changed. This determination process may be performed according to a change guideline and restriction prepared in the determination criteria storage unit 4 of FIG. 4. If it is determined in this process that the cable connection position can be changed, a cable connection position change execution process (S72) is performed. In this process, the connection position of the cable is changed according to the design guideline. Next, a cable structure change process (S73) is performed. In this process, the positions of the cable and connector on the printed substrate are changed so as to achieve the changed cable position. When the above processes have been performed, the cable connection position change process (S32) ends. On the other hand, if it is determined in the cable connection position determination process (S71) that the cable connection position cannot be changed, then, as a cable connection structure change stop process (S74), a result stating that the cable connection position cannot be changed is output, and the cable connection position change process (S32) ends. There may be a case in which, without executing this cable connection structure change stop process (S74), the cable connection position change process (S32) ends if it is determined in the cable connection position determination process (S71) that the cable connection position cannot be changed. As a specific example, here is described a case where in the determination criteria database, there are preliminarily prepared a guideline such that "the cable connection position is changed to a position that is positioned 20 mm positive from an x coordinate of the reception side element and that is on the printed substrate lower edge", and a restriction such that "the cable connection position cannot be changed if the x coordinate value of the connector is greater than the x coordinate value of the reception side element". In the case where these change guideline and restriction have been prepared, if the x coordinate value of the connector 64 of FIG. 44A is less than or equal to the x coordinate value of the reception side element 62 in the input substrate design information, the cable connection position change process (S32) changes the positions of the cable 65 and the connector 64 to positions that are 200 mm positive from the x coordinate of the reception side element 62 and that are on the lower edge of the printed substrate. At this time, the substrate structure change process (S79) in FIG. 20 changes the printed substrate structure so as to also match the connection position of the via that is connected to the connector 64 on the printed substrate.

On the other hand, if the x coordinate value of the connector 64 of FIG. 44A is greater than the x coordinate value of the reception side element 62, this corresponds to the restriction. Therefore, in this case, the cable connection position change process (S32) makes no change to the cable connection position, and the printed substrate configuration stays unchanged.

Figure 31:
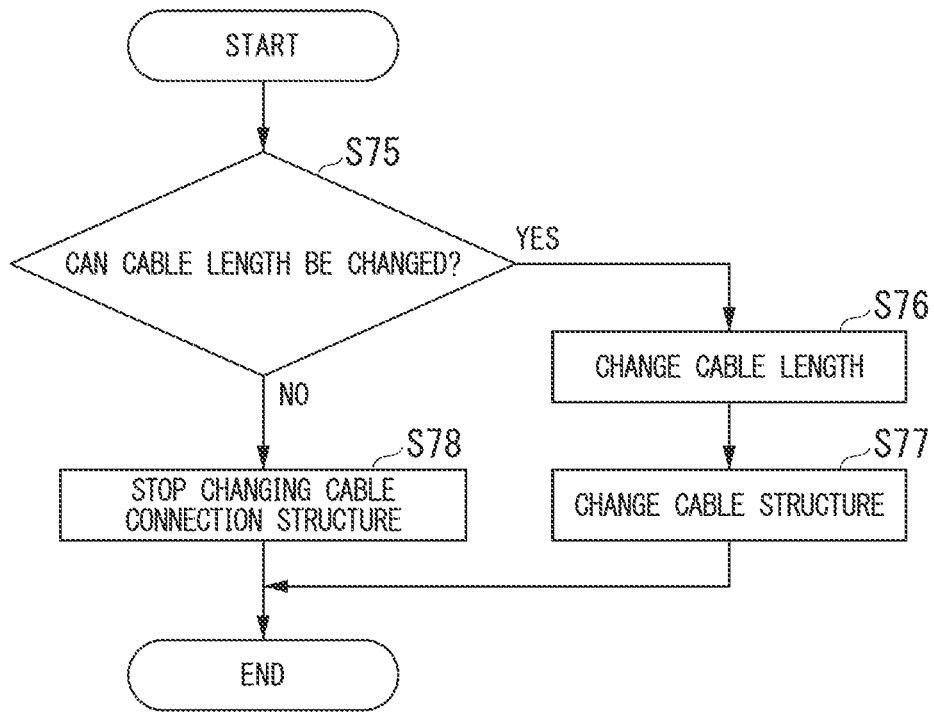
FIG. 31 is a diagram showing a flowchart of a cable length change process in FIG. 20.
Figure 45A:
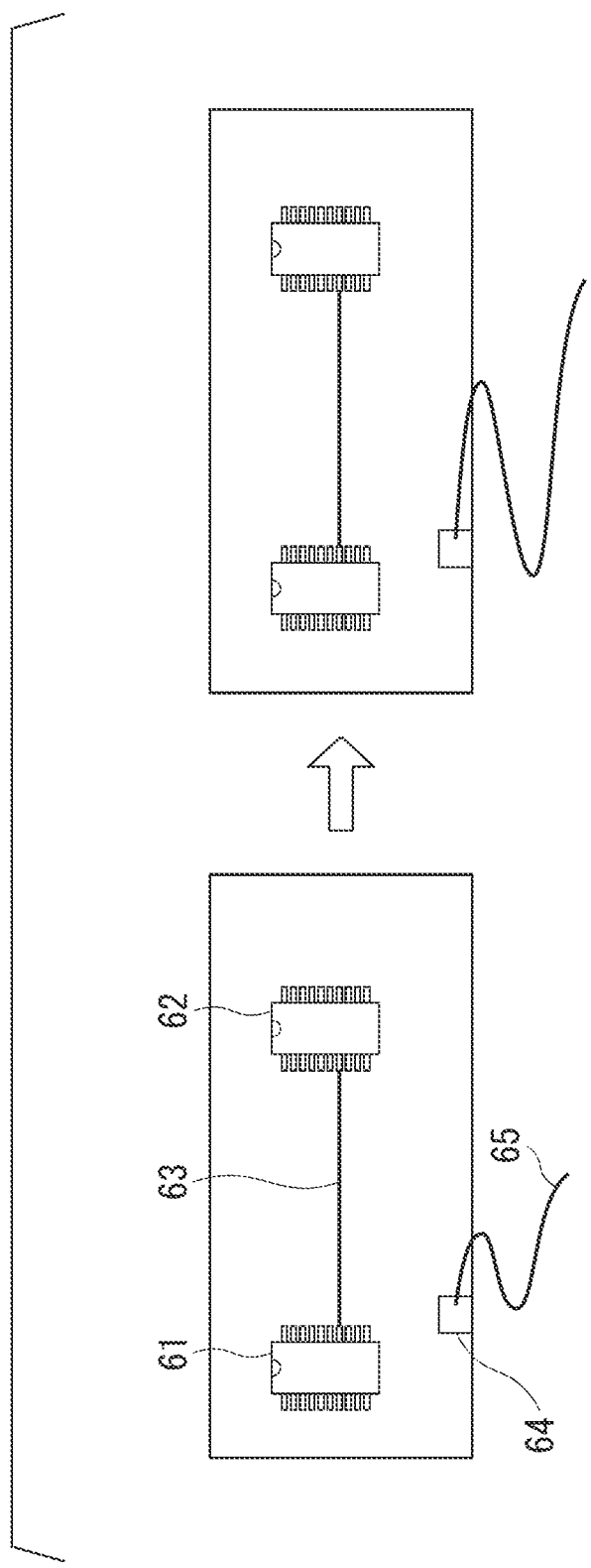
FIG. 45A is a diagram showing an example of a change guideline and an effect of the cable length change process of FIG. 31.
Figure 45B:
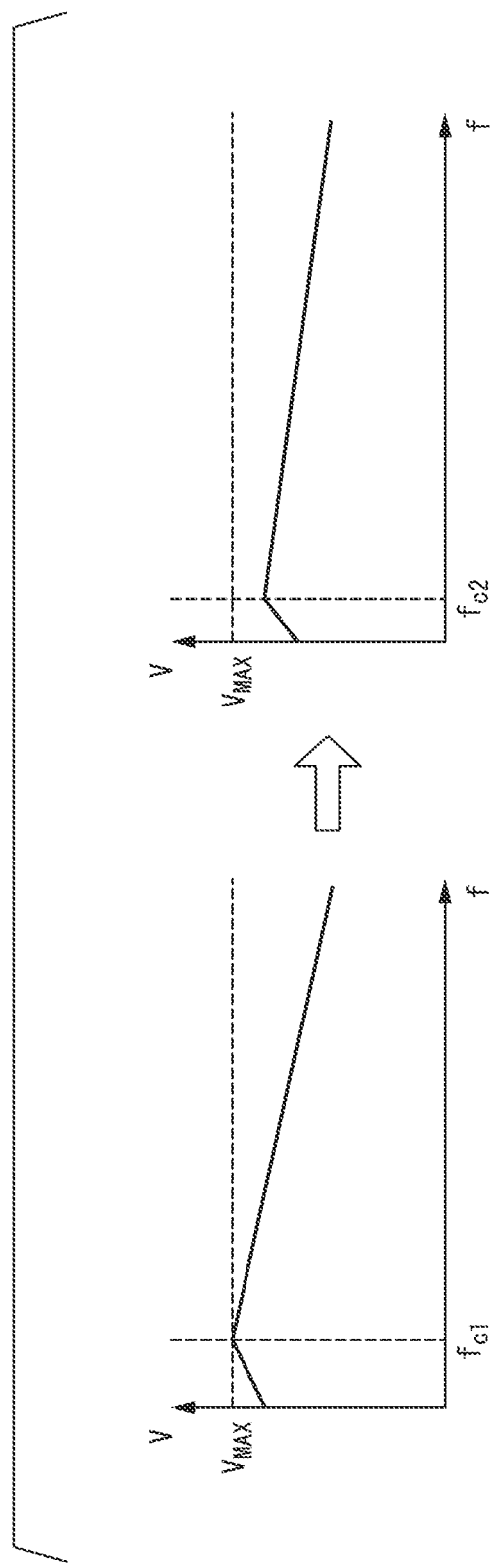
FIG. 45B is a diagram showing an example of a change guideline and an effect of the cable length change process of FIG. 31.

FIG. 31 shows a flowchart of the cable length change process (S32) of FIG. 20. An example of the basic change guideline in this flowchart is to change the length of the cable 65 in the printed substrate structure shown in FIG. 45A. In this case, as shown in FIG. 45B, the resonance frequency characteristic that is decided based on the printed substrate structure including the cable is changed from $f_{c1}$ to $f_{c2}$ for the change that has been made to the cable length. If the harmonic component of the wiring current operating frequency overlaps with the resonance frequency $f_{c1}$, the voltage characteristic due to the common mode current also becomes great, and EMI that occurs increases. By changing the cable length to thereby prevent the wiring current harmonic component from overlapping with the resonance frequency $f_{c2}$, the voltage characteristic due to the common mode current also becomes small. As a result, there is obtained an effect in which occurring EMI is suppressed. First, a cable length change determination process (S75) is performed. In this process, it is determined whether or not the cable length can be changed. This determination process may be performed according to a change guideline and restriction prepared in the determination criteria storage unit 4 of FIG. 4. If it is determined in this process that the cable length can be changed, a cable length change execution process (S76) is performed. In this process, the cable length is changed according to the design guideline. Next, a cable structure change process (S77) is performed. In this process, the cable structure is changed so as to achieve the changed cable length. When the above processes have been performed, the cable length change process (S32) ends. On the other hand, if it is determined in the cable length change process (S75) that the cable length cannot be changed, then, as a cable connection structure change stop process (S78), a result stating that the cable length cannot be changed is output, and the cable length change process (S32) ends. There may be a case in which, without executing this cable connection structure change stop process (S78), the cable length change process (S32) ends if it is determined in the cable length change determination process (S75) that the cable length cannot be changed. As a specific example, here is described a case where in the determination criteria database, there are preliminarily prepared a guideline such that "the cable length is changed to a length of 1.5 times thereof", and a restriction such that "the cable length cannot be changed if the cable length will become 2 m or longer". In the case where these change guideline and restriction have been prepared, if the length of the cable 65 of the printed substrate of FIG. 45A is 1 m in the input substrate design information, the cable length change process (S32) changes the length of the cable 65 to 1.5 m. At this time, the connection information of the cable on the printed substrate that is not on the printed substrate side is also changed by the substrate structure change process (S79) in FIG. 20 to information that matches the change made to the cable length. On the other hand, in the case where the length of the cable 65 is 1.5 m in the substrate design information, if the cable length is made 1.5 times thereof, it becomes 2.25 m (=1.5 m×1.5) and the restriction applies thereto. Therefore, in this case, the cable length change process (S32) makes no change to the cable length, and the printed substrate configuration stays unchanged.

Figure 47:
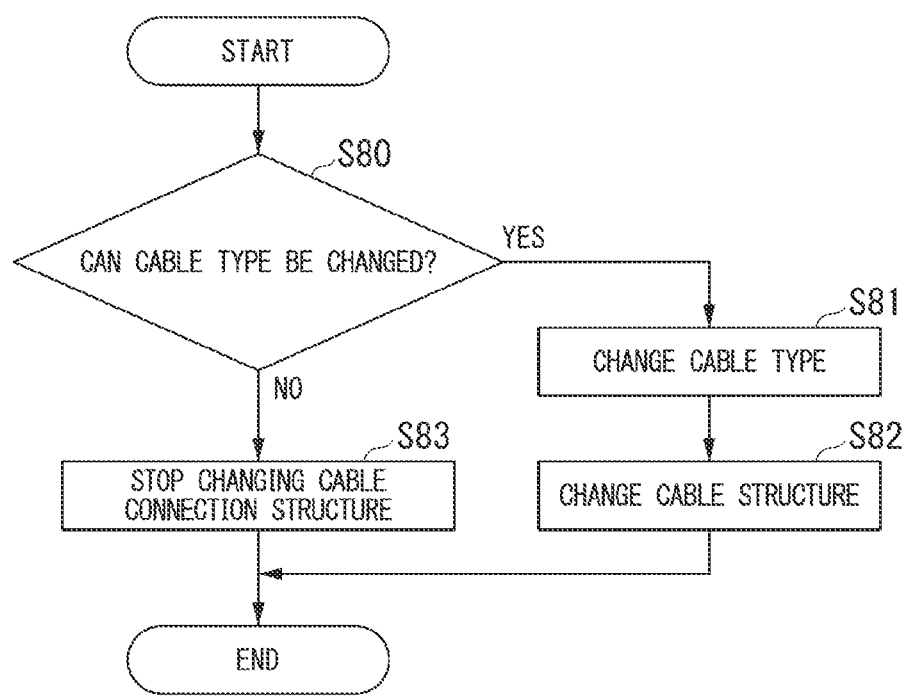
FIG. 47 is a diagram showing a flowchart of a cable type change process in FIG. 20.
Figure 48A:
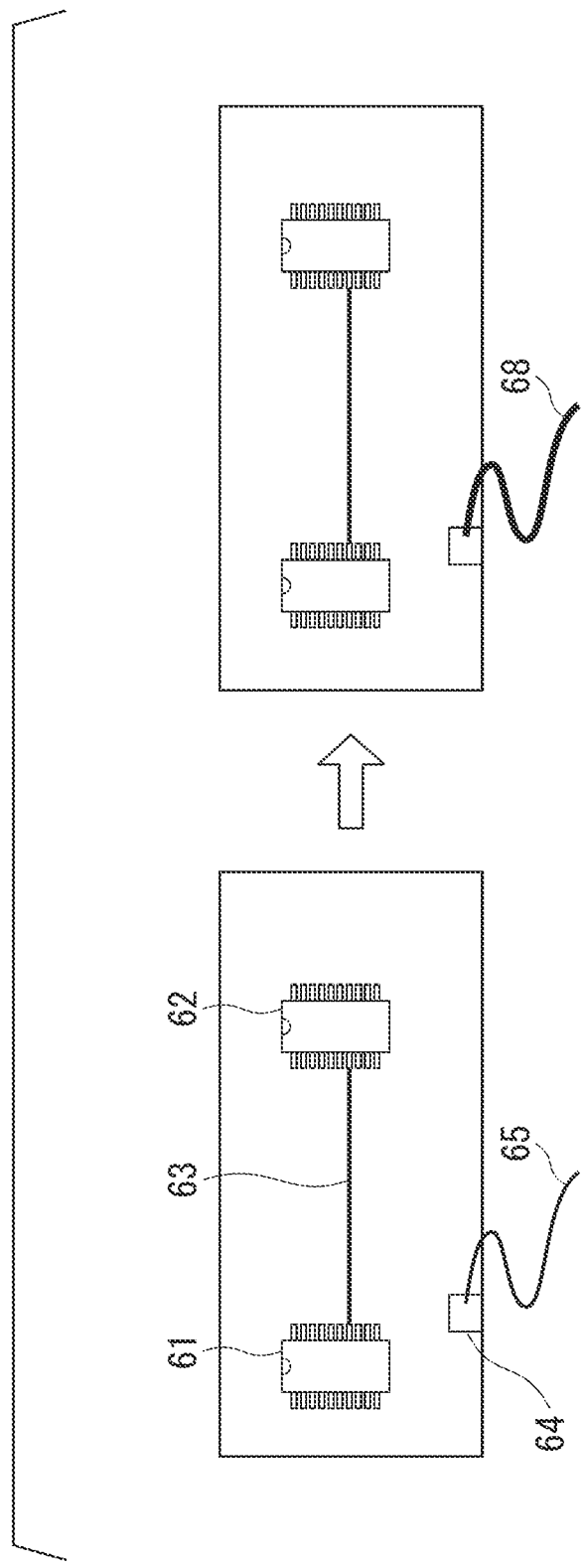
FIG. 48A is a diagram showing an example of a change guideline and an effect of the cable type change process of FIG. 47.
Figure 48B:
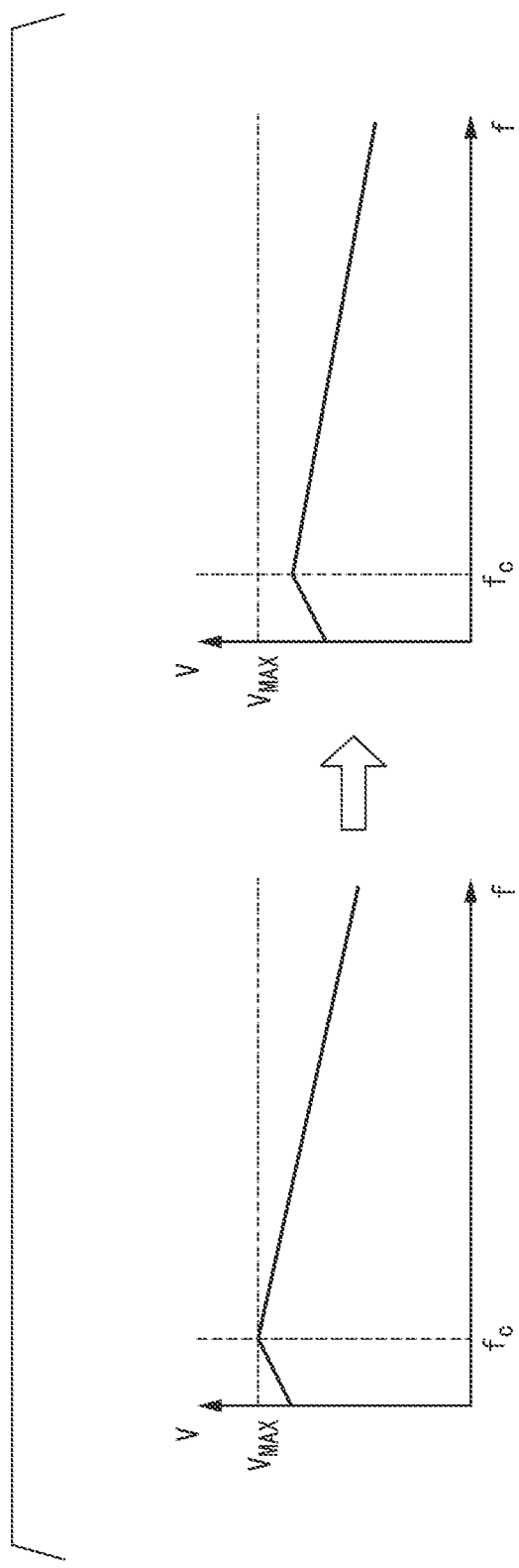
FIG. 48B is a diagram showing an example of a change guideline and an effect of the cable type change process of FIG. 47.

FIG. 47 is a diagram showing a flowchart of a cable type change process (S34) in FIG. 20. An example of the basic change guideline in this flowchart is to change the cable 65 in the printed substrate structure shown in FIG. 48A to a cable 68 with increased thickness of the outer insulator portion and increased diameter. In this case, as shown in FIG. 48B, the composition of the cable changes, and radiation from the cable becomes unlikely in the structure. As a result, the voltage characteristic due to the common mode current flowing through the cable 68 becomes small. As a result, there is obtained an effect in which occurring EMI is suppressed. First, a cable type change determination process (S80) is performed. In this process, it is determined whether or not the cable type can be changed. This determination process may be performed according to a change guideline and restriction prepared in the determination criteria storage unit 4 of FIG. 4. If it is determined in this process that the cable type can be changed, a cable type change execution process (S81) is performed. In this process, the cable type is changed according to the design guideline. Next, a cable structure change process (S82) is performed. In this process, the cable structure is changed so as to match the changed cable type. When the above processes have been performed, the cable type change process (S34) ends. On the other hand, if it is determined in the cable type change determination process (S80) that the cable type cannot be changed, then, as a cable connection structure change stop process (S83), a result stating that the cable type cannot be changed is output, and the cable type change process (S34) ends. There may be a case in which, without executing this cable connection structure change stop process (S83), the cable type change process (S34) ends if it is determined in the cable type change determination process (S80) that the cable type cannot be changed. As a specific example, here is described a case where in the determination criteria database, there are preliminarily prepared a guideline such that "the insulator thickness of the cable is changed to a thickness of 1.5 times thereof", and a restriction such that "no change can be made to a cable structure with a cable radius that will be 2.5 mm or greater". In the case where these change guideline and restriction have been prepared, if the radius of the cable 65 of the printed substrate of FIG. 48A is 2.0 mm and the insulator thickness in the radius is 0.8 mm in the input substrate design information, the cable type change process (S34) changes the cable 68 to a cable with insulator thickness 1.2 mm (0.8×1.5) and radius 2.4 mm (=(2.0−0.8)+1.2). At this time, the connection information of the cable on the printed substrate is also changed by the substrate structure change process (S34) in FIG. 20 to information that matches the change made to the cable thickness. On the other hand, in the case where the radius of the cable 65 is 2.0 mm while the insulator thickness thereof is 1.0 mm in the substrate design information, the insulator thickness of the cable becomes 1.5 mm (=1.0×1.5) with the radius being 2.5 mm (=(2.0−1.0)+1.5), and the restriction applies thereto. Therefore, in this case, the cable type change process (S34) makes no change to the cable type, and the printed substrate configuration stays unchanged.

Figure 21:
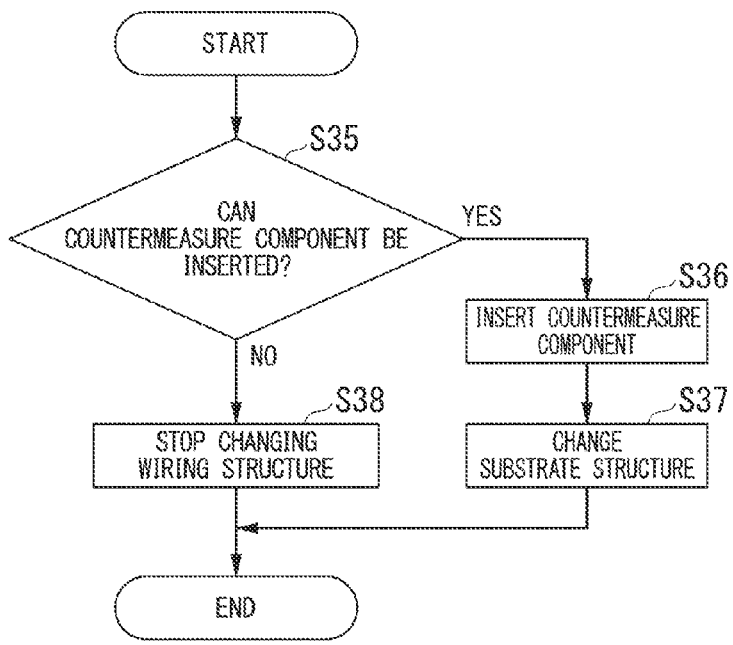
FIG. 21 is a diagram showing a flowchart of a countermeasure component installation process in FIG. 13.
Figure 46A:
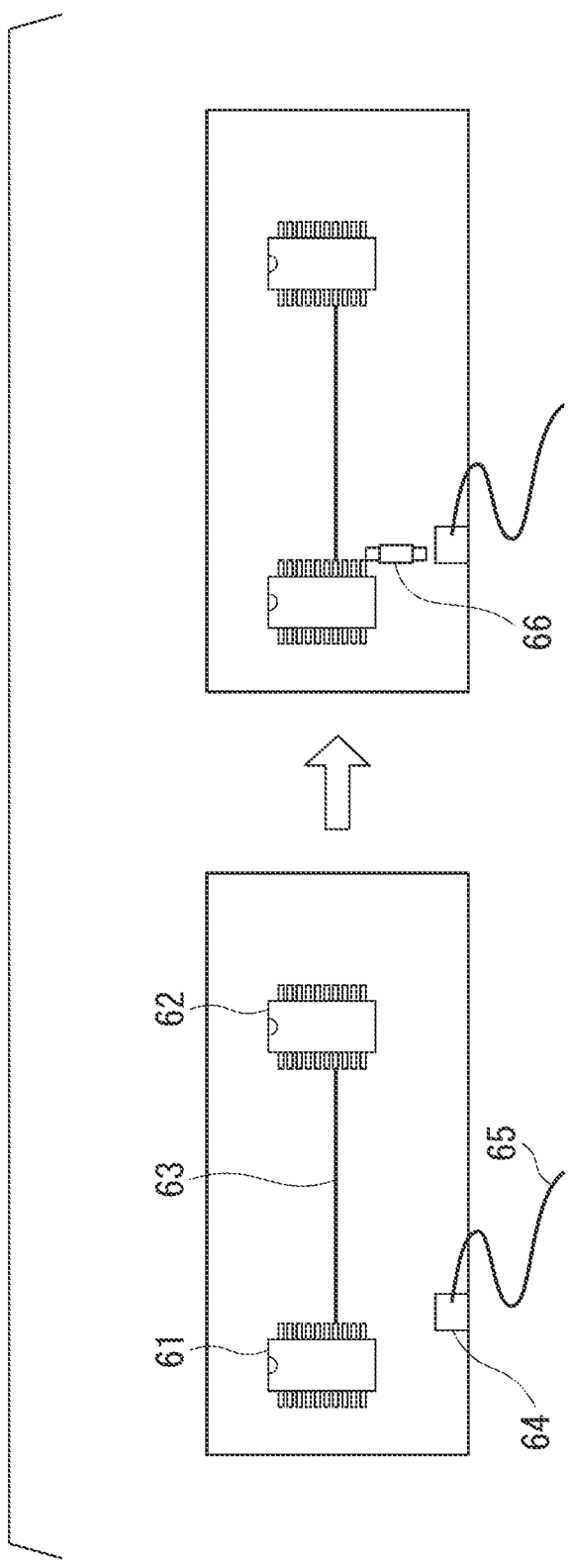
FIG. 46A is a diagram showing an example of a change guideline and an effect of the countermeasure component installation process of FIG. 21.
Figure 46B:
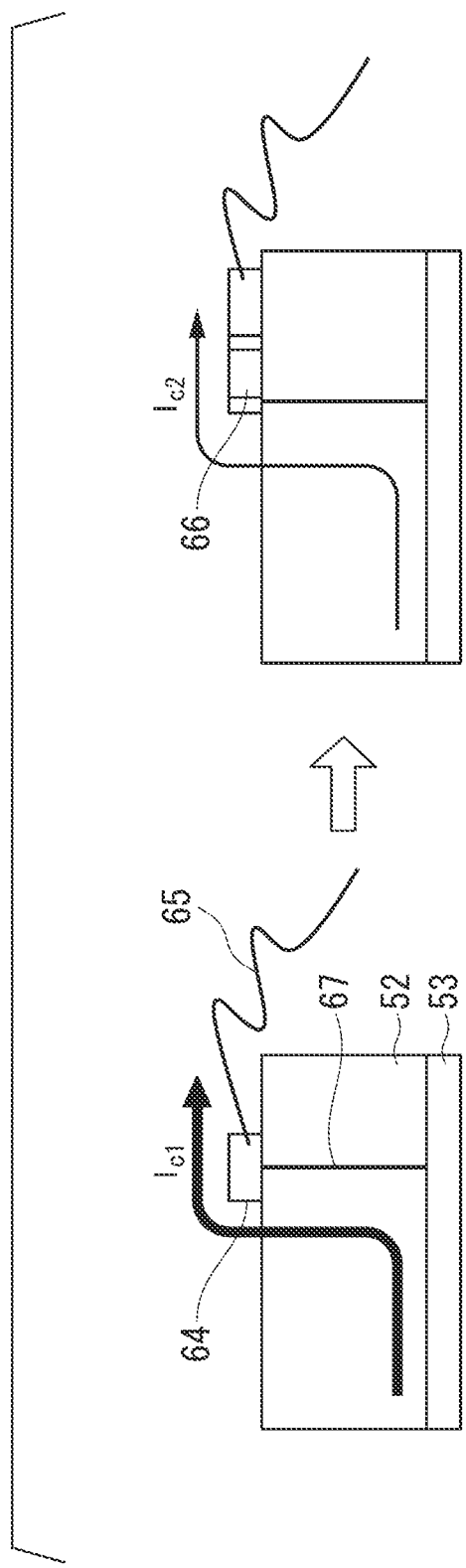
FIG. 46B is a diagram showing an example of a change guideline and an effect of the countermeasure component installation process of FIG. 21.
Figure 46C:
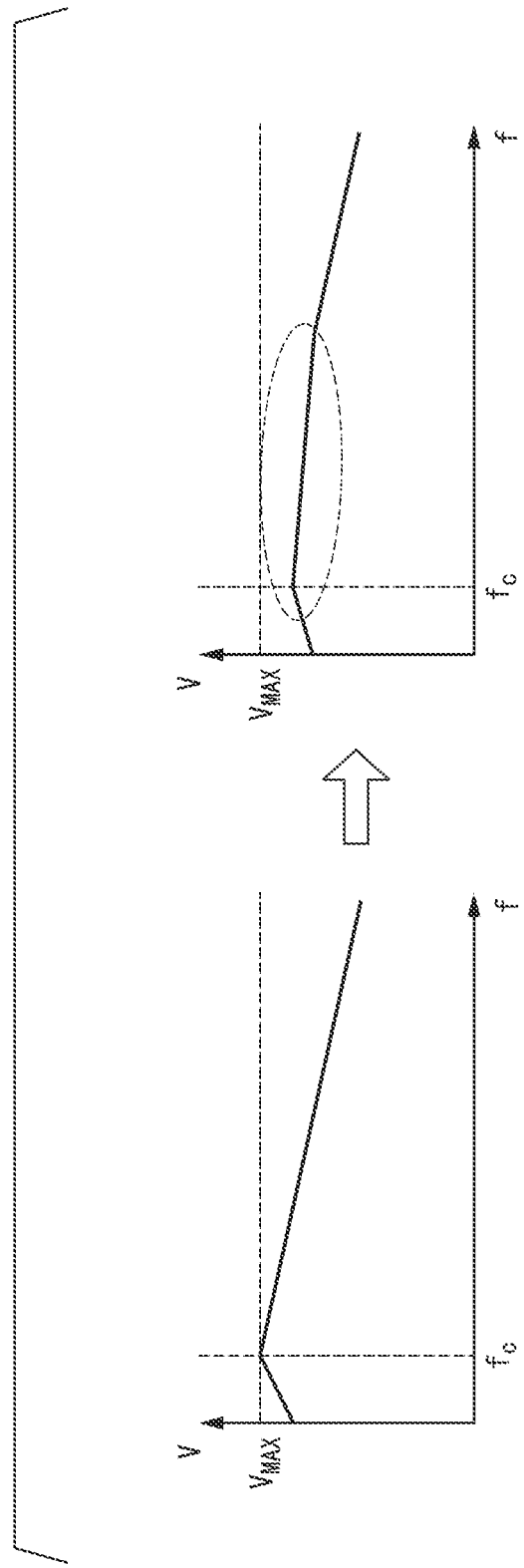
FIG. 46C is a diagram showing an example of a change guideline and an effect of the countermeasure component installation process of FIG. 21.

FIG. 21 shows a specific flowchart of the countermeasure component installation process (S13) in FIG. 13. The processes of this sequence are all performed in the countermeasure component installation unit 16 of FIG. 4. An example of the basic change guideline in this flowchart is to insert a countermeasure component 66 such as a choke coil between the printed substrate and the cable 65, in the printed substrate structure shown in FIG. 46A. In this case, as shown in the diagram on the left side of FIG. 46B, on the path of the common mode current flowing from the GND layer 53 through GND via 67 to the cable 65, there is inserted a countermeasure component 66 as shown in the diagram on the right side of FIG. 46B. In this case, as shown in FIG. 46C, with the damping effect of the countermeasure component 66, a specific frequency range component of the common mode current flowing into the cable 65 is reduced. As a result, there is obtained an effect in which occurring EMI is suppressed.

First, a countermeasure component insertion determination process (S35) is performed. In this process, it is determined whether or not a countermeasure component can be inserted between the printed substrate and the cable. This determination process may be performed according to a change guideline and restriction prepared in the determination criteria storage unit 4 of FIG. 4. If it is determined in this process that a countermeasure component can be inserted, a countermeasure component insertion process (S36) is performed. In this process, a countermeasure component is inserted according to the design guideline. Next, a substrate structure change process (S37) is performed. In this process, a change is made to the printed substrate so as to allow connection with the GND via and the connector in order to insert the countermeasure component on the path of the common mode current. When the above processes have been performed, the countermeasure component installation process (S13) ends. On the other hand, if it is determined in the countermeasure component insertion determination process (S35) that no countermeasure component can be inserted, as a countermeasure component insertion stop process (S38), there is output a result stating that no countermeasure component can be inserted, and then the countermeasure component installation process (S13) ends.

There may be a case in which, without executing this countermeasure component insertion stop process (S38), the countermeasure component installation process (S13) end if it is determined in the countermeasure component insertion determination process (S35) that no countermeasure component can be inserted. As a specific example, here is described a case where in the determination criteria database, there are preliminarily prepared a guideline such that "a choke coil A (the Y-direction size thereof is 10 mm) is inserted at a position adjacent to the connector on the surface layer of the printed substrate", and a restriction such that "a countermeasure component cannot be inserted if the Y-direction distance from the component at a position closest to the connect is no more than 10 mm". In the case where these change guideline and restriction have been prepared, if the Y-direction distance from the transmission side element 61, which is a component at a position closest to the connection connector 64, of the diagram on the left side of FIG. 46A is 15 mm in the input substrate design information, the countermeasure component installation process (S13) changes the structure to one in which a choke coil A is inserted at a position adjacent to the connection connector 64. At this time, the information of the position and structure of the GND via on the printed substrate is also changed by the substrate structure change process (S37) in FIG. 21 to information of the structure having the choke coil A inserted therein. On the other hand, if the Y-direction distance from the transmission side element 61, which is a component positioned closest to the connection connector 64, is 5 mm in the substrate design information, this corresponds to the restriction. Therefore, in this case, the cable length change process (S32) does not insert a countermeasure component, and the printed substrate configuration stays unchanged. Systems applied with the methods disclosed in Non-Patent Document 1 and Non-Patent Document 2 may not be capable of directly calculating the effect of a countermeasure component in some cases. In this case, an EMI characteristic in the case of inserting a countermeasure component may be derived in a manner described below. A countermeasure effect of a countermeasure component to be inserted (a common mode current damping effect in a specific frequency band) is prepared in a countermeasure component database. Furthermore, the countermeasure effect of the countermeasure component is combined with a calculation result found in the EMI characteristic simple calculation of FIG. 11. In this case, the EMI characteristic calculation unit 9 of FIG. 4 may have the derivation unit thereof built therein.

In the above sequence of substrate configuration change processes (S9 through S13) shown in FIG. 13, each process illustrated in FIG. 18 through FIG. 31, and in FIG. 47 may be performed according to change guidelines and restrictions prepared in the determination criteria storage unit 4 of FIG. 4. At this time, several change guidelines and restrictions may be prepared and a rank order may be assigned thereto, and if a single circuit configuration change does not satisfy the determination criteria prepared in the determination criteria storage unit 4, a next circuit configuration change may be performed. For example, here is described a case where there are prepared: a first change guideline such that "the wiring length change process (S21) in the signal wiring change process (S10) is performed"; a first restriction that accompanies the first change guideline; a second change guideline such that "the layer configuration change process (S20) in the signal wiring change process (S10) is performed"; and a second restriction that accompanies the second change guideline. In a case where the input substrate configuration information does not satisfy the determination criteria in the EMI condition determination process (S4) of FIG. 13, if the determination criteria are not met even if a wiring length change process (S21) has been performed as the first change guideline (if NO in the EMI condition determination process (S4) of FIG. 13), or if the circuit configuration could not be changed with the input substrate configuration due to the prepared restriction (if the wiring structure change stop process (S46) of FIG. 23 is performed), the layer configuration change process (S20) is performed as the prepared second change guideline, and the process is repeated so as to change and achieve a printed substrate configuration that enables further reduction of occurring EMI. Several change guidelines and restrictions may be prepared and a rank order may be assigned thereto respectively. In this case, when changing the printed substrate configuration to conform to the respective change guidelines and restrictions, if the configuration of the printed substrate is changed until the EMI condition determination process (S4) of FIG. 13 is satisfied, it is possible to obtain a printed substrate configuration that satisfies the determination criteria prepared in the determination criteria storage unit 4 of FIG. 4.

In the substrate configuration change unit 5 of FIG. 4, the changed printed substrate configuration is returned to the EMI characteristic simple calculation unit 7, and a characteristic of EMI that occurs from the printed substrate is calculated afresh. At this time, information for calculating an EMI characteristic in the EMI characteristic calculation unit 9 is already prepared from the previous printed substrate configuration. Therefore, simply by extracting only the configuration that has been changed in the substrate configuration change unit 5 and changing information of the configuration, the parameter extraction unit 8 may freshly create information for calculating an EMI characteristic with the new printed substrate configuration. In this case, in the flow, the process may be performed in the following manner. In the processes of the sequence of FIG. 13, in any one of the substrate configuration change method selection process (S9) and the substrate configuration change processes (S10 through S13), information of only the configuration portion that is to be changed from the printed substrate configuration is extracted, and in the EMI characteristic simple calculation process (S7), information of only the changed portion is changed from information of the printed substrate configuration from which an EMI characteristic has been derived previously. Furthermore, there is created information for deriving an EMI characteristic with the changed printed substrate configuration.

Figure 5:
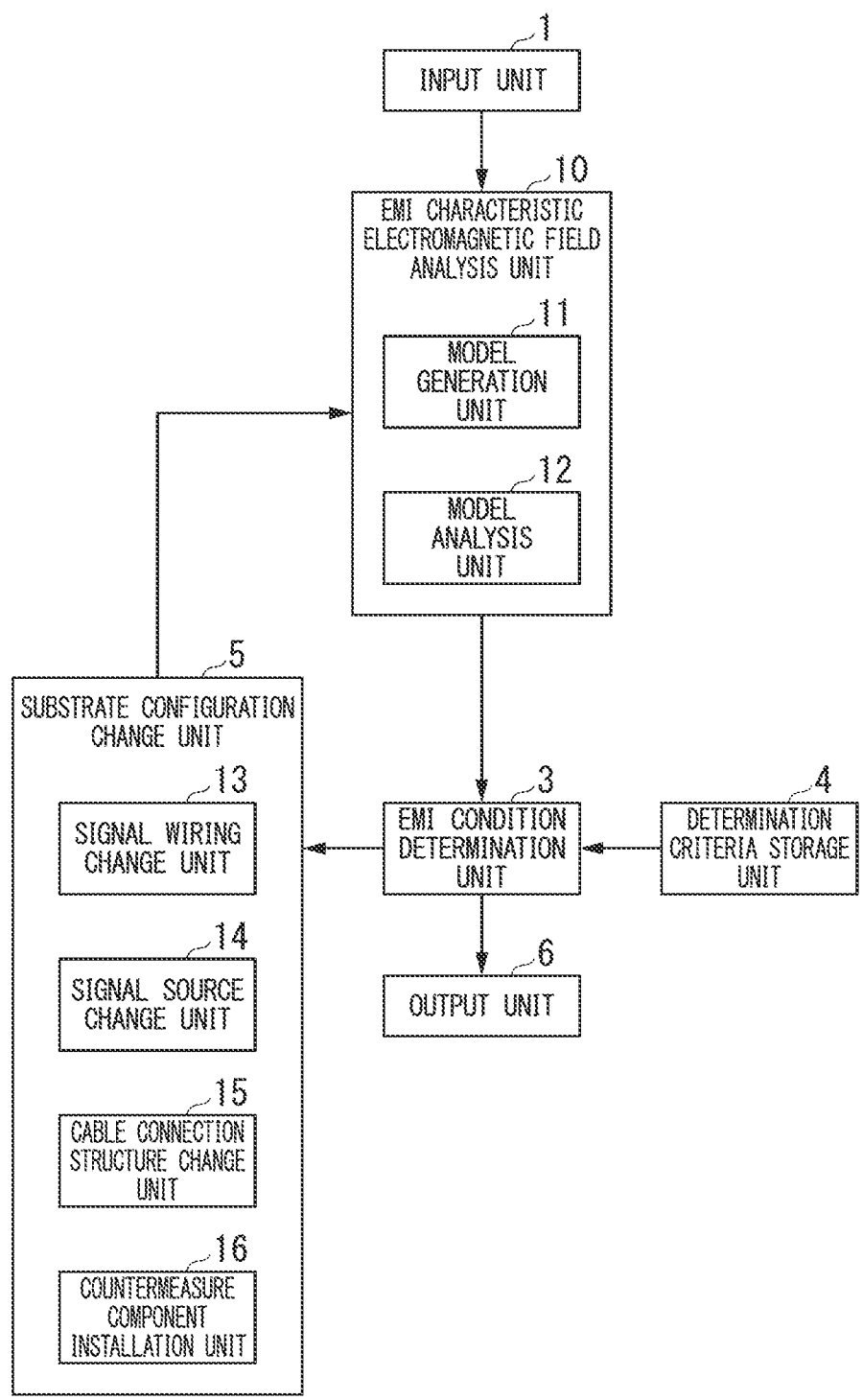
FIG. 5 is a diagram showing an example of a block configuration of a printed substrate design system according to a fifth exemplary embodiment of the present invention.

FIG. 5 shows an example of a block configuration of a printed substrate design system according to a fifth exemplary embodiment of the present invention. In the present exemplary embodiment, the substrate configuration change unit 5 in the configuration of the printed substrate design system of the third exemplary embodiment shown in FIG. 3 has a signal wiring change unit 13, a signal source change unit 14, a cable connection structure change unit 15, and a countermeasure component installation unit 16. In this exemplary embodiment, when the input printed substrate configuration is determined to not satisfy the EMI allowable condition in the EMI condition determination unit 3, in the substrate configuration change unit 5, the printed substrate configuration is changed in any one of the signal wiring change unit 13, the signal source change unit 14, the cable connection structure change unit 15, and the countermeasure component installation unit 16, according to the preliminarily prepared change guideline. Furthermore, substrate design information with a new printed substrate configuration is input to an EMI characteristic electromagnetic field analysis unit 10. The substrate configuration change unit 5 has a plurality of printed substrate change units. Furthermore, selection of these change units is performed according to a preliminarily prepared change guideline. As a result, it becomes possible with use of the present system to efficiently design a configuration of a low EMI printed substrate. This exemplary embodiment is of a configuration in which the EMI characteristic simple calculation unit 7 of the fourth exemplary embodiment shown in FIG. 4 is replaced with an EMI characteristic electromagnetic field analysis unit 10. Moreover, this exemplary embodiment is of a configuration in which the parameter extraction unit 8 and the EMI characteristic calculation unit 9 of the fourth exemplary embodiment shown in FIG. 4 are replaced respectively with a model generation unit 11 and a model analysis unit 12. This exemplary embodiment differs from the fourth exemplary embodiment in the method of deriving an EMI characteristic. Therefore, the substrate configuration change unit 5 of this exemplary embodiment, and also the signal wiring change unit 13, the signal source change unit 14, the cable connection structure change unit 15, and the countermeasure component installation unit 16, which are the detailed internal substrate configuration change units thereof, serve in manners similar to those described in the fourth exemplary embodiment.

Figure 14:
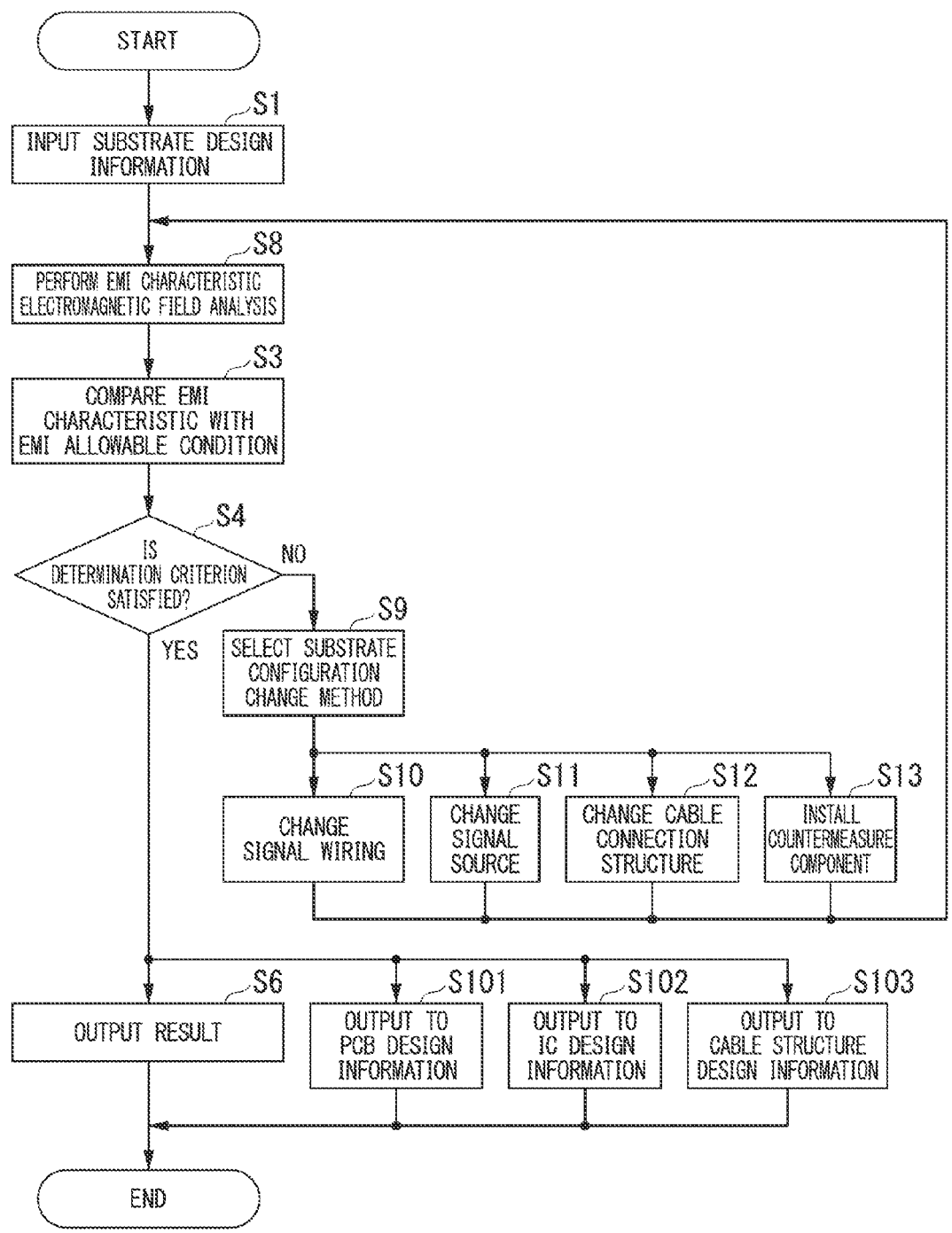
FIG. 14 is a diagram showing a flowchart of the fifth and eighth exemplary embodiments of the present invention.

FIG. 14 is a flowchart showing a process of the fifth exemplary embodiment. In this flowchart, as the substrate configuration change process (S5) illustrated in FIG. 12, a substrate configuration change method selection process (S9) is performed, and as a specific printed substrate change process, there is performed any one of a signal wiring change process (S10), a signal source change process (S11), a cable connection structure change process (S12), and a countermeasure component installation process (S13). An EMI condition determination process (S4) is a process performed in the EMI condition determination unit 3 of FIG. 5 for determining whether or not the determination criteria in FIG. 14 are satisfied. As a result of this EMI condition determination process (S4), if the EMI characteristic derived in the EMI characteristic electromagnetic field analysis process (S8) of FIG. 14 is determined to not satisfy the EMI allowable condition prepared in the determination criteria storage unit 4 of FIG. 5, the substrate configuration change process of FIG. 14 is performed. First, the substrate configuration change method selection process (S9) is performed. This process is performed in the substrate configuration change unit 5 of FIG. 5. With this process, a method of changing the configuration of the printed substrate is decided. If a change guideline for the case where the EMI allowable condition is not met is preliminarily prepared in the determination criteria storage unit 4 of FIG. 5, this process decides a method of changing the configuration of the printed substrate according to the change guideline. Similarly, by preliminarily preparing, in the determination criteria storage unit 4 of FIG. 5, restrictions for making changes, a suitable substrate structure change process can be selected for the input substrate design information. If the signal wiring change process (S10) is selected as a printed substrate configuration change method in the substrate configuration change method selection process (S9), there is performed an improving process of changing the structure of the printed substrate signal wiring to achieve a lower EMI level. This signal wiring change process (S10) is performed in the signal wiring change unit 13 of FIG. 5. If the signal source change process (S11) is selected as a printed substrate configuration change method in the substrate configuration change method selection process (S9), there is performed an improving process of changing the signal source of the signal electric current flowing through the signal wiring of the printed substrate to achieve a lower EMI level. This signal source change process (S11) is performed in the signal source change unit 14 of FIG. 5. If the cable connection structure change process (S12) is selected as a printed substrate configuration change method in the substrate configuration change method selection process (S9), there is performed an improving process of changing the connection structure of the cable that is connected to the printed substrate to achieve a lower EMI level. This signal source change process (S12) is performed in the signal source change unit 15 of FIG. 5. If the countermeasure component installation process (S13) is selected as a printed substrate configuration change method in the substrate configuration change method selection process (S9), there is performed an improving process of changing the printed substrate structure to a structure with an additional countermeasure component mounted thereon, to achieve a lower EMI level. This countermeasure component installation process (S13) is performed in the countermeasure component installation unit 16 of FIG. 5. After the substrate configuration change method selection process (S9) and the printed substrate configuration change process (any one of processes S10 through S13) have been performed, substrate design information that is based on the re-improved printed substrate configuration is input to the EMI characteristic electromagnetic field analysis unit 10 of FIG. 5 again. Next, the EMI characteristic electromagnetic field analysis process (S8) is performed with the new printed substrate configuration. The processes of the above sequence are repeatedly performed. In the process of this fifth exemplary embodiment, the EMI characteristic simple calculation process (S7) in the process of the fourth exemplary embodiment is changed to the EMI characteristic electromagnetic field analysis process (S8). Therefore, the process of the fifth exemplary embodiment differs from the process of the fourth exemplary embodiment only in the process of deriving an EMI characteristic. Accordingly, the substrate configuration change method selection process (S9) of the fifth exemplary embodiment, and all of the signal wiring change process (S10), the signal source change process (S11), the cable connection structure change process (S12), and the countermeasure component installation process (S13), which are specific printed substrate change processes, are not different from those of the fourth exemplary embodiment. Therefore, each of the signal wiring change process (S10), the signal source change process (S11), the cable connection structure change process (S12), and the countermeasure component installation process (S13) may be performed according to the respective processes shown in FIG. 18 through FIG. 31 and FIG. 47.

In the above sequence of substrate configuration change processes (S9 through S13) shown in FIG. 14, each process illustrated in FIG. 18 through FIG. 31, and in FIG. 47 may be performed according to change guidelines and restrictions prepared in the determination criteria storage unit 4 of FIG. 5. At this time, several change guidelines and restrictions may be prepared and a rank order may be assigned thereto, and if a single circuit configuration change does not satisfy the determination criteria prepared in the determination criteria storage unit 4, a next circuit configuration change may be performed. The processes of this sequence are also similar to those illustrated in the fourth exemplary embodiment. Specifically, several change guidelines are prepared with a rank order assigned thereto, and several restrictions that accompany them are also prepared with a rank order assigned thereto. The configuration of a printed substrate is changed according to the respective change guidelines and the restrictions. The printed substrate configuration is changed until the EMI condition determination process (S4) of FIG. 14 is satisfied. With this type of process, it is possible to obtain a printed substrate configuration that satisfies the determination criteria prepared in the determination criteria storage unit 4 of FIG. 5.

The substrate configuration change unit 5 of FIG. 5 returns the changed printed substrate configuration to the EMI characteristic electromagnetic field analysis unit 10, and a characteristic of EMI that occurs from the printed substrate is calculated afresh. At this time, a model for electromagnetic field analyzing an EMI characteristic in the model analysis unit 12 is already prepared from the previous printed substrate configuration. Therefore, simply by extracting only the configuration that has been changed in the substrate configuration change unit 5 and changing information of the configuration, the model generation unit 11 may freshly create a model for calculating an EMI characteristic by means of electromagnetic field analysis with the new printed substrate configuration. In this case, in the flow, the process may be performed in the following manner. In the processes of the sequence of FIG. 14, in any one of the substrate configuration change method selection process (S9) and the substrate configuration change processes (S10 through S13), information of only the configuration portion that is to be changed from the printed substrate configuration is extracted. Next, in the EMI characteristic electromagnetic field analysis process (S8), information of only the changed portion in the electromagnetic field analysis model of the printed substrate from which the EMI characteristic has previously been derived is changed and reflected in model creation, and there is created an electromagnetic field analysis model for deriving an EMI characteristic with the changed printed substrate configuration.

Figure 6:
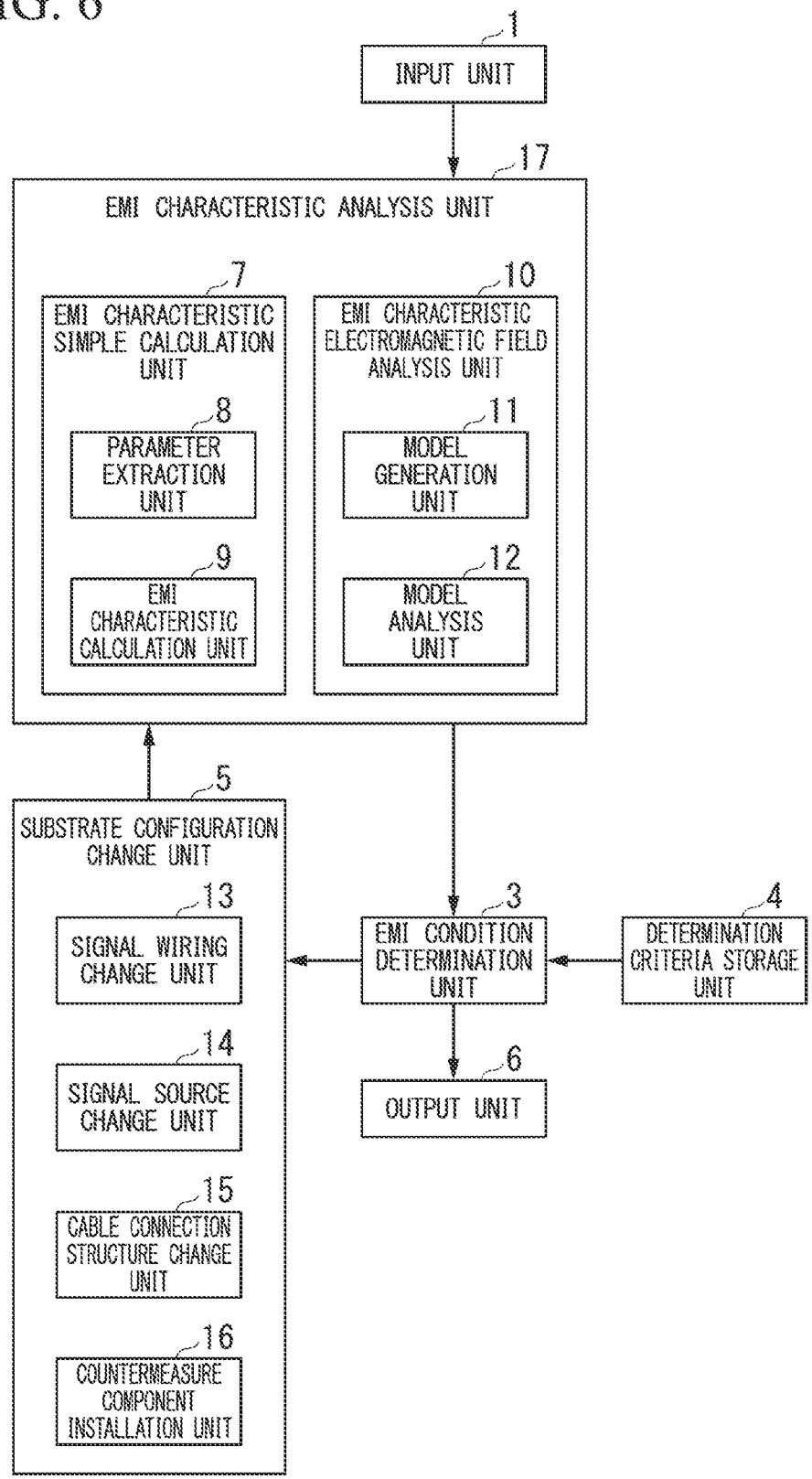
FIG. 6 is a diagram showing an example of a block configuration of a printed substrate design system according to a sixth exemplary embodiment of the present invention.

FIG. 6 shows an example of a block configuration of a printed substrate design system according to a sixth exemplary embodiment of the present invention. The present exemplary embodiment is an exemplary embodiment improved from the fourth exemplary embodiment and the fifth exemplary embodiment. The present exemplary embodiment has an EMI characteristic analysis unit 17 as a device for deriving a characteristic of occurring EMI from printed substrate design information of a printed substrate. This EMI characteristic analysis unit 17 has both an EMI characteristic simple calculation unit 7 in the configuration of the printed substrate design system of the fourth exemplary embodiment shown in FIG. 4, and an EMI characteristic electromagnetic field analysis unit 10 in the configuration of the printed substrate design system of the fifth exemplary embodiment shown in FIG. 5. In this exemplary embodiment, when substrate design information of a printed substrate is input from the input unit 1 to the EMI characteristic analysis unit 17, in order to derive a characteristic of EMI occurring from the printed substrate, it is possible to select either to perform simple derivation with the EMI characteristic simple calculation unit 7, or perform derivation with the EMI characteristic electromagnetic field analysis unit 10 by means of electromagnetic field analysis. The EMI characteristic simple calculation unit 7 includes a parameter extraction unit 8 that extracts outer shape information of a printed substrate and electric current characteristic information, and an EMI characteristic calculation unit 9, which is a system such as one disclosed in Non-Patent Document 1 or Non-Patent Document 2 that performs a calculation process for deriving a maximum value characteristic of common mode radiation from a printed substrate with a cable connected thereto. The EMI characteristic electromagnetic field analysis unit 10 includes a model generation unit 11 that reproduces the outer shape and layer structure of a substrate, and physical structure information of a component and cable connection, and creates an electromagnetic field analysis model with an added noise source including IC operating signals, and a model analysis unit 12, which is a system that performs analysis by means of an electromagnetic field analysis method such as the FDTD method, the moment method, and the finite element method. A selection of the analysis method may be made based on substrate design information input from the input unit 1. Moreover, a selection may be made with appropriate determination criteria as described below to determine whether or not an EMI characteristic satisfies an allowable value. In the determination criteria storage unit 4 of FIG. 6, there are prepared both determination criteria to be applied to an EMI characteristic derived by the EMI characteristic simple calculation unit 7, and determination criteria to be applied to an EMI characteristic derived by the EMI characteristic electromagnetic field analysis unit 10. The EMI condition determination unit 3 of FIG. 6 selects an appropriate determination criterion, depending on whether the EMI characteristic derived in the EMI characteristic analysis unit 17 has been derived by the EMI characteristic simple calculation unit 7 or by the EMI characteristic electromagnetic field analysis unit 10. Therefore, from the input substrate design information, it is possible to appropriately use either the simple EMI characteristic derived with use of the EMI characteristic simple calculation unit 7 or the EMI characteristic that is derived by means of electromagnetic field analysis with use of a required mesh-divided model, using the EMI characteristic electromagnetic field analysis unit 10, based on a required analysis time and analysis precision, to determine whether or not the EMI occurring from the printed substrate satisfies the determination criteria. As a result, it is possible to derive an EMI characteristic with the level of analysis precision required at each designing stage, without investing in calculation cost more than necessary. Furthermore, with the substrate configuration change unit 5, it is also possible to change the printed substrate to a configuration of a lower level of EMI. As a result, it is possible to create a printed substrate configuration of a low EMI level with a precision level required at each designing stage and without the need for unnecessary cost.

Figure 15:
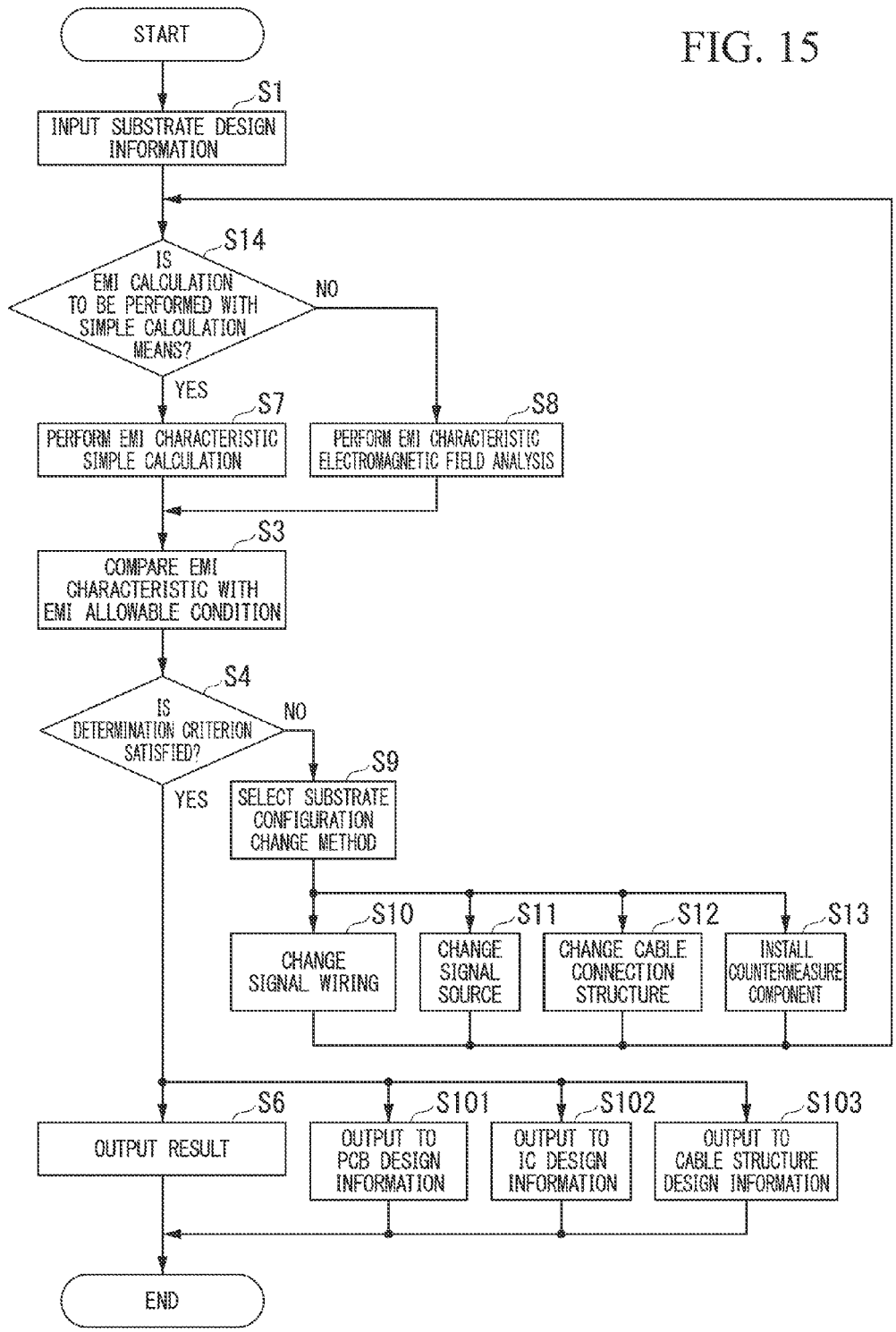
FIG. 15 is a diagram showing a flowchart of the sixth and ninth exemplary embodiments of the present invention.

FIG. 15 is a flowchart showing a process of the sixth exemplary embodiment. This flowchart is a configuration that combines the flowchart showing the process of the fourth exemplary embodiment shown in FIG. 13, and the flowchart showing the process of the fifth exemplary embodiment shown in FIG. 14. The flowchart of FIG. 15 has both an EMI characteristic simple calculation process (S7) and an EMI characteristic electromagnetic field analysis process (S8) as an EMI characteristic derivation process (S2) illustrated in FIG. 10. Moreover, the flowchart of FIG. 15 has an EMI characteristic derivation method selection process (S14) for selecting which process is to be used to derive an EMI characteristic. Either one of the EMI characteristic simple calculation process (S7) and the EMI characteristic electromagnetic field analysis process (S8) selected by this EMI characteristic derivation method selection process (S14) is to be performed. This EMI characteristic derivation method selection process (S14) is performed in the EMI characteristic analysis unit 17 of FIG. 6. The EMI characteristic simple calculation process (S7) is performed in the EMI characteristic simple calculation unit 7 in the EMI characteristic analysis unit 17 of FIG. 6. The EMI characteristic electromagnetic field analysis process (S8) is performed in the EMI characteristic electromagnetic field analysis unit 10 in the EMI characteristic analysis unit 17 of FIG. 6. In the process of the sixth exemplary embodiment, after a circuit design information input process (S1) has been performed to input the substrate design information of the printed substrate, the EMI characteristic derivation method selection process (S14) selects either to derive an EMI characteristic with use of the EMI characteristic simple calculation process (S7) or derive an EMI characteristic with use of the EMI characteristic electromagnetic field analysis process (S8). Which process to be selected may be decided, according to the input substrate design information. For example, the EMI characteristic simple calculation process (S7) may be selected if general design information of the substrate includes minimum information such as input signal waveforms and cable connection information at the initial designing stage of the printed substrate. On the other hand, the EMI characteristic electromagnetic field analysis process (S8) may be selected if a 3D structure at a near design completion stage of the printed substrate has already been decided in the detailed information of the substrate. If the EMI characteristic simple calculation unit 7 is selected, an EMI characteristic is derived by means of simple calculation according to the flowchart shown in FIG. 16, as with the second and fourth exemplary embodiments. On the other hand, if the EMI characteristic electromagnetic field analysis process (S8) is selected, an EMI characteristic is derived by means of electromagnetic field analysis according to the flowchart shown in FIG. 17, as with the third and fifth exemplary embodiments. Next, the EMI condition determination unit 3 of FIG. 6, performs an EMI characteristic comparison process (S3), which is a process of comparing the derived EMI characteristic with the determination criterion, and an EMI condition determination process (S4). In this EMI characteristic comparison process (S3), if the EMI characteristic simple calculation unit 7 is used for deriving the EMI characteristic, a determination criterion to be applied to the EMI characteristic derived by the EMI characteristic simple calculation unit 7 is extracted from the determination criteria storage unit 4 of FIG. 6. On the other hand, in this EMI characteristic comparison process (S3), if the EMI characteristic electromagnetic field analysis unit 10 is used for deriving the EMI characteristic, a determination criterion to be applied to the EMI characteristic derived by the EMI characteristic electromagnetic field analysis unit 10 is extracted from the determination criteria storage unit 4 of FIG. 6. Moreover, if it is determined in the EMI condition determination process (S4) that the determination criterion is satisfied, the result output process (S6) causes the output unit 6 of FIG. 6 to output the result. On the other hand, if the determination criterion is determined to be not satisfied as a result of the EMI condition determination process (S4), then a substrate configuration change unit 5 of FIG. 6 changes the substrate configuration as with the fourth and fifth exemplary embodiments. Therefore, the substrate configuration change method selection process (S9) of FIG. 15 is performed in the substrate configuration change unit 5 of FIG. 6. Moreover, the signal wiring change process (S10), the signal source change process (S11), the cable connection structure change process (S12), and the countermeasure component installation process (S13) of FIG. 15 are performed respectively in the signal wiring change unit 13, the signal source change unit 14, the cable connection structure change unit 15, and the countermeasure component installation unit 16. These processes may be performed respectively according to each process shown in FIG. 18 through FIG. 31 and FIG. 47.

In the above sequence of substrate configuration change processes (S9 through S13) shown in FIG. 15, each process illustrated in FIG. 18 through FIG. 31, and in FIG. 47 may be performed according to change guidelines and restrictions prepared in the determination criteria storage unit 4 of FIG. 6. At this time, several change guidelines and restrictions may be prepared and a rank order may be assigned thereto, and if a single circuit configuration change does not satisfy the determination criteria prepared in the determination criteria storage unit 4, a next circuit configuration change may be performed. The processes of this sequence are also similar to those illustrated in the fourth and fifth exemplary embodiments. Specifically, several change guidelines are prepared with a rank order assigned thereto, and several restrictions that accompany them are also prepared with a rank order assigned thereto. The configuration of a printed substrate is changed according to the respective change guidelines and the restrictions. The printed substrate configuration is changed until the EMI condition determination process (S4) of FIG. 15 is satisfied. With this type of process, it is possible to obtain a printed substrate configuration that satisfies the determination criteria prepared in the determination criteria storage unit 4 of FIG. 6.

In the EMI characteristic derivation method selection process (S14) of FIG. 15, if the EMI characteristic simple calculation unit (S7) is selected for deriving the EMI characteristic, as with the fourth exemplary embodiment, the substrate configuration change unit 5 of FIG. 6 returns the changed printed substrate configuration to the EMI characteristic simple calculation unit 7, and a characteristic of EMI that occurs from the printed substrate is calculated afresh. At this time, information for calculating an EMI characteristic in the EMI characteristic calculation unit 9 is already prepared from the previous printed substrate configuration. Therefore, simply by extracting only the configuration that has been changed in the substrate configuration change unit 5 and changing information of the configuration, the parameter extraction unit 8 may freshly create information for calculating an EMI characteristic with the new printed substrate configuration. In this case, in the flow, the process may be performed in the following manner. In the processes of the sequence of FIG. 15, in any one of the substrate configuration change method selection process (S9) and the substrate configuration change processes (S10 through S13), information of only the configuration portion that is to be changed from the printed substrate configuration is extracted, and in the EMI characteristic simple calculation process (S7), information of only the changed portion is changed from information of the printed substrate configuration from which an EMI characteristic has been derived previously. Furthermore, there is created information for deriving an EMI characteristic with the changed printed substrate configuration.

In the EMI characteristic derivation method selection process (S14) of FIG. 15, if the EMI characteristic electromagnetic field analysis unit (S8) is selected for deriving the EMI characteristic, as with the fifth exemplary embodiment, the substrate configuration change unit 5 of FIG. 6 returns the changed printed substrate configuration to the EMI characteristic electromagnetic field analysis unit 10, and a characteristic of EMI that occurs from the printed substrate is calculated afresh. At this time, a model for electromagnetic field analyzing an EMI characteristic in the model analysis unit 12 is already prepared from the previous printed substrate configuration. Therefore, in the model generation unit 11, simply by extracting only the configuration that has been changed in the substrate configuration change unit 5 and changing information of the configuration, there may be freshly created a model for calculating an EMI characteristic by means of electromagnetic field analysis with the new printed substrate configuration. In this case, in the flow, the process may be performed in the following manner. In the processes of the sequence of FIG. 15, in any one of the substrate configuration change method selection process (S9) and the substrate configuration change processes (S10 through S13), information of only the configuration portion that is to be changed from the printed substrate configuration is extracted. Next, in the EMI characteristic electromagnetic field analysis process (S8), information of only the changed portion in the electromagnetic field analysis model of the printed substrate from which the EMI characteristic has previously been derived is changed and reflected in model creation, and there is created an electromagnetic field analysis model for deriving an EMI characteristic with the changed printed substrate configuration.

Figure 7:
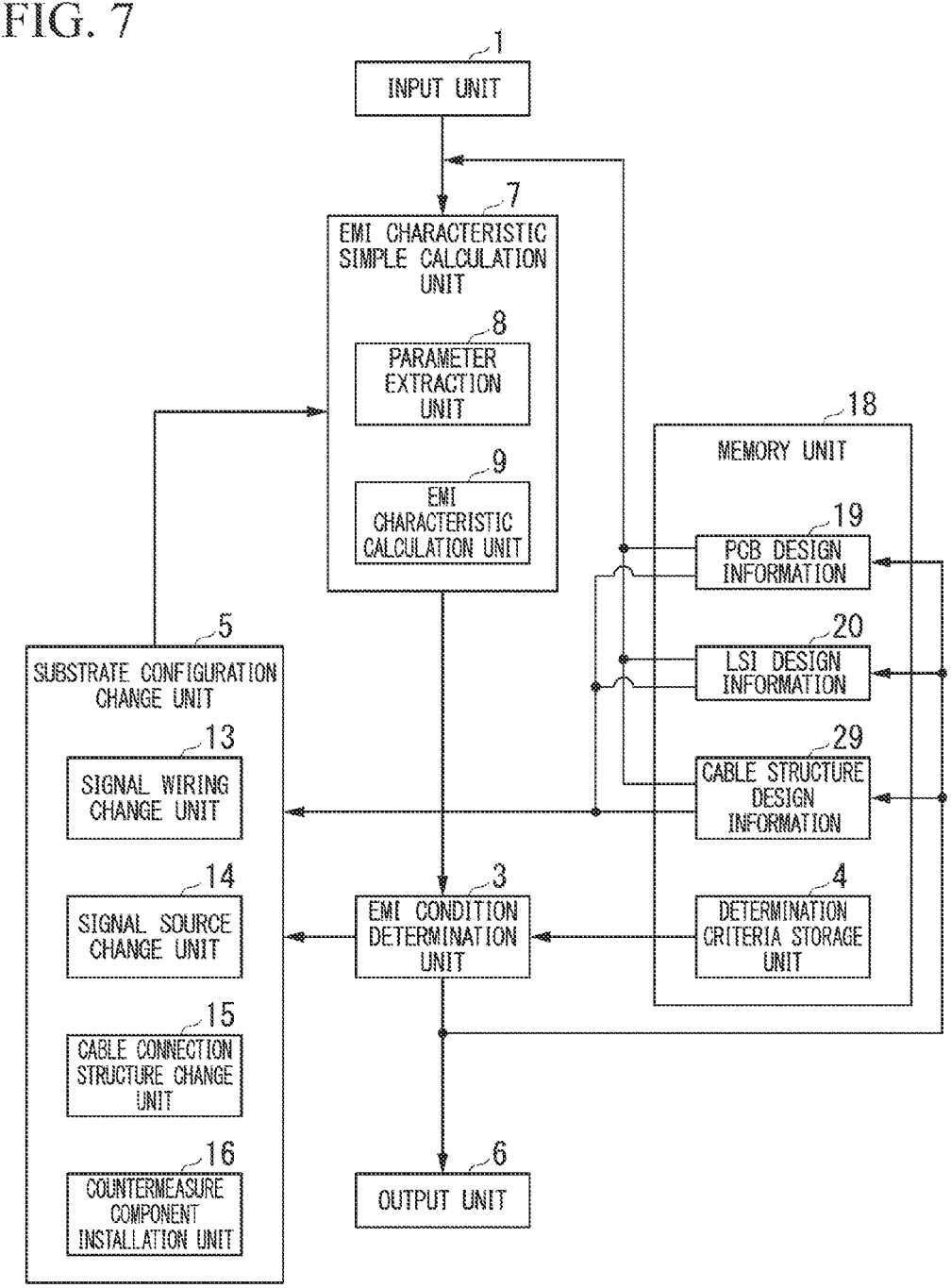
FIG. 7 is a diagram showing an example of a block configuration of a printed substrate design system according to a seventh exemplary embodiment of the present invention.

FIG. 7 shows an example of a block configuration of a printed substrate design system according to a seventh exemplary embodiment of the present invention. The present exemplary embodiment is a system in which a memory unit 18 that stores each piece of input information and a database is included in the system of the fourth exemplary embodiment illustrated in FIG. 4. The memory unit 18 stores printed substrate design information 19, IC design information 20, and cable structure design information 29. The printed substrate design information 19 consolidates information including a layout and cross-sectional structure of a printed substrate, and types, structures, and connection positions of components to be mounted including a cable connector. The IC design information 20 consolidates information including a signal waveform and signal buffer input/output impedance, and a connection terminal structure of an IC. The cable structure design information 29 consolidates information including a length and diameter, material, and composition of a connected cable. The memory unit 18 includes a determination criteria storage unit 4. In this system, instead of performing an input of substrate design information with the input unit 1 of FIG. 4, required data can be extracted from the printed substrate design information 19, the IC design information 20, and the cable structure design information 29 that are present in the memory unit 18 as necessary. The printed substrate design information 19 mentioned here includes information, which are found typically in 2D CAD data, such as size, connection relationship, and position of components including the cable connector on the substrate and wirings as shown in FIG. 32. The printed substrate design information 19 further includes information such as substrate layer structure information shown in FIG. 33, which is specifically layer configuration 34 with a surface conductor layer 31, a dielectric layer 32, and an internal conductor layer 33, and electrical characteristics of each layer such as electrical conductivity and relative permittivity. It is sufficient that the printed substrate design information 19 includes input information for deriving an EMI by means of simple calculation in the EMI characteristic calculation unit 9. Therefore, the printed substrate design information 19 may not include detailed information of connections including via, pull-out wiring, and connection pad. Moreover, for the mounted components, there are prepared electrical data to be input to the EMI characteristic calculation unit 9. For example, for a capacitor 24 in FIG. 32, the capacitance value information of the capacitor is prepared as data. An example of the information of the transmission side IC 21 of FIG. 32 included in the IC design information 20 mentioned here is signal voltage waveform at the output buffer for passing electric current to the wiring, and information of an output buffer structure. An example of information of the reception side IC 22 included in the IC design information 20 is information of the input buffer structure. An example of the structure information is information of an output impedance value at the transmission side IC 21, and information of a resistance value or capacitance value at the reception side IC 22, which are output termination conditions. An example of a signal voltage waveform at the output buffer for passing electric current to an information wiring, output buffer structure information, and information of the reception side IC 22 is input buffer structure information. An example of the structure information is information of an output impedance value for the transmission side IC 21, and information of a resistance value or capacitance value for the reception side IC 22, which are output termination conditions. As information of the connected cable 26 of FIG. 32, the cable structure design information 29 mentioned here includes cable length, cable composition, and electrical characteristics of each material such as electrical conductivity and relative permittivity. It is sufficient that the cable substrate design information 29 includes input information for deriving an EMI by means of simple calculation in the EMI characteristic calculation unit 9. Accordingly, the cable structure design information 29 may include only the cable length information. In a substrate design information input process (S1) in the flowchart of FIG. 13, the printed substrate design system is of a configuration in which the EMI characteristic simple calculation process (S7) extracts only the necessary information from the input printed substrate design information 19, IC design information 20, and cable structure design information 29, to thereby enable an EMI characteristic calculation. At this time, the input unit 1 does not have to be used, and it may be used only for inputting an action for starting an input. This process corresponds to steps S104 through S106 in FIG. 16. The input process from the printed substrate design information 19 corresponds to step S104. The input process from the IC design information 20 corresponds to step S105. The input process from the cable structure design information 29 corresponds to step S106.

A result of the EMI condition determination unit 3 of FIG. 7 having determined an EMI characteristic as being satisfied may also be reflected in the printed substrate design information 19, the IC design information 20, and the cable structure design information 29 in the memory unit 18. This process corresponds to steps S101 through S103 in FIG. 13. The output process to the printed substrate design information 19 corresponds to step S101. The output process to the IC design information 20 corresponds to step S102. The output process to the cable structure design information 29 corresponds to step S103. Specifically, in order to improve an EMI characteristic, information is written to the printed substrate design information 19, the IC design information 20, or the cable structure design information to overwrite the original information, through the sequence of substrate configuration change methods (S9 through S13). More specifically, to the printed substrate design information 19 there is written information of a change or insertion having been made to the wiring structure or component, and/or information of a change having been made to the connection position. To the IC design information 20 there is written information of a change having been made to the output waveform from the IC and/or the internal characteristic. To the cable structure design information 29 there is written information of a change having been made to the length and/or type of the cable. By rewriting substrate design information in this manner, it is possible to obtain a guideline as to what type of countermeasure in combination with the output EMI characteristic result would enable a designer to design a substrate with a low EMI characteristic.

Figure 8:
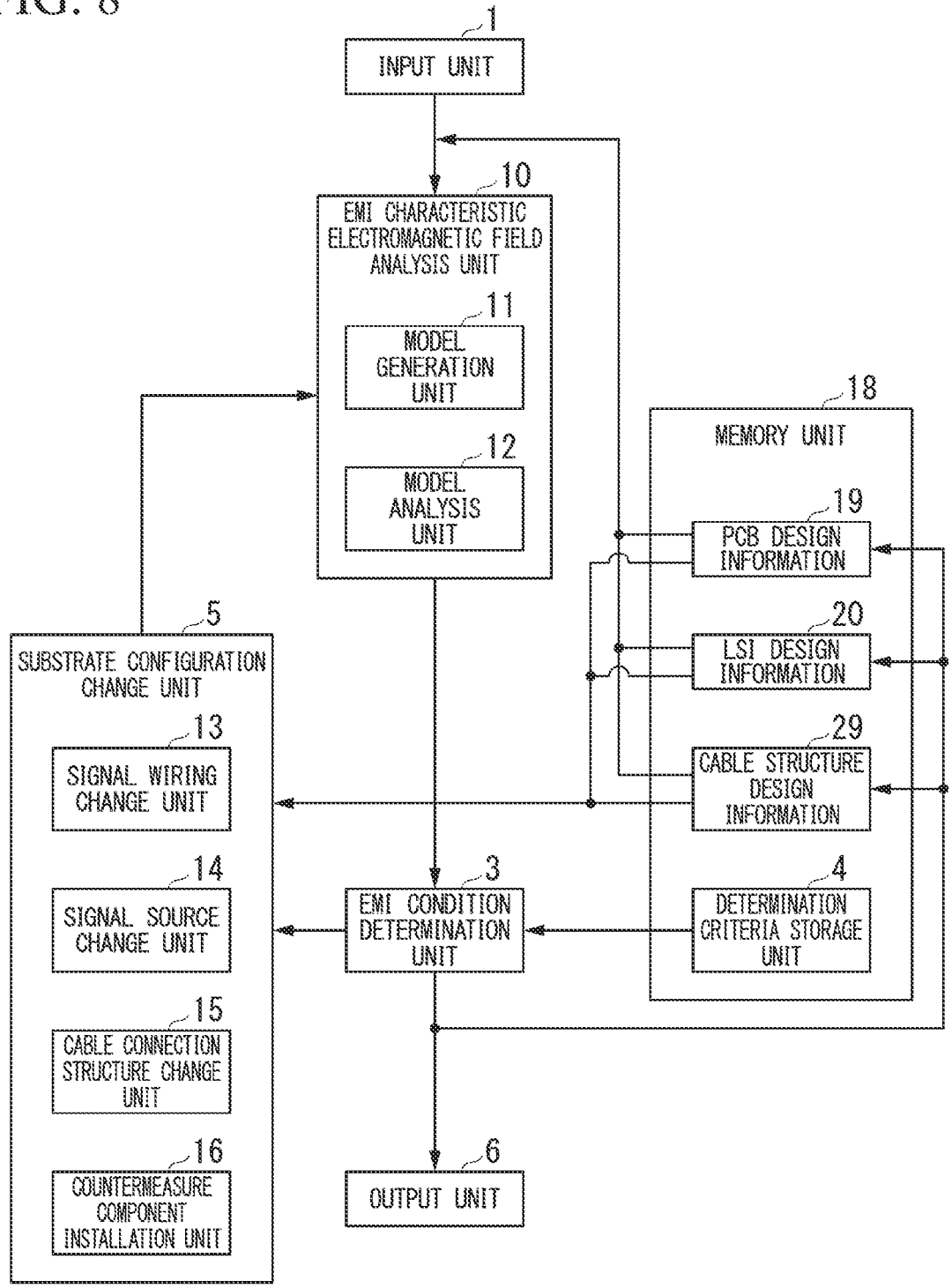
FIG. 8 is a diagram showing an example of a block configuration of a printed substrate design system according to an eighth exemplary embodiment of the present invention.

FIG. 8 shows an example of a block configuration of a printed substrate design system according to an eighth exemplary embodiment of the present invention. The present exemplary embodiment is a system in which a memory unit 18 that stores each piece of input information and a database is included in the system of the fifth exemplary embodiment illustrated in FIG. 5. The memory unit 18 stores printed substrate design information 19, IC design information 20, and cable structure design information 29. The printed substrate design information 19 consolidates information including a layout and cross-sectional structure of a printed substrate, and types, structures, and connection positions of components to be mounted including a cable connector. The IC design information 20 consolidates information including a signal waveform and signal buffer input/output impedance, and a connection terminal structure of an IC. The cable structure design information 29 consolidates information including a length and diameter, material, and composition of a connected cable. The memory unit 18 includes a determination criteria storage unit 4. In this system, as with the seventh exemplary embodiment, instead of performing an input of substrate design information with the input unit 1 of FIG. 5, required data can be extracted from the printed substrate design information 19, the IC design information 20, and the cable structure design information 29 that are present in the memory unit 18 as necessary. The printed substrate design information 19 mentioned here includes information, which is found typically in 2D CAD data, such as size, connection relationship, and position of components including the cable on the substrate and wirings as shown in FIG. 32. The printed substrate design information 19 further includes information such as substrate layer structure information shown in FIG. 33, which is specifically layer configuration 34 with a surface conductor layer 31, a dielectric layer 32, and an internal conductor layer 33, and electrical characteristics of each layer such as electrical conductivity and relative permittivity. In order for the model analysis unit 12 to derive an EMI characteristic by means of electromagnetic field analysis and for the model generation unit 11 to create a highly precise analysis model, the printed substrate design information 19 needs to be data that include detailed connection information including vias, pull-out wirings, and connection pads. For a mounted component, data may be preliminarily prepared for the model 11 to create a model of the component. For example, for a capacitor 24 in FIG. 32, there may be prepared as data information such as the three-dimensional size of the capacitor, and the electrical characteristics of the material thereof that enables reproduction of the characteristics of the capacitor in an electromagnetic field analysis space. An example of the information of the transmission side IC 21 of FIG. 32 included in the IC design information 20 mentioned here is signal voltage waveform at the output buffer for passing electric current to the wiring, and information of an output buffer structure. An example of information of the reception side IC 22 included in the IC design information 20 is information of the input buffer structure. An example of the structure information is three-dimensional configuration information of the output buffer and input buffer in the electromagnetic field analysis space. As information of the connected cable 26 of FIG. 32, the cable structure design information 29 mentioned here includes cable length, cable composition, and electrical characteristics of each material such as electrical conductivity and relative permittivity. In order for the model analysis unit 12 to derive an EMI characteristic by means of electromagnetic field analysis and for the model generation unit 11 to create a highly precise analysis model, the cable structure design information 29 needs to be data that include spatial arrangement information of the cable. In the substrate design information input process (S1) in FIG. 14, the printed substrate design system is of a configuration in which the EMI characteristic electromagnetic field analysis process (S8) creates a required analysis model from the input printed substrate design information 19, IC design information 20, and cable structure design information 29, to thereby enable an EMI characteristic analysis. At this time, the input unit 1 does not have to be used, and it may be used only for inputting an action for starting an input. This process corresponds to steps S107 through S109 in FIG. 17. The input process from the printed substrate design information 19 corresponds to step 107. The input process from the IC design information 20 corresponds to step S108. The input process from the cable structure design information 29 corresponds to step S109.

A result of the EMI condition determination unit 3 of FIG. 8 having determined that an EMI characteristic is satisfied may also be reflected in the printed substrate design information 19, the IC design information 20, and the cable structure design information 29 in the memory unit 18, as with the seventh exemplary embodiment. This process corresponds to steps S101 through S103 in FIG. 14. The output process to the printed substrate design information 19 corresponds to step S101. The output process to the IC design information 20 corresponds to step S102. The output process to the cable structure design information 29 corresponds to step S103. Specifically, in order to improve an EMI characteristic, information is written to the printed substrate design information 19, the IC design information 20, or the cable structure design information 29 to overwrite the original information, through the sequence of substrate configuration change methods (S9 through S13). More specifically, to the printed substrate design information 19 there is written information of a change or insertion having been made to the wiring structure or component, and/or information of a change having been made to the connection position. To the IC design information 20 there is written information of a change having been made to the output waveform from the IC and/or the internal characteristic. To the cable structure design information 29 there is written information of a change having been made to the length and/or type of the cable. By rewriting substrate design information in this manner, it is possible to obtain a guideline as to what type of countermeasure in combination with the output EMI characteristic result would enable a designer to design a substrate with a low EMI characteristic.

Figure 9:
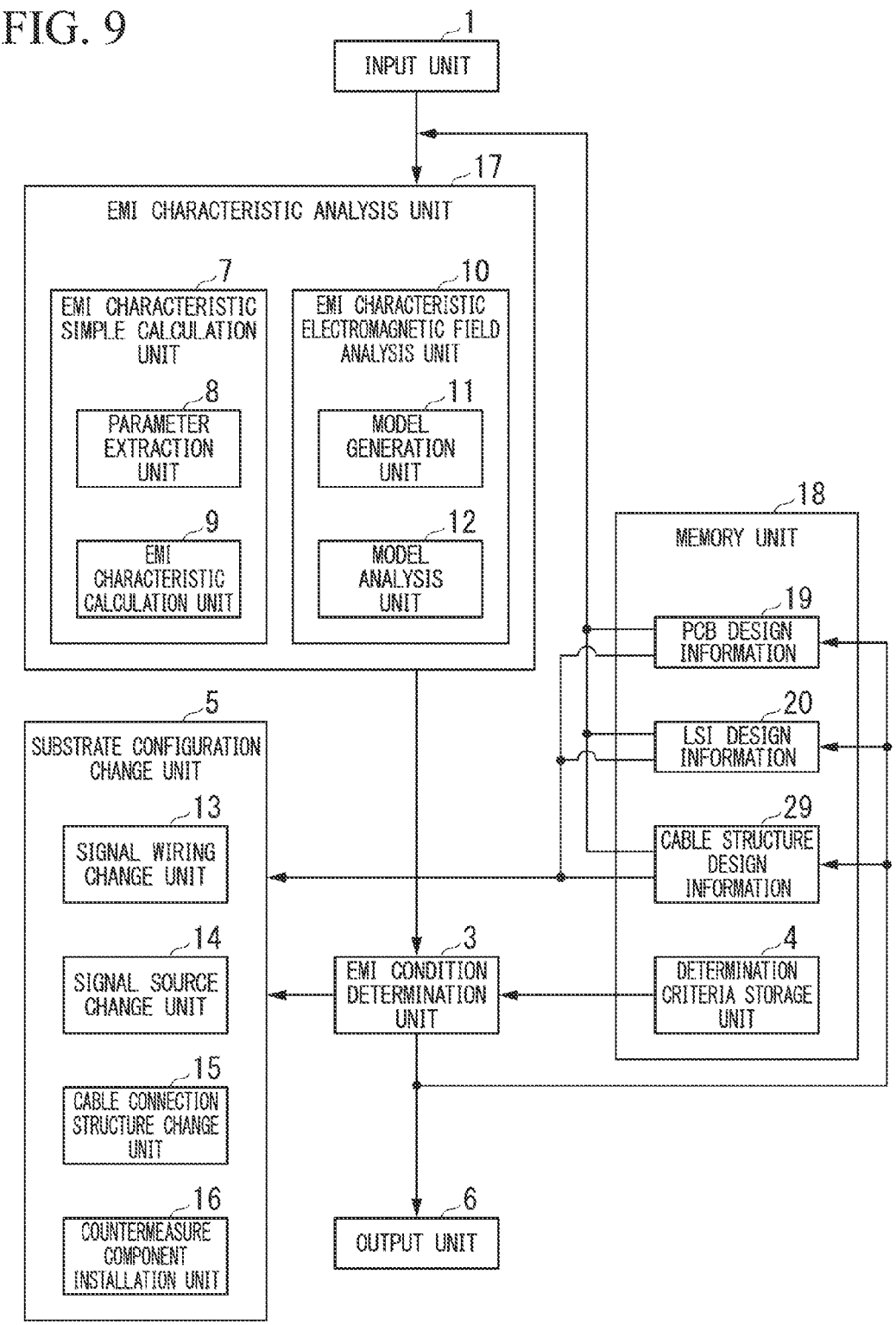
FIG. 9 is a diagram showing an example of a block configuration of a printed substrate design system according to a ninth exemplary embodiment of the present invention.

FIG. 9 shows an example of a block configuration of a printed substrate design system according to a ninth exemplary embodiment of the present invention. The present exemplary embodiment is a system in which a memory unit 18 that stores each piece of input information and a database is included in the system of the sixth exemplary embodiment illustrated in FIG. 6. The memory unit 18 stores printed substrate design information 19, IC design information 20, and cable structure design information 29. The printed substrate design information 19 consolidates information including a layout and cross-sectional structure of a printed substrate, and types, structures, and connection positions of components to be mounted including a cable connector. The IC design information 20 consolidates information including a signal waveform and signal buffer input/output impedance, and a connection terminal structure of an IC. The cable structure design information 29 consolidates information including a length and diameter, material, and composition of a connected cable. The memory unit 18 includes a determination criteria storage unit 4. In this system, as with the seventh and eighth exemplary embodiments, instead of performing an input of substrate design information with the input unit 1 of FIG. 6, required data can be extracted from the printed substrate design information 19, the IC design information 20, and the cable structure design information 29 that are present in the memory unit 18 as necessary. The printed substrate design information 19 mentioned here includes information, which are found typically in 2D CAD data, such as size, connection relationship, and position of components and wirings including the cable on the substrate as shown in FIG. 32. The printed substrate design information 19 further includes information such as substrate layer structure information shown in FIG. 33, which is specifically layer configuration 34 with a surface conductor layer 31, a dielectric layer 32, and an internal conductor layer 33, and electrical characteristics of each layer such as electrical conductivity and relative permittivity. Since the EMI characteristic analysis unit 17 has both of the EMI characteristic simple calculation unit 7 and the EMI characteristic electromagnetic field analysis unit 10, the printed substrate design information 19 may be data that can be used by either one of these analysis units. The system may be such that a method for deriving an EMI characteristic is selected by the EMI characteristic derivation method selection process (S14) in FIG. 15, depending on prepared information. For example, in the case where detailed connection information including vias, pull-out wirings, and connection pads is not present in the printed substrate design information 19, an EMI characteristic may be calculated with the EMI characteristic simple calculation process (S7) by the EMI characteristic derivation method selection process (S14). Also for a mounted component, electrical data to be input to the EMI characteristic calculation unit 9 and data for the model 11 to create a model of the component may both be prepared. For example, for the capacitor 24 in FIG. 32, in the case where only information of a capacitance value of the capacitor is prepared as data, an EMI characteristic may be calculated with the EMI characteristic simple calculation process (S7) by the EMI characteristic derivation method selection process (S14). An example of the information of the transmission side IC 21 of FIG. 32 included in the IC design information 20 mentioned here is signal voltage waveform at the output buffer for passing electric current to the wiring, and information of an output buffer structure. An example of information of the reception side IC 22 included in the IC design information 20 is information of the input buffer structure. As the structure information, for example, information such as an output impedance value for the transmission side IC 21 and a resistance value or a capacitance value, which are output termination conditions, for the reception side IC 22, and three-dimensional configuration information of the output buffer and input buffer in the electromagnetic field analysis space, may both be included. The system may be such that a method for deriving an EMI characteristic is selected by the EMI characteristic derivation method selection process (S14) in FIG. 15, depending on prepared information. For example, in the case where only numerical value information such as output impedance and termination condition is prepared as the structure information of the transmission side IC 21 and the reception side IC 22 of FIG. 32, and there is no three-dimensional structure information, an EMI characteristic may be calculated with the EMI characteristic simple calculation process (S7) by the EMI characteristic derivation method selection process (S14). As information of the connected cable 26 of FIG. 32, the cable structure design information 29 mentioned here includes cable length, cable composition, and electrical characteristics of each material such as electrical conductivity and relative permittivity. Since the EMI characteristic analysis unit 17 has both of the EMI characteristic simple calculation unit 7 and the EMI characteristic electromagnetic field analysis unit 10, the cable structure design information 29 may be data that can be used by either one of these analysis units. The system may be such that a method for deriving an EMI characteristic is selected by the EMI characteristic derivation method selection process (S14) in FIG. 15, depending on prepared information.

For example, in the case where information of the composition and material of the cable is not present in the cable structure design information 21, an EMI characteristic may be calculated with the EMI characteristic simple calculation process (S7) by the EMI characteristic derivation method selection process (S14). In the substrate design information input process (S1) in FIG. 15, the printed substrate design system is of a configuration in which an EMI characteristic can be derived from the input printed substrate design information 19, the IC design information 20, and the cable structure design information 29, with the selected method of the EMI characteristic simple calculation process (S7) or the EMI characteristic electromagnetic field analysis process (S8). At this time, the input unit 1 does not have to be used, and it may be used only for inputting an action for starting an input. This process corresponds to steps S104 through S106 in FIG. 16, or steps S107 through S109 in FIG. 17. The input process from the printed substrate design information in the EMI characteristic simple calculation process corresponds to step S104. The input process from the IC design information 20 in the EMI characteristic simple calculation process corresponds to step S105. The input process from the cable structure design information 29 in the EMI characteristic simple calculation process corresponds to step S106. The input process from the printed substrate design information 19 in the EMI characteristic electromagnetic field analysis process corresponds to step S107. The input process from the IC design information 20 in the EMI characteristic electromagnetic field analysis process corresponds to step S108. The input process from the cable structure design information 29 in the EMI characteristic electromagnetic field analysis process corresponds to step S109.

A result of the EMI condition determination unit 3 of FIG. 9 having determined that an EMI characteristic is satisfied may also be reflected in the printed substrate design information 19, the IC design information 20, and the cable structure design information 29 in the memory unit 18, as with the seventh and eighth exemplary embodiments. This process corresponds to steps S101 through S103 in FIG. 15. The output process to the printed substrate design information 19 corresponds to step S101. The output process to the IC design information 20 corresponds to step S102. The output process to the cable structure design information 29 corresponds to step S103. Specifically, in order to improve an EMI characteristic, information is written respectively to the printed substrate design information 19, the IC design information 20, or the cable structure design information 29 to overwrite the original information, through the sequence of substrate configuration change methods (S9 through S13). More specifically, to the printed substrate design information 19 there is written information of a change or insertion having been made to the wiring structure or component, and/or information of a change having been made to the connection position. To the IC design information 20 there is written information of a change having been made to the output waveform from the IC and/or the internal characteristic. To the cable structure design information 29 there is written information of a change having been made to the length and/or type of the cable. By rewriting substrate design information in this manner, it is possible to obtain a guideline as to what type of countermeasure in combination with the output EMI characteristic result would enable a designer to design a substrate with a low EMI characteristic.

In the present exemplary embodiment, a method for deriving an EMI characteristic is selected by the EMI characteristic derivation method selection process (S14) of the flowchart in FIG. 15, depending on information prepared in the memory unit 18 of FIG. 9. Accordingly, it is possible to derive an EMI characteristic with an optimal method for information prepared at each design stage. As a result, it is possible to design a printed substrate with a low EMI level without investing in calculation cost more than necessary.

(Supplementary Note 1)

As the EMI characteristic derivation process, there is performed an EMI characteristic simple calculation process that includes a calculation parameter extraction process of extracting, from the input information, information that is required in calculations for the printed circuit substrate, and an equation calculation process of calculating an EMI characteristic from the extracted information.

(Supplementary Note 2)

As the EMI characteristic derivation process, there is performed an EMI characteristic electromagnetic field analysis process that includes an analysis model generation process of generating an analysis model for performing an electromagnetic field analysis of the printed circuit substrate, and an EMI analysis process of performing an electromagnetic field analysis with use of the analysis model to analytically derive the EMI characteristic for the printed circuit substrate.

(Supplementary Note 3)

As the substrate configuration change process, a signal wiring change process of changing the signal wiring structure of the printed circuit substrate, a signal source change process of changing the signal source characteristic of the printed circuit substrate, a cable connection structure change process of changing the structure including the connection condition of the cable connected to the printed circuit substrate, and a countermeasure component installation process of installing a countermeasure component on the printed circuit substrate can be selected, and any one of the processes is selected according to a preliminarily prepared guideline to change the substrate configuration.

(Supplementary Note 4)

As the EMI characteristic derivation process, the EMI characteristic simple calculation process and the EMI characteristic electromagnetic field analysis process can be selected, and either one of the processes is selected according to a preliminarily prepared guideline to derive an EMI characteristic.

(Supplementary Note 5)

As the signal wiring change process, a layer configuration change process of changing the layer in which the wiring on the printed circuit substrate is present, a wiring length change process of changing the length of the wiring on the printed circuit substrate, a termination condition change process of changing the termination condition of the wiring on the printed circuit substrate, and a guard pattern installation process of installing a guard pattern on the wiring on the printed circuit substrate can be selected, and any one of the processes is selected according to a preliminarily prepared guideline to change the wiring structure on the printed circuit substrate.

(Supplementary Note 6)

As the signal source change process, an operating frequency change process of changing the operating frequency of the signal source on the printed circuit substrate, an operating voltage change process of changing the operating voltage of the signal source on the printed circuit substrate, an operating signal ratio change process of changing the operating signal ratio of the signal source on the printed circuit substrate, and a rise time change process of changing the rise time of the signal source on the printed circuit substrate can be selected, and any one of the processes is selected according to a preliminarily prepared guideline to change the signal source on the printed circuit substrate.

(Supplementary Note 7)

As the cable connection structure change process, a cable connection position change process of changing the connection position of the cable connected to the printed circuit substrate, a cable length change process of changing the length of the cable connected to the printed circuit substrate, and a cable length change process of changing the type of the cable connected to the printed circuit substrate can be selected, and any one of the processes is selected according to a preliminarily prepared guideline to change the structure of the cable connected to the printed circuit substrate.

(Supplementary Note 8)

A program realizes an optimal method for designing a printed circuit substrate.

The present invention has been described with reference to the exemplary embodiments. However, the invention is not limited to the above exemplary embodiments. Various modifications that can be understood by a person skilled in the art may be made to the configurations and details of the present invention within the scope of the invention.

This application is based upon and claims the benefit of priority from Japanese patent application No. 2011-166250, filed on Jul. 29, 2011, the disclosure of which is incorporated herein in its entirety by reference.

INDUSTRIAL APPLICABILITY

According to the present invention, on a printed substrate with a cable connected thereto and an IC mounted thereon, the invention may be applied to use for deriving an EMI characteristic at each designing stage without investing in calculation cost more than necessary.

Moreover, it may be applied to use where a method for changing a printed substrate structure and/or a component to be mounted is used so that occurring EMI satisfies a preliminarily prepared allowable value, to thereby change the design of the printed substrate.

REFERENCE SYMBOLS

1 Input unit
2 EMI characteristic derivation unit
3 EMI condition determination unit
4 Determination criteria storage unit
5 Substrate configuration change unit
6 Output unit
7 EMI characteristic simple calculation unit
8 Parameter extraction unit
9 EMI characteristic calculation unit
10 EMI characteristic electromagnetic field analysis unit
11 Model generation unit
12 Model analysis unit
13 Signal wiring change unit
14 Signal source change unit
15 Cable connection structure change unit
16 Countermeasure component installation unit
17 EMI characteristic analysis unit
18 Memory unit
19 Printed substrate design information
20 IC design information
29 Cable structure design information
21 Transmission side IC
22 Reception side IC
23 Substrate signal wiring
24 Substrate mounted component
25 Cable connection connector
26 Cable
27 Wiring electric current
31 Surface conductor layer
32 Dielectric layer
33 Internal conductor layer
34 Layer configuration
41 Transmission side parameter extracted in calculation parameter extraction process
42 Reception side parameter extracted in calculation parameter extraction process
43 Wiring parameter extracted in calculation parameter extraction process
44 Cable connection parameter extracted in calculation parameter extraction process
45 Substrate parameter extracted in calculation parameter extraction process
46 Transmission side parameter of electromagnetic field analysis model created in model creation process
47 Reception side parameter of electromagnetic field analysis model created in model creation process
48 Wiring parameter of electromagnetic field analysis model created in model creation process
49 Cable connection parameter of electromagnetic field analysis model created in model creation process
50 Substrate parameter of electromagnetic field analysis model created in model creation process
51 Wiring (surface layer installation)
52 Dielectric layer
53 GND layer (internal conductor layer)
54 Wiring (inner layer)
55 Wiring connected to transmission side element and reception side element
56 Transmission side element (IC)
57 Reception side element (IC)
58 Termination component
59 Guard pattern
61 Transmission side element (IC)
62 Reception side element (IC)
63 Wiring connected to transmission side element and reception side element
64 Cable connection connector
65 Cable
66 Countermeasure component
67 GND via
68 Cable of changed type

The invention claimed is:

1. A printed substrate design system for designing a substrate configuration of a printed substrate so as to suppress common mode radiation occurring from a cable connected to the printed substrate, an IC and a passive component being mounted on the printed substrate, the printed substrate design system comprising:

an input unit that receives input of printed substrate design information;

an EMI characteristic derivation unit that derives an EMI characteristic from the input printed substrate design information received by the input unit, the EMI characteristic being a characteristic of common mode radiation occurring from the cable connected to the printed substrate;

a determination criteria storage unit that stores an EMI allowable condition being a condition of an allowable EMI characteristic of the printed substrate;

an EMI condition determination unit that compares the EMI characteristic derived by the EMI characteristic derivation unit with the EMI allowable condition stored in the determination criteria storage unit, the EMI condition determination unit determining whether the EMI characteristic of the printed substrate satisfies the EMI allowable condition;

a substrate configuration change unit that changes an internal configuration of the printed substrate to obtain a changed configuration of the printed substrate in a case where the EMI condition determination unit has determined that the EMI allowable condition is not satisfied, the substrate configuration change unit setting design information of the changed configuration of the printed substrate to design information for deriving the EMI characteristic in the EMI characteristic derivation unit; and an output unit that outputs a printed substrate configuration that satisfies the EMI allowable condition in a case where the EMI condition determination unit has determined the EMI allowable condition is satisfied, wherein the substrate configuration change unit includes:
a signal wiring change unit that changes a structure of a signal wiring of the printed substrate;
a signal source change unit that changes a characteristic of a signal source of the printed substrate;
a cable connection structure change unit that changes a structure including a connection condition of a cable connected to the printed substrate; and
a countermeasure component installation unit that installs a countermeasure component on the printed substrate.

2. The printed substrate design system according to claim 1, wherein the EMI characteristic derivation unit includes an EMI characteristic simple calculation unit including: a parameter extraction unit that extracts necessary information of the printed substrate from the input information; and an EMI characteristic calculation unit that derives the EMI characteristic by means of a calculation, based on the extracted information.

3. The printed substrate design system according to claim 1, wherein the EMI characteristic derivation unit includes an EMI characteristic electromagnetic field analysis unit including: a model generation unit that generates an analysis model for performing an electromagnetic field analysis on the printed substrate based on the input information; and a model analysis unit that performs an electromagnetic field analysis with use of the analysis model to analytically derive the EMI characteristic.

4. The printed substrate design system according to claim 1,
wherein the EMI characteristic derivation unit comprises an EMI characteristic simple calculation unit and an EMI characteristic electromagnetic field analysis unit,
the EMI characteristic simple calculation unit includes: a parameter extraction unit that extracts necessary information of the printed substrate from the input information; and an EMI characteristic calculation unit that derives the EMI characteristic by means of a calculation, based on the extracted information,
the EMI characteristic electromagnetic field analysis unit includes a model generation unit that generates an analysis model for performing an electromagnetic field analysis on the printed substrate based on the input information; and a model analysis unit that performs an electromagnetic field analysis with use of the analysis model to analytically derive the EMI characteristic.

5. The printed substrate design system according to claim 2, further comprising a memory unit,
wherein the memory unit stores printed substrate design information being a database of structure information of a printed substrate, IC design information being a database of internal design information of the IC, and cable structure design information being a database of structure information of the cable, and the memory unit includes the determination criteria storage unit,
the input unit extracts necessary information from the printed substrate design information, the IC design information, and the cable structure design information, and inputs the necessary information, and
in a case where the EMI condition determination unit has determined that the EMI allowable condition is satisfied, the output unit reflects and rewrites a printed substrate configuration that satisfies the EMI allowable condition in the printed substrate design information, the IC design information, and the cable structure design information in the memory unit.

6. The printed substrate design system according to claim 3, further comprising a memory unit,
wherein the memory unit stores printed substrate design information being a database of structure information of a printed substrate, IC design information being a database of internal design information of the IC, and cable structure design information being a database of structure information of a connected cable, and the memory unit includes the determination criteria storage unit,
the input unit extracts necessary information from the printed substrate design information, the IC design information, and the cable structure design information, and inputs the necessary information, and
in a case where the EMI condition determination unit has determined that the EMI allowable condition is satisfied, the output unit reflects and rewrites a printed substrate configuration that satisfies the EMI allowable condition in the printed substrate design information, the IC design information, and the cable structure design information in the memory unit.

7. The printed substrate design system according to claim 4, further comprising a memory unit,
wherein the memory unit stores printed substrate design information being a database of structure information of a printed substrate, IC design information being a database of internal design information of the IC, and cable structure design information being a database of structure information of a connected cable, and the memory unit includes the determination criteria storage unit,
the input unit extracts necessary information from the printed substrate design information, the IC design information, and the cable structure design information, and inputs the necessary information, and
in a case where the EMI condition determination unit has determined that the EMI allowable condition is satisfied, the output unit reflects and rewrites a printed substrate configuration that satisfies the EMI allowable condition in the printed substrate design information, the IC design information, and the cable structure design information in the memory unit.

8. A printed substrate design method for designing a substrate configuration of a printed substrate so as to suppress common mode radiation occurring from a cable connected to the printed substrate, an IC and a passive component being mounted on the printed substrate, the printed substrate design method comprising:
receiving input of printed substrate design information;
deriving an EMI characteristic from the received input of printed substrate design information, the EMI characteristic being a characteristic of common mode radiation occurring from the cable connected to the printed substrate;
comparing, using at least one computer processor, the derived EMI characteristic with an EMI allowable condition stored in a determination criteria storage unit, and determining whether the EMI characteristic of the printed substrate satisfies the EMI allowable condition;
changing an internal configuration of the printed substrate to obtain a changed configuration of the printed substrate in a case where it has been determined that the EMI allowable condition is not satisfied, and setting design information of the changed configuration of the printed substrate to design information for deriving the EMI characteristic; and
outputting a printed substrate configuration that satisfies the EMI allowable condition in a case where it has been determined that the EMI allowable condition is satisfied,
wherein changing the internal structure includes:
changing a structure of a signal wiring of the printed substrate;
changing a characteristic of a signal source of the printed substrate;
changing a structure including a connection condition of a cable connected to the printed substrate; and
installing a countermeasure component on the printed substrate.

* * * * *